United States Patent
Tabata et al.

(10) Patent No.: US 6,459,980 B1
(45) Date of Patent: Oct. 1, 2002

(54) VEHICLE BRAKED WITH MOTOR TORQUE AND METHOD OF CONTROLLING THE SAME

(75) Inventors: Atsushi Tabata, Okazaki; Yutaka Taga, Aichi-ken; Seiji Nakamura, Nagoya; Masaya Amano, Toyota, all of (JP)

(73) Assignee: Toyota Jidosha Kabushiki Kaisha, Toyota (JP)

( * ) Notice: Subject to any disclaimer, the term of this patent is extended or adjusted under 35 U.S.C. 154(b) by 0 days.

(21) Appl. No.: 09/889,962

(22) PCT Filed: Feb. 2, 2000

(86) PCT No.: PCT/JP00/00580

§ 371 (c)(1),
(2), (4) Date: Jul. 24, 2001

(87) PCT Pub. No.: WO00/46063

PCT Pub. Date: Aug. 10, 2000

(30) Foreign Application Priority Data

| Feb. 8, 1999 | (JP) | 11-30028 |
| Feb. 8, 1999 | (JP) | 11-30040 |
| Feb. 8, 1999 | (JP) | 11-30054 |
| Feb. 8, 1999 | (JP) | 11-30071 |
| Feb. 8, 1999 | (JP) | 11-30095 |
| Apr. 30, 1999 | (JP) | 11-123500 |

(51) Int. Cl.$^7$ ................................. B60K 6/04
(52) U.S. Cl. .............. 701/70; 701/22; 701/51; 180/65.1; 180/65.2; 180/65.3
(58) Field of Search ............. 701/70, 22, 51; 180/65.1, 65.2, 65.3, 65.4, 65.5, 65.6, 65.7, 165; 305/152

(56) References Cited

U.S. PATENT DOCUMENTS

| 5,355,749 A | * 10/1994 | Obara et al. .............. 477/15 |
| 5,644,200 A | * 7/1997 | Yang .......................... 180/65.2 |
| 5,720,690 A | 2/1998 | Hara et al. .................... 477/20 |
| 5,839,533 A | * 11/1998 | Mikami et al. ............. 180/165 |
| 5,844,201 A | * 12/1998 | Dibacco et al. ............. 219/136 |
| 5,915,801 A | 6/1999 | Taga et al. ................... 303/152 |

FOREIGN PATENT DOCUMENTS

| JP | A 5-176409 | 7/1993 |
| JP | A 5-191904 | 7/1993 |
| JP | A 5-284610 | 10/1993 |
| JP | A 6-315207 | 11/1994 |
| JP | A 9-37407 | 2/1997 |
| JP | A 9-93724 | 4/1997 |
| JP | A 9-98509 | 4/1997 |
| JP | A 9-331604 | 12/1997 |
| JP | A 11-18207 | 1/1999 |

* cited by examiner

Primary Examiner—William A. Cuchlinski, Jr.
Assistant Examiner—Marthe Y. Marc-Coleman
(74) Attorney, Agent, or Firm—Oliff & Berridge, PLC

(57) ABSTRACT

A vehicle has a power system, in which an engine, a motor, a torque converter, a transmission, and an axle are connected in series. The transmission has a mechanism of varying a gear ratio under the control of a control unit. A driver of the vehicle operates a specific switch for setting a deceleration to specify a desired deceleration by means of power source braking. In response to an ON operation of a snow mode switch, a possible range of setting of the deceleration is restricted to a specific area that does not cause any slip or skid of the vehicle. The control unit totally controls the torque of the motor and the gear ratio, thereby implementing the braking at the desired deceleration. This arrangement attains the desired deceleration specified by the driver in the wide possible range of the setting, while restricting the deceleration to a specific range according to the driving conditions of the vehicle.

51 Claims, 39 Drawing Sheets

Fig. 3

|     | C0 | C1 | C2 | B0 | B1 | B2 | B3 | B4 | F0 | F1 | F2 |
|-----|----|----|----|----|----|----|----|----|----|----|----|
| P   | ○  |    |    |    |    |    |    |    | ○  |    |    |
| R   |    |    | ○  | ○  |    |    |    | ○  |    |    |    |
| N   | ○  |    |    |    |    |    |    |    | ○  |    |    |
| 1st | ○  | ○  |    |    |    |    |    | ◎  | ○  |    | ○  |
| 2nd | ◎  | ○  |    |    |    |    | ○  |    | ○  |    |    |
| 3rd | ○  | ○  |    |    | ◎  | ○  |    |    | ○  |    |    |
| 4th | ○  | ○  | ○  |    |    | △  |    |    | ○  | ○  |    |
| 5th |    | ○  | ○  | ○  |    | △  |    |    | ○  |    |    |

○ : Engage
◎ : Engage in the case of power-source braking
△ : Engage but not involved in power transmission Fig. 5
(a)
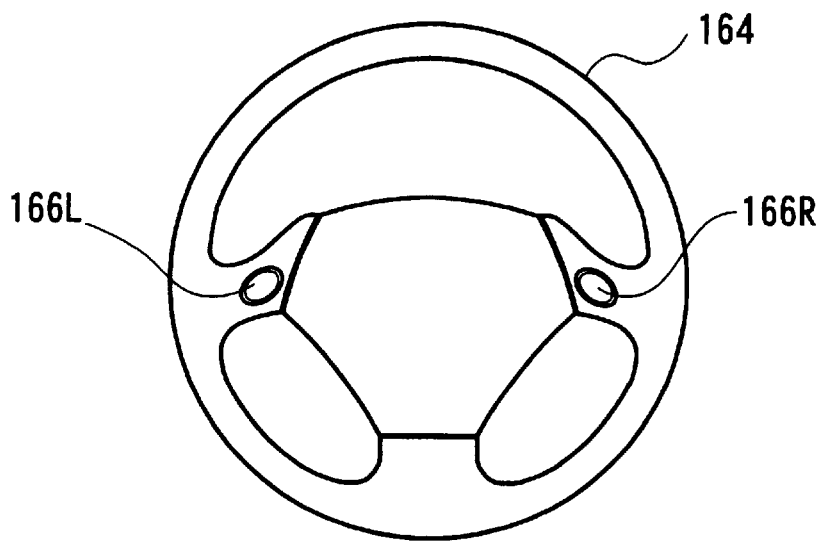
(b)
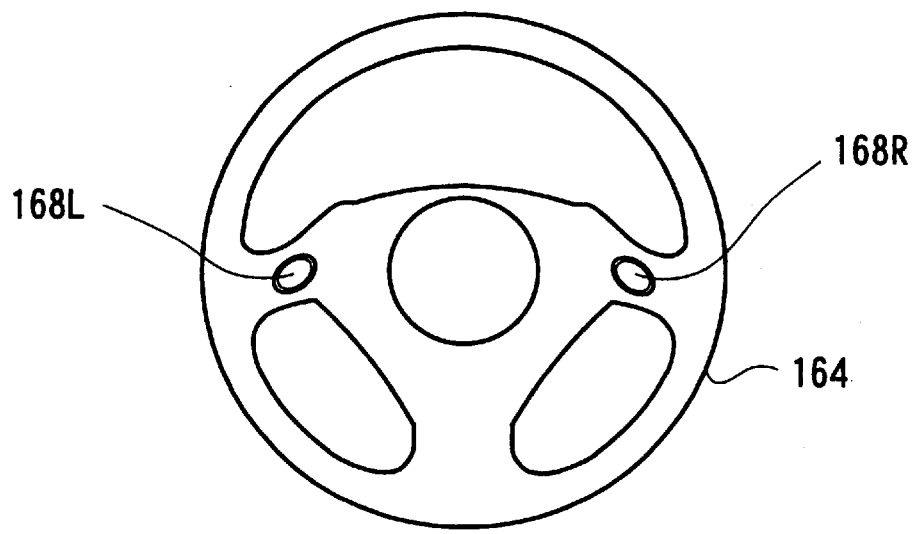

VEHICLE BRAKED WITH MOTOR TORQUE AND METHOD OF CONTROLLING THE SAME

TECHNICAL FIELD

The present invention relates to a vehicle that may be braked with a motor as well as with a mechanical brake utilizing a frictional force, and also to a method of controlling such a vehicle. More specifically the present invention pertains to a vehicle that is braked with a motor to attain an arbitrarily adjustable speed reduction rate, as well as to a controlling method to actualize such braking.

BACKGROUND ART

A hybrid vehicle with both an engine and a motor as the power source has been proposed as one form of vehicles. For example, a hybrid vehicle disclosed in JAPANESE PATENT LAID-OPEN GAZETTE No. 9-37407 additionally has a motor placed in series between an engine and a transmission in a power system of an ordinary vehicle where an output shaft of the engine is connected with a drive shaft via the transmission. This arrangement enables the hybrid vehicle to be driven by means of both the engine and the motor as the power source. The engine generally has poor fuel consumption at a time of starting the vehicle. In order to avoid the driving of poor fuel consumption, the hybrid vehicle makes a start by utilizing the power of the motor. After the speed of the vehicle reaches a predetermined level, the hybrid vehicle starts its engine and is subsequently driven by utilizing the power of the engine. The hybrid vehicle accordingly improves the fuel consumption at the time of starting. The hybrid vehicle causes the motor to regenerate the rotations of the drive shaft as electric power, which is used for braking (hereinafter such braking is referred to as the regenerative braking). The hybrid vehicle carries out the regenerative braking and thereby enables the kinetic energy to be used without significant wastes. These characteristics desirably improve the fuel consumption of the hybrid vehicle.

There are two different types of braking in the vehicle. One braking process presses a brake pad against the drive shaft in response to actuation of a brake pedal, so as to apply a frictional force to the axle (hereinafter referred to as the wheel braking). The other braking process causes the power source to apply a load to the drive shaft, like engine brake (hereinafter referred to as the power source braking). The hybrid vehicle utilizes, as the power source braking, engine brake based on a pumping loss of the engine and regenerative braking due to a regenerative load of the motor. The power source braking does not require the driver to change the foot position from the accelerator pedal to the brake pedal for the purpose of braking. In order to enhance the effectiveness of the power source braking, it is desirable to arbitrarily set a speed reduction rate required by the driver.

The engine brake results in a substantially fixed speed reduction rate according to the engine speed, unless the open and close timings of an intake valve and an exhaust valve are changed. In order to attain a desired speed reduction rate by engine brake, the driver is required to operate a gearshift level to vary the gear ratio of the transmission and thereby change the ratio of the torque of the power source to the torque output to the drive shaft. The advantage of the regenerative braking of the motor is, on the other hand, relatively easy control of the regenerative load, which leads to relatively easy control of the speed reduction rate.

In the conventional hybrid vehicles, however, a diversity of problems as discussed below arise in the braking process utilizing the motor.

The first problem is that there has been no discussion on the possible range of the speed reduction rate set by the driver. Namely no discussion has been held on the desirable range of the speed reduction rate, in order to attain the stable driving of the hybrid vehicle.

The second problem is that the speed reduction rate can be set only in a variable range of the regenerative load of the motor. In some cases, the hybrid vehicle can not sufficiently attain the speed reduction rate required by the driver. The insufficient speed reduction rate occurs especially in the course of high-speed driving of the vehicle.

The third problem is that the driving state allowing the regenerative braking with the motor is relatively limited. For example, when the accumulator is in a state close to the full charge level, no further charging is allowed for the regenerative braking.

In such circumstances, the advantages of the power source braking, for example, actuation of braking without any change the foot position, are not fully utilized.

Utilizing the wheel braking to compensate for the insufficiency of the speed reduction rate damages the advantage of the power source braking that does not require any change of the foot position. The wheel braking causes the kinetic energy of the vehicle to be consumed in the form of thermal energy and accordingly damages the advantage of the hybrid vehicle that is the effective use of energy.

In the prior art hybrid vehicle, a large speed reduction rate may be attained by operating the gearshift lever to change the gear ratio of the transmission. In this case, however, the speed reduction rate drastically varies with the operation of the gearshift lever, which results in a poor ride..

The fourth problem is that there has been no discussion on the manipulation mechanism that allows the user to set the speed reduction rate. For the effective actuation of the regenerative braking, it is desirable that the user can arbitrarily and readily set the speed reduction rate. The desired speed reduction rate frequently varies according to the driving state of the vehicle, so that the easy change of the settings is demanded. It is, on the other hand, demanded to prevent an unintentional variation in speed reduction rate. No manipulation mechanisms for allowing the user to set the speed reduction rate have practically been proposed by considering such conditions.

The fifth problem is that there has been no discussion on the desired settings of the speed reduction rate at the respective gear ratios in response to the operation of the gearshift lever to change the gear ratio and the specification of the speed reduction rate. In order to fully utilize the advantage of the power source braking that does not require any change of the foot position from the accelerator pedal to the brake pedal and enhance the operatability of the hybrid vehicle, it is required to attain the speed reduction rate that well follows the driver's feeling. There has been no discussion from these viewpoints how the setting of the speed reduction rate should vary against the changing gear ratio, for example, in response to the specification of the speed reduction rate by the driver. In the prior art hybrid vehicles, there is still a requirement for the further improvement in effectiveness of the power source braking.

The sixth problem is that the energy recovery rate is lowered when the driver operates the gearshift lever to changeover the working range of the gear ratio. In the hybrid vehicle with a transmission, the driver operates the gearshift lever with a view to gaining a greater speed reduction rate and ensuring quick acceleration after the braking control. The driver may select a specific gearshift position where the positions of the change-speed gear having the greater gear ratios are available. In other words, the driver may select the gearshift position that prohibits the use of the positions of the change-speed gear having the smaller gear ratios.

In the prior art hybrid vehicle, the quantity of regeneration by the motor is reduced in such cases. This leads to the insufficient regeneration of the kinetic energy of the vehicle in the form of electric power.

In order to enhance the energy recovery rate of the vehicle, the braking control may be carried out at another specific gearshift position where the positions of the change-speed gear having the smaller gear ratios are available. This leads to a lesser ratio of the speed reduction rate applied to the axle to the braking torque of the power source. Due to this lesser ratio, the braking control by the power source braking can not be implemented with the sufficiently large speed reduction rate desired by the driver. The driver should accordingly use the wheel braking to obtain the sufficient speed reduction rate. The use of the wheel braking leads to the lowered energy recovery rate. The selection of this gearshift position does not allow the quick acceleration desired by the driver after the braking control, thereby significantly damaging the controllability of the vehicle.

The problems discussed above arise not only in the hybrid vehicles with both the engine and the motor as the power source but in any vehicles with only the motor as the power source. Similar problems are also found in vehicles with both the engine and the motor mounted thereon; which uses only the engine for the power source of drive and utilizes the motor for other purposes, such as regenerative braking.

DISCLOSURE OF THE INVENTION

One object of the present invention is to provide a vehicle that attains adequate speed reduction according to driving conditions of the vehicle by utilizing a motor, and a method of controlling such a vehicle. Another object of the present invention is to provide a vehicle that smoothly regulates a speed reduction rate in a process of braking with a motor in a wide possible range of setting in response to an instruction of a driver, and a controlling method to attain such braking.

At least part of the above and the other related objects is attained by a first vehicle that includes a motor, a transmission that enables selection of a plurality of gear ratios in a process of power transmission, and a drive shaft, which are connected with one another, and is braked by means of a torque output from the motor. The first vehicle includes: an operation unit, through an operation of which a driver of the vehicle specifies a speed reduction rate in a process of braking with the motor; a target speed reduction rate setting unit that sets a target speed reduction rate in response to the operation of the operation unit; a selection unit that selects a target gear ratio among a plurality of available gear ratios, the target gear ratio enabling the currently set target speed reduction rate to be attained by the torque of the motor; a motor driving state specification unit that specifies a target driving state of the motor, in order to enable a braking force that attains the currently set target speed reduction rate to be applied to the drive shaft; and a control unit that controls the transmission to attain the target gear ratio and drives the motor in the specified target driving state.

The target driving state of the motor is specified by a diversity of parameters relating to driving conditions, for example, the target torque, the electric power regenerated by the motor, and the electric current flowing through the motor.

In the vehicle of the present invention, the selection unit selects an adequate gear ratio according to the speed reduction rate specified by the driver and the magnitude of the torque output from the motor. Controlling the driving state of the motor at the adequate gear ratio ensures the speed reduction rate required by the driver. The first vehicle of the present invention totally controls both the transmission and the motor, thereby implementing the braking in response to the specification by the driver in a wide range.

The braking control with the torque of the motor generally works when the accelerator pedal is released. In the case where the power-source braking does not attain the sufficient speed reduction rate corresponding to the requirement of the driver, the driver should step on the brake pedal, so as to make the wheel braking act and raise the speed reduction rate. This requires the driver to change the foot position from the accelerator pedal to the brake pedal. A return of the foot position from the brake pedal to the accelerator pedal is then required for acceleration following the speed reduction. The frequent change of the foot position worsens the controllability of the vehicle.

The first vehicle of the present invention, on the other hand, implements the braking control with the motor in a wide range of speed reduction rate as described above. A simple release of the accelerator pedal accordingly ensures the sufficient speed reduction rate that is substantially coincident with the requirement of the driver. The driver can thus brake the vehicle and subsequently accelerate the vehicle without changing the foot position between the accelerator pedal and the brake pedal. From this point of view, the first vehicle of the present invention significantly improves the controllability of the vehicle.

The first vehicle of the present invention also has advantages on the energy efficiency as discussed below. The wheel braking utilizes the friction of the brake pad against the drive shaft and abandons the kinetic energy of the vehicle in the form of thermal energy, so as to brake the vehicle. This is not desirable from the viewpoint of energy efficiency. The regenerative braking by means of the motor, on the other hand, regenerates the kinetic energy of the vehicle in the form of electric power. This structure enables the regenerated energy to be effectively used for a subsequent drive. The first vehicle of the present invention implements the regenerative braking by means of the motor in a wide range, thereby significantly improving the energy efficiency of the vehicle.

The term 'speed reduction rate' in the specification hereof represents a parameter relating to the speed reduction of the vehicle. The speed reduction rate may be, for example, a deceleration, that is, a reduction rate of vehicle speed per unit time, or a braking force.

The term 'vehicle' in the specification hereof includes various types of vehicles. The first type is a vehicle having only the motor as the power source, that is, a pure electric vehicle. The second type is a hybrid vehicle having both the engine and the motor as the power source. The hybrid vehicle includes a parallel hybrid vehicle where the power output from the engine is transmitted directly to the drive shaft and a series hybrid vehicle where the power output from the engine is not directly transmitted to the drive shaft but is used only for generation of electric power. The principle of the present invention is applicable to both the parallel hybrid vehicle and the series hybrid vehicle. The present invention is also applicable to the structure having three or more engines or motors as the power source. The third type is a vehicle using only the engine for the power source of drive but also having the motor mounted thereon for the purpose of regenerative braking.

The vehicle of the present invention may further include a braking power source that applies a braking torque, other than the motor. In the vehicle with only the motor as the braking power source, the motor driving state specification unit sets the torque of the motor to attain all the desired speed reduction rate. In this case, a negative torque is generally set to the motor torque, and the motor carries out regenerative operation. In the vehicle with a plurality of braking power sources including the motor, on the other hand, the motor driving state specification unit sets the torque of the motor by taking into account the speed reduction rate attained by the other braking power sources. In this case, the speed reduction rate by the other braking power sources may be fixed to a predetermined value. Alternatively the motor torque may be subjected to feedback control, which makes the total speed reduction rate equal to a predetermined value.

The technique of the present invention is applicable to a diversity of vehicles having various structures.

The technique of the present invention is especially preferably applied to the vehicle further having an engine in a specific state of linkage that enables a braking torque to be applied to the drive shaft. In this structure, the selection unit selects the target gear ratio, based on the torques of the motor and the engine, and the motor driving state specification unit specifies the target driving state of the motor by taking into account the braking torque applied by the engine. The vehicle may be a hybrid vehicle that can use the motor for a drive or alternatively a vehicle that uses the motor only for the purposes other than a drive, for example, regenerative braking.

The hybrid vehicle typically has a motor as an auxiliary power source in addition to the engine. The motor is used, for example, at a start of the vehicle or during a low-speed drive and is utilized to supplement the insufficient torque of the engine. The parallel hybrid vehicle often has a small-sized motor having a relatively low rated output suitable for such purposes. In many cases, the motor mounted on the hybrid vehicle does not have the ability to sufficiently carry out the regenerative braking required by the driver.

The conventional vehicle using the motor not for a drive but for the other purposes, such as the regenerative braking, often has the small-sized motor, as in the case of the hybrid vehicle. The technique of the present invention ensures the braking control in a wide range by controlling both the transmission and the motor.

This technique is especially effective in the vehicles with the motor of the limited rating.

In the first vehicle of the present invention, the target gear ratio is selected by a variety of methods.

In accordance with one preferable embodiment, the vehicle further includes a storage unit, in which a relationship between the target speed reduction rate and the target gear ratio is stored. The selection unit selects the target gear ratio by referring to the storage unit.

In this arrangement, the relationship between the target speed reduction rate and the gear ratio is flexibly specified by taking into account the structure of the vehicle, the available range of the gear ratio by the transmission, and the rated output of the motor. This arrangement facilitates the selection of the target gear ratio in the braking process and accordingly reduces the load of the processing.

The relationship between the target speed reduction rate and the gear ratio may be specified by a diversity of settings, based on experiments or analyses. For example, the gear ratio may be set unequivocally corresponding to each target speed reduction rate, or alternatively a plurality of gear ratios may be mapped to each target speed reduction rate. In one example of the latter case, two gear ratios are allocated to each target speed reduction rate. This arrangement advantageously enables the selection of the more appropriate gear ratio by taking into account a variety of conditions other than the speed reduction rate, for example, the driving state of the vehicle.

One embodiment changes the relationship between the speed reduction rate and the minimum gear ratio used in each driving state of the vehicle, among the relations between the gear ratio and the speed reduction rate, in response to the specification by the driver. The stationary drive generally adopts the minimum gear ratio. When the driver tries to change the setting of the speed reduction rate, the driver often intends to change the speed reduction rate during the stationary drive, that is, to change the speed reduction rate at the minimum gear ratio. The arrangement of varying only the setting of the speed reduction rate at the minimum gear ratio simplifies the control procedure for attaining the speed reduction rate in response to the operation by the driver. In the case where the available gear ratio range is changed according to the driving state of the vehicle, the setting of the speed reduction rate may be varied only at the minimum gear ratio among the available gear ratios in each driving state.

Another embodiment varies not only the setting of the speed reduction rate at the minimum gear ratio but the speed reduction rate at all the gear ratios used in each driving state of the vehicle. In the case where the available gear ratio range is changed according to the driving state of the vehicle, the setting of the speed reduction rate at a certain gear ratio may not be fixed but be varied with the change of the available gear ratio range. For example, the speed reduction rate at the third speed in the case of a drive using the first through the fifth speeds may be different from the speed reduction rate at the third speed in the case of a drive using only the first through the third speeds.

The arrangement of varying only the speed reduction rate at the minimum gear ratio may be combined with the arrangement of varying the speed reduction rate at all the gear ratios. One exemplified control of such combination varies only the setting of the speed reduction rate at the fifth speed, which represents the minimum gear ratio, in the case of a drive using the first through the fifth speeds. The control varies the setting of the speed reduction rate at all the gear ratios in the case of a drive using only the first through the third speeds.

When the vehicle has a shift mechanism that enables the driver to change the available gear ratio range used during a drive, the speed reduction rate reflecting the requirement of the driver can be attained according to the selection of the shift mechanism. The shift mechanism may have a manual mode that allows the driver to manually change the gear ratio. In the case where the change of the gear ratio is manually implemented, the driver often requires the flexible braking and acceleration of the vehicle. In this case, the speed reduction rate may be changed to a larger value than the value selected in the case of the automatic control of the gear ratio.

In the first vehicle of the present invention, a variety of structures may be applied to the operation unit, through an operation of which the driver specifies the speed reduction rate in the process of braking with the motor.

In accordance with one embodiment, when the vehicle includes a changeover unit that changes over a selectable gear ratio range for the target gear ratio in response to a predetermined operation by the driver of the vehicle, the operation unit has a mechanism that ensures the specification of the speed reduction rate in response to another operation of the changeover unit that is different from the predetermined operation for the changeover.

This arrangement enables the target speed reduction rate to be set without unnecessarily providing any additional switch or related element in the vehicle. The changeover unit is generally disposed in a location that ensures the easy access of the driver. The operation unit of this structure accordingly has excellent controllability in the process of setting the speed reduction rate. The operation unit shares the structure with the conventionally provided changeover unit. The driver can thus set the speed reduction rate without feeling any incompatibility.

There is another advantage in the arrangement that the operation unit for setting the speed reduction rate shares the structure with the changeover unit for changing over the selectable gear ratio range. The first vehicle of the present invention controls both the gear ratio of the transmission and the regenerative braking of the motor, thereby attaining the braking control in a wide range of speed reduction rate. In the arrangement that the changeover unit and the operation unit are designed to have separate mechanisms, there is a possibility that the currently set target speed reduction rate is not attained in the gear ratio range selected by the operation of the changeover unit. In the vehicle of the above arrangement that the changeover unit and the operation unit are designed to share a common mechanism, however, such conflicting instructions are readily avoided. This arrangement accordingly ensures the adequate braking control.

A gearshift lever employed in the vehicle with a conventional automatic transmission is applicable for the changeover unit. In this case, the operation unit may be actualized by the structure that causes the gearshift lever to be operated in a movable area, which is different from a conventional movable area to changeover the available range of the change-speed gear. In accordance with one concrete structure, when a gearshift lever, which is slid along a predetermined groove to changeover the available range of the change-speed gear, is used for the changeover unit, the operation unit is constructed as a mechanism where the gearshift lever is slid along a second groove, which is provided in parallel with the predetermined groove, to set the speed reduction rate. In another example, the operation unit is constructed as a mechanism where the gearshift lever is slid along a rearward extension of the predetermined groove to set the speed reduction rate. In still another example, the speed reduction rate may be set by sliding the gearshift lever while keeping a preset switch on the gearshift lever in a pressed position, or by sliding the gearshift lever that is kept in a pull-up position or in a press-down position.

In some vehicles with the automatic transmission mounted thereon, the changeover unit may be provided on a steering wheel. In accordance with one embodiment, pressing a first switch provided on the steering wheel widens the available range of the change-speed gear in the automatic transmission, whereas pressing a second switch narrows the range. The operation unit of the present invention may utilize the structure of this changeover unit. For example, the speed reduction rate may be increased by a press of the first switch and decreased by a press of the second switch. The vehicle having the changeover unit provided on the steering wheel also has a gearshift lever; in general. In the case where the gearshift lever is in a predetermined position to set the target speed reduction rate, the first switch and the second switch function to set the speed reduction rate. In other cases, the first switch and the second switch function to changeover the available range of the change-speed gear in the automatic transmission. The use of the switches provided on the steering wheel advantageously enables the driver to quickly set the speed reduction rate while holding the steering wheel for a drive.

In accordance with one preferable application of the present invention, the operation unit included in the first vehicle has a mechanism that specifies the speed reduction rate by sliding a lever along a slide groove formed in advance. In this application, the mechanism of the operation unit may allow the setting of the speed reduction rate to be varied continuously according to a sliding operation of the lever. The operation unit may be constructed to share the structure with a mechanism for inputting a gearshift position that represents a selectable gear ratio range during a drive of the vehicle. The lever for setting the speed reduction rate may alternatively be provided separately from the mechanism for inputting the gearshift position.

In accordance with one preferable embodiment, the operation unit includes a first slide groove, along which the lever is slid during the drive of the vehicle, and a second slide groove, along which the lever is slid to specify the speed reduction rate, wherein the first slide groove and the second slide groove are disposed in series. In this embodiment, the operation unit may have a mechanism that increases the speed reduction rate with an increase in deviation from a movable range of the lever during the driver of the vehicle. In accordance with another preferable embodiment, the operation unit includes a first slide groove, along which the lever is slid during the drive of the vehicle, and a second slide groove, along which the lever is slid to specify the speed reduction rate, wherein the first slide groove and the second slide groove are disposed in parallel.

In the first vehicle of the present invention, a diversity of arrangements may be applied to set the target speed reduction rate.

In accordance with a first arrangement, the target speed reduction rate setting unit includes: a detection unit that measures a number of times of operation of the operation unit; and a unit that sets the target speed reduction rate in a stepwise manner according to the observed number of times of operation.

The first arrangement enables the moderate setting of the target speed reduction rate. The stepwise variation in target speed reduction rate enables the driver to change the target speed reduction rate in a wide range by an operation that requires only a relatively short time period. This arrangement thus ensures the excellent operatability.

In accordance with a second arrangement, the target speed reduction setting unit includes: a detection unit that measures an operation time of the operation unit; and a unit that sets the target speed reduction rate according to the observed operation time.

In the second arrangement, the target speed reduction rate may be varied relative to the operation time in a stepwise manner or alternatively in a continuous manner. In the latter case, the target speed reduction rate may be varied proportional to the operation time or non-linearly relative to the operation time. In one example, the target speed reduction rate may be varied relatively gently at the beginning of the operation and be quickly changed after elapse of a preset time period.

In any case, the target speed reduction rate setting unit of the second arrangement enables the target speed reduction rate to be set by one action, thereby ensuring the excellent operatability. The structure of continuously varying the target speed reduction rate according to the operation time ensures the minute setting of the target speed reduction rate reflecting the requirement of the driver.

In accordance with a third arrangement, the target speed reduction setting unit includes: a detection unit that measures a quantity of operation of the operation unit; and a unit that sets the target speed reduction rate according to the observed quantity of operation.

In the third arrangement, the target speed reduction rate may be varied relative to the quantity of operation in a stepwise manner or alternatively in a continuous manner. In any case, the target speed reduction rate setting unit of the third arrangement enables the driver to intuitively recognize the relationship between the operation and the speed reduction rate. The first through the third arrangements discussed above may be applied alone or in combination.

In accordance with one preferable application of the present invention, the first vehicle further includes: a switch that gives an instruction to execute braking with the specified speed reduction rate in response to a predetermined operation by the driver of the vehicle;

and a permission unit that allows operations of all the target speed reduction rate setting unit, the selection unit, the motor driving state specification unit, and the control unit only in the case where the braking execution instruction is given by means of the switch. In the vehicle of this application, the operation of the switch switches on and off the braking control with the specified speed reduction rate, that is, the currently set target speed reduction rate. When the switch is in ON position, the braking control is executed with the speed reduction rate specified by the driver. When the switch is in OFF position, on the other hand, braking is carried out with a predetermined speed reduction rate, irrespective of the specification of the speed reduction rate. This arrangement enables the driver to be clearly conscious of the execution of the braking control with the speed reduction rate corresponding to the desired setting of the driver. The driver can thus continue driving without feeling any incompatibility by the power source braking.

A diversity of structures may be applied for the switch.

In accordance with one embodiment, the vehicle further includes a changeover unit that changes over a selectable gear ratio range for the target gear ratio in response to a predetermined operation by the driver of the vehicle. In this structure, the switch has a mechanism that gives the braking execution instruction in response to another operation of the changeover unit that is different from the predetermined operation for the changeover.

This arrangement enables the on-off instruction regarding the execution of the braking control with the specified speed reduction rate to be given without unnecessarily providing any additional switch or related element in the vehicle. The changeover unit is generally disposed in a location that ensures the easy access of the driver. This arrangement thus ensures the excellent on-off operatability of the switch. The switch shares the structure with the conventionally provided changeover unit. The driver can thus carry out the switch operations without feeling any remarkable incompatibility.

In the case where a gearshift lever is applied for the changeover unit, for example, the switch-on and -off operations may be carried out by operating the gearshift lever in a movable area, which is different from a conventional movable area to changeover the available range of the change-speed gear. In accordance with one concrete structure, when a gearshift lever, which is slid along a predetermined groove to changeover the available range of the change-speed gear, is used for the changeover unit, the gearshift lever is moved in a direction crossing the predetermined groove, so as to set the switch in ON position or in OFF position. The switch may share the structure with the operation unit for setting the speed reduction rate. In this case, one applicable design causes the switch to be set in ON position by moving the gearshift lever to a specific position where the gearshift lever functions as the operation unit discussed above. This arrangement actualizes the switch that has the excellent operatability and makes the driver feel lesser incompatible, while ensuring the setting of the target speed reduction rate.

In accordance with another preferable application of the first vehicle of the present invention, the target speed reduction rate setting unit includes: a decision unit that determines whether the operation of the operation unit is valid or invalid; and a prohibition unit that prohibits the setting of the target speed reduction rate from being changed when it is determined that the operation is invalid.

The vehicle of this arrangement effectively prevents the setting of the target speed reduction rate from being changed by a wrong, unintentional operation of the driver. This arrangement thus prevents the braking control against the requirement of the driver and improves the controllability and the driving stability of the first vehicle of the present invention. This prohibition unit is especially effective in the case where the operation unit for changing the setting of the speed reduction rate is provided on a specific part that allows an unintentional touch of the driver, for example, on a steering wheel.

A variety of modifications may be applied for this arrangement.

In accordance with one embodiment, in the case where the operation unit has a mechanism that allows the driver to give an instruction to increase the speed reduction rate simultaneously with an instruction to decrease the speed reduction rate, the decision unit determines that the operation of the operation unit is invalid in the case where the increase instruction is given simultaneously with the decrease instruction.

In the vehicle with the switch for giving the instruction to execute braking with the specified speed reduction rate as discussed above, the decision unit may determine that the operation of the operation unit is invalid when the switch is in OFF position.

In the first vehicle of the present invention, the operation unit may set the speed reduction rate as an absolute value.

It is, however, preferable that the operation unit has a mechanism that gives an instruction to vary the speed reduction rate, and the target speed reduction rate setting unit varies the speed reduction rate relative to a preset initial speed reduction rate as a standard level, in response to the operation of the operation unit, thereby setting the target speed reduction rate.

This arrangement enables the driver to regulate the speed reduction rate as an addition to or a subtraction from the initial speed reduction rate, and thereby facilitates the setting of the adequate target speed reduction rate. In the structure of setting the speed reduction rate as an absolute value, it is difficult for the driver to select an appropriate numeral at the beginning. There is accordingly a possibility that the specified speed reduction rate is extremely low or high. The arrangement of regulating the speed reduction rate as an addition to or a subtraction from the initial speed reduction rate, on the other hand, effectively prevents the specified speed reduction rate from being extremely low or high against the requirement of the driver.

In this arrangement, a variety of settings may be applied for the initial speed reduction rate.

In the case where the first vehicle further includes: a switch that gives an instruction to execute braking with the specified speed reduction rate in response to a predetermined operation by the driver of the vehicle; a permission unit that allows operations of all the target speed reduction rate setting unit, the selection unit, the motor driving state specification unit, and the control unit in the case where the braking execution instruction is given; and an ordinary braking unit that carries out braking with a predetermined speed reduction rate, irrespective of the operation of the operation unit, in the case where the braking execution instruction is not given, the initial speed reduction rate may be set equal to the predetermined speed reduction rate employed by the ordinary braking unit.

This arrangement enables the driver to regulate the speed reduction rate relative to, as the standard, the predetermined speed reduction rate employed in the process of ordinary braking. The driver can thus intuitively understand the relationship between the current setting and the actual speed reduction rate and thus readily set the adequate speed reduction rate. At the time point when the braking control with the specified speed reduction rate is switched on by the operation of the switch, the speed reduction rate is equal to the initial speed reduction rate, that is, the predetermined speed reduction rate employed in the process of ordinary braking. This effectively prevents the driver from feeling any shock due to the switch on-off operations. The vehicle of this arrangement ensures the on-off of the braking control with the specified speed reduction rate without making the driver and any passenger feel incompatible, and thereby attains a smooth drive.

The vehicle of the above arrangement may run while the switch is kept in ON position, that is, while the braking control with the currently set target speed reduction rate is kept on. Since the initial speed reduction rate is equal to the predetermined speed reduction rate employed in the process of ordinary braking, the driver can drive the vehicle with the switch kept in ON position without feeling any incompatibility. When the driver needs to adjust the speed reduction rate, this arrangement enables the speed reduction rate to be regulated quickly without the on operation of the switch.

In the vehicle having the above structure, the initial speed reduction rate may be set to be significantly greater than the predetermined speed reduction rate employed by the ordinary braking unit.

The driver generally feels the necessity of the adjustment of the speed reduction rate in the case where there is an insufficient speed reduction rate in the process of ordinary braking. The arrangement of setting the initial speed reduction rate to be significantly greater than the predetermined speed reduction rate employed in the process of ordinary braking enables the speed reduction rate desired by the driver to be attained quickly. An appropriate value, which has been determined according to the type of the vehicle, for example, based on experiments, may be set to the supplement of the predetermined speed reduction rate. Alternatively the driver may set a desired value reflecting the own feeling to the supplement by a predetermined operation.

In the structure that enables the speed reduction rate to be set relative to the predetermined initial speed reduction rate as the standard, it is preferable, that the target speed reduction rate setting unit includes: a cancellation decision unit that determines whether or not the target speed reduction rate is to be cancelled; and a setting cancellation unit that resets the target speed reduction rate to the initial speed reduction rate when it is determined that the target speed reduction rate is to be cancelled.

In the vehicle of this arrangement, the setting cancellation unit enables the setting of the target speed reduction rate to be readily returned to the initial speed reduction rate. For example, when the driver repeatedly carries out the operation for setting the target speed reduction rate and makes the current setting unclear, this arrangement enables the setting of the target speed reduction rate to be started all over again relative to the initial value as the standard. In the event that a value significantly deviating from the initial speed reduction rate is set to the target speed reduction rate, this arrangement enables the target speed reduction rate to be returned to the initial value quickly and readily, thereby ensuring the excellent controllability.

A variety of structures may be applied for the cancellation decision unit.

In accordance with one embodiment, when the first vehicle further includes a switch that gives an instruction to execute braking with the specified speed reduction rate in response to a predetermined operation by the driver of the vehicle, the cancellation decision unit determines that the target speed reduction rate is to be cancelled in response to an operation of the switch.

The setting may be cancelled when the position of the switch is changed from ON to OFF or vice versa, that is, from OFF to ON.

The driver often forgets the previous setting of the target speed reduction rate after a long time period has elapsed since the previous setting. Under such circumstances, if the braking control with the previously set target speed reduction rate is carried out in response to the on operation of the switch, there is a fair possibility that the braking control is carried out with the speed reduction rate unexpected by the driver. The above arrangement causes the target speed reduction rate to be returned to the initial value every time the switch is set in ON position. This effectively prevents the braking control against the requirement of the driver and thus ensures a drive of excellent driving stability without making the driver feel incompatible.

In accordance with another embodiment, when the first vehicle further includes a failure detection unit that detects a failure of the operation unit, the cancellation decision unit determines that the target speed reduction rate is to be cancelled in response to detection of the failure.

The arrangement of validating the setting of the target speed reduction rate under the failure condition may lead to the setting of an extremely high value or low value to the target speed reduction rate. The vehicle of the above arrangement effectively eliminates such possibility and ensures a drive of excellent driving stability without making the driver feel incompatible.

In accordance with still another preferable application of the first vehicle of the present invention, the selection unit selects the target gear ratio with preference to a preset initial value.

There may be a number of gear ratios that attain the speed reduction rate reflecting the requirement of the driver. The vehicle of the above arrangement sets the gear ratio with preference to the preset initial value. A variety of settings may be applied for the initial value. For example, the gear ratio suitable for acceleration following the braking control may be set to the initial value. In another example, the gear ratio that ensures a wide range of practical speed reduction rate may be set to the initial value. The above arrangement provides the vehicle with characteristics corresponding to the setting of the initial value and thus improves the controllability and the ride of the vehicle. There is generally some latitude in target speed reduction rate specified by the driver. In the case where the lower limit of the latitude is set to the target speed reduction rate, there are generally a large number of gear ratios that attain the target speed reduction rate. The arrangement of setting the gear ratio with preference to the preset initial value is thus especially effective in such cases.

In accordance with one embodiment, when the first vehicle further includes a switch that gives an on-off instruction to execute braking with the specified speed reduction rate in response to a predetermined operation by the driver of the vehicle, the preset initial value is equal to a previous gear ratio immediately before the braking execution instruction is given by means of the switch.

This arrangement ensures the braking control with the initial value set equal to the previous gear ratio immediately before the braking execution instruction is given by the operation of the switch. This prevents the gear ratio of the transmission from being changed in response to the on operation of the switch and thus ensures the braking control with the currently set target speed reduction rate without making the driver feel incompatible.

In accordance with another preferable application of the present invention, the first vehicle further includes an information unit that informs the driver of the currently set target speed reduction rate.

The information unit may inform the driver of the target speed reduction rate in the form of a visually recognizable display or in an aurally recognizable form. The informed target speed reduction rate may be an absolute value or a variation from a preset initial value.

When the vehicle includes the switch for giving the instruction to execute braking with the specified speed reduction rate, it is preferable that the vehicle has an information unit that informs the driver of a result of the instruction whether or not to execute the braking with the specified speed reduction rate.

This arrangement enables the driver to readily check the on-off state of the switch and thus effectively prevents wrong operations. The information unit may be a visual display or a sound alarm.

In accordance with still another preferable application of the present invention, the first vehicle further includes: a failure detection unit that detects a failure of the operation unit; and an information unit that informs the driver of detection of the failure.

The vehicle of this arrangement enables the driver to readily check the operation unit for a failure. The driver can thus continue driving without feeling any incompatibility even when the operation unit fails. The information unit may be a visual display, a sound alarm, or any other suitable form. In the vehicle having a display unit that displays the currently set speed reduction rate, the detection of a failure may be displayed in a different form, for example, in a flash, for the purpose of information.

In accordance with another preferable application of the present invention, the first vehicle further includes: a gearshift position input unit that inputs a gearshift position, which represents a selectable gear ratio range during a drive of the vehicle; and a storage unit in which speed reduction rates of the vehicle are stored in advance corresponding to gearshift positions. In this structure, the target speed reduction rate setting unit sets the target speed reduction rate in response to the operation of the operation unit and the input gearshift position by referring to the storage unit. The selection unit selects the target gear ratio that attains the target speed reduction rate with preference to an energy recovery rate in the course of braking, irrespective of the gearshift position.

In the vehicle of this arrangement, the gear ratio of the transmission used in the braking process is set with preference to the energy recovery rate, irrespective of the selectable gear ratio range specified by the gearshift position input unit. In the case where the advantageous gear ratio from the viewpoint of energy recovery is present out of the selectable gear ratio range specified by the driver, the vehicle of the above arrangement enables the braking control with the advantageous gear ratio. This arrangement enhances the energy recovery rate of the vehicle during the braking control. The energy recovery rate here represents an efficiency of regeneration carried out by the motor to regenerate the kinetic energy of the vehicle.

The vehicle of this arrangement attains the speed reduction rate previously set according to the gear ratio range. The driver specifies the selectable range of gear ratio, which leads to the braking control with the desired speed reduction rate. The gear ratio of the transmission during a drive of the vehicle is restricted in the selectable gear ratio range specified by the driver. This arrangement enables the vehicle to be quickly accelerated with an acceleration reflecting the requirement of the driver, after the braking control.

The vehicle of this arrangement allows selection of the gear ratio in the braking process out of the specified selectable gear ratio range, thus attaining the speed reduction and acceleration reflecting the requirement of the driver while enhancing the energy recovery rate of the vehicle. This improves the effectiveness of the power source braking and enhances the controllability of the vehicle.

In the structure of selecting the gear ratio with preference to the energy recovery rate, it is preferable that the first vehicle further includes: an accumulator unit; and a detection unit that measures a remaining charge of the accumulator unit. In this case, the selection unit selects the target gear ratio according to the observed remaining charge of the accumulator unit.

In the case where the accumulator unit has a relatively low remaining charge, the gear ratio is selected to increase the quantity of electric power regenerated from the kinetic energy of the vehicle. In the case where the accumulator has a relatively high remaining charge, on the other hand, the gear ratio is selected to decrease the quantity of regenerated electric power. This arrangement advantageously causes the remaining charge of the accumulator unit to be kept in a favorable state. The selection of the gear ratio with preference to the energy recovery rate is not synonymous with the selection of the gear ratio that gives the maximum quantity of regeneration, but means the selection of the gear ratio that ensures regeneration of an adequate quantity of energy according to the driving conditions of the vehicle.

It is also preferable that the selection unit selects the target gear ratio in a specific range that prevents an extreme change of driving condition of a power source of the vehicle in a transient time from braking control to another driving state of the vehicle.

In the vehicle of this arrangement, the gear ratio set with preference to the energy recovery rate is not selected unconditionally but is limited in a specific range. When the driver specifies the selectable gear ratio range, the gear ratio adopted for a drive following the braking control is within the selectable gear ratio range. In the case where the braking control is carried out with the gear ratio that significantly deviates from the specified gear ratio range, the gear ratio of the transmission is drastically changed in a transient time from the braking control to another driving state. The driving conditions of the power source are remarkably varied with the drastic change of the gear ratio. If the variation is extremely large, some troubles occur; for example, a significant vibration occurs in the vehicle or the driving state of the power source becomes unstable. In the vehicle of the above arrangement, the gear ratio is selected in the specific range that is set by taking into account the variation. This arrangement effectively prevents the occurrence of possible troubles in the transient time from the braking control to another driving state.

In the vehicle of the above arrangement, it is also preferable that the transmission attains a plurality of gear ratios set stepwise, and the selection unit selects the target gear ratio by allowing a deviation from the selectable gear ratio range corresponding to the input gearshift position by one step.

The vehicle of this arrangement facilitates the control of the transmission in the transient time from braking to another driving state. As described previously, when the driver specifies the selectable gear ratio range, the gear ratio adopted for a drive subsequent to the braking control is within the selectable gear ratio range. In the case where the braking control is carried out with the gear ratio that deviates from the specified gear ratio range by several steps, it is necessary to change the gear ratio of the transmission over the several steps in the transient period from the braking control to another driving state. The control actualizing such a change is undesirably complicated, and the change of the gear ratio may require a relatively long time. In the vehicle of the above arrangement, the selected gear ratio does not deviate from the specified gear ratio range by two or more steps. This arrangement avoids such complicated control and ensures the quick change of the gear ratio.

The present invention is also directed to a second vehicle that includes a motor connected with a drive shaft and is braked by means of a torque output from the motor. The second vehicle includes: an operation unit, through an operation of which a driver of the vehicle specifies a speed reduction rate in a process of braking with the motor; a target speed reduction rate setting unit that sets a target speed reduction rate in response to the operation of the operation unit; a motor driving state specification unit that specifies a target driving state of the motor, in order to enable a braking force that attains the currently set target speed reduction rate to be applied to the drive shaft; a control unit that drives the motor in the specified target driving state; and a variation unit that varies a possible range of setting of the target speed reduction rate according to a driving condition of the vehicle.

In the second vehicle of the present invention, the possible range of setting of the target speed reduction rate is varied according to the driving conditions of the vehicle. This arrangement attains the adequate speed reduction rate according to the driving conditions and thereby significantly improves the controllability and the driving stability of he vehicle.

The possible range of the speed reduction rate, in which the vehicle is stably driven, varies according to the driving state of the vehicle. By way of example, in the case where the road surface has a very slippery condition, braking with a higher speed reduction rate than required may cause a slip or a skid of the vehicle. In another example, in the case where the traffic is heavy to make the distance between adjacent vehicles on the same traffic lane relatively narrow, braking with a lower speed reduction rate than required needs a change of the foot position to the brake pedal, in order to compensate for the insufficiency of the speed reduction rate. This may significantly damage the advantage of the power-source braking.

The second vehicle of the present invention changes the possible range of setting of the target speed reduction rate according to the driving conditions of the vehicle and thereby ensures the braking control with the adequate speed reduction rate corresponding to the current driving conditions. The second vehicle of the present invention thus enhances the driving stability of the vehicle.

Like the first vehicle discussed above, the second vehicle of the present invention may be an electric vehicle, a hybrid vehicle, or any other suitable vehicle.

In accordance with one preferable application of the present invention, the second vehicle further includes: a transmission that enables selection of a plurality of gear ratios in a process of power transmission; a selection unit that selects a target gear ratio among a plurality of available gear ratios, the target gear ratio enabling the currently set target speed reduction rate to be attained by the torque of the motor; and a transmission control unit that controls the transmission to attain the target gear ratio.

The selection unit selects an adequate gear ratio according to the speed reduction rate specified by the driver and the magnitude of the torque output from the motor. Controlling the target torque of the motor at the adequate gear ratio ensures the speed reduction rate required by the driver. The vehicle of the above arrangement totally controls both the transmission and the motor, thereby implementing the braking in response to the specification by the driver in a wide range.

The selection unit and the transmission control unit here represent the units that respectively carry out selection and control in a wide sense. The selection unit is not restricted to the unit that selects an only target gear ratio. When there are a plurality of gear ratios mapped to the target speed reduction rate, the selection unit may select an optimum gear ratio among the plurality of gear ratios or select all the plurality of gear ratios as the target gear ratio. The transmission control unit may omit the changeover control of the gear ratio in the case where the selected target gear ratio has already been attained.

As described previously, the technique of the present invention is applicable to a diversity of vehicles. The technique of the present invention is especially preferably applied to the vehicle further having an engine in a specific state of linkage that enables a power to be output to the drive shaft. In this structure, the motor driving state specification unit sets a target torque of the motor by taking into account a braking torque applied by the engine.

In this structure, it is preferable that the second vehicle has a connection mechanism that connects and disconnects transmission of power from the engine to the drive shaft. It is more preferable that the second vehicle further includes a connection mechanism control unit that controls the connection mechanism to disconnect the transmission of power between the engine and the drive shaft in a process of braking with the torque of the motor.

The vehicle of the present invention carries out braking with electric power regenerated by the motor. When the vehicle has an engine, a braking force is added by engine brake. The engine brake causes the rotational power of the drive shaft to be consumed by the pumping and the friction of the engine, so as to implement the braking control. The engine brake reduces the quantity of regenerated electric power corresponding to its braking force.

The vehicle of the above arrangement enables the transmission of power from the engine to the drive shaft to be connected and disconnected. Disconnection of the power transmission in the braking process increases the quantity of regenerated electric power, and ensures the effective use of the kinetic energy of the vehicle. The connection and disconnection of the power may be carried out manually. The unit for controlling the connection mechanism, however, preferably ensures the more appropriate regeneration of energy.

The connection mechanism of the power has another advantage, that is, regulation of the braking force by the motor and engine brake. While the connection mechanism is in a connected position to add the braking force from the engine to the drive shaft, the drive shaft receives both the braking force by the engine brake and the braking force by the regenerative braking with the motor. This gives a large total braking force. In the connected position of the connection mechanism, the braking force by the engine brake is continuously added to raise the lower limit of the total braking force. Setting the connection mechanism in a disconnected position is accordingly desirable when it is required to decrease the lower limit of the total braking force.

In the vehicle of the above arrangement, controlling the connection mechanism regulates the upper limit and the lower limit of the braking force applicable to the drive shaft. This ensures the adequate power source braking. When a large braking force is required, the foot braking is generally combined with the power source braking. From the viewpoints of energy efficiency and regulation of the lower limit of the power source braking, it is highly effective to set the connection mechanism in the disconnected position in the braking process. Such control is especially effective to prevent the occurrence of a slip or a skid as discussed later.

The vehicle having the connection mechanism of the power may further include the transmission, the selection unit, and the transmission control unit discussed above. In one structure of this case, setting the connection mechanism in the disconnected position causes the gear ratio to have no effects on the braking control. In other words, any value may be set to the gear ratio under such conditions. As mentioned previously, the selection unit and the transmission control unit of the present invention carry out the selection and the control in a wide sense. In the structure that causes the gear ratio to have no effects on the braking control, the selection unit selects all the gear ratios as the target gear ratio. In this case, since the target gear ratio has already been attained, the transmission control unit always omits the changeover control of the gear ratio.

In the second vehicle of the present invention, a variety of techniques may be applied to vary the possible range of setting of the target speed reduction rate. One available technique widens the possible range of setting of the target speed reduction rate when the vehicle is in a specific driving state that ensures the sufficient driving stability even under the condition of varying speed reduction rate in a wide range. Another available technique wholly shifts the possible range of setting of the target speed reduction rate. For example, when it is determined that the vehicle runs on a down slope, the possible range of setting of the target speed reduction rate is wholly shifted in an increasing direction.

In accordance with one preferable application of the second vehicle of the present invention, the variation unit for varying the possible range of setting of the target speed reduction rate includes: a decision unit that determines whether or not a restriction condition to restrict the target speed reduction rate is fulfilled; and a restriction unit that actually restricts the target speed reduction rate when the restriction condition is fulfilled.

This application narrows the possible range of setting of the target speed reduction rate.

The vehicle of the above arrangement effectively prevents the driver from setting an excessively large or small speed reduction rate than required, thereby improving the driving stability of the vehicle. The range of the speed reduction rate that ensures the sufficient driving stability of the vehicle often depends upon the driving state of the vehicle. In the vehicle of the above arrangement, the possible range of setting of the target speed reduction rate is varied flexibly and appropriately according to the driving state of the vehicle. The possible range of setting of the target speed reduction rate may be narrowed by lowering the upper limit or alternatively by raising the lower limit. Any appropriate method should be adopted according to the driving state of the vehicle.

In the second vehicle of the present invention, a variety of techniques are applicable to determine whether or not the target speed reduction rate is to be restricted.

In accordance with a first embodiment, the decision unit determines that the restriction condition is fulfilled when there is a slip occurring in driving wheels connected with the drive shaft.

Braking with a high speed reduction rate on a road surface having a relatively low friction coefficient, for example, the snow-covered road or the wet road, may cause a slip or a skid of the vehicle. A slip or a skid of the driving wheels may be set to the restriction condition. This prevents the occurrence of a slip or a skid and improves the driving stability of the vehicle.

The occurrence of a slip or a skid may be detected by a variety of methods. One available method measures the numbers of rotations of plural driving wheels and determines the occurrence of a slip or a skid when there is a difference of or over a preset level between the observed numbers of rotations of the respective driving wheels. The second vehicle of the present invention has the motor connected with the drive shaft, so that the occurrence of a slip or a skid may be determined by variations of the torque and the revolving speed of the motor. In a vehicle with an acceleration sensor mounted thereon, the occurrence of a slip or a skid may be determined, based on the output of the acceleration sensor. The determination of the occurrence of a slip or a skid may be carried out not only at the time of braking but at the time of ordinary driving.

In accordance with a second embodiment, the decision unit carries out the determination, based on an operation of a switch that gives an instruction to restrict the possible range of setting of the target speed reduction rate.

In the vehicle of the above configuration, the driver intentionally operates the switch to restrict the possible range of setting of the target speed reduction rate. For example, when determining that the road surface has a relatively low friction coefficient, the driver operates the switch to prevent the possible occurrence of a slip or a skid. This arrangement thus further improves the driving stability of the vehicle. The switch here is different from the operation unit, through an operation of which the driver specifies the speed reduction rate. The operation of the switch enables the driver to change the setting of the speed reduction rate without a fear of the occurrence of a slip or a skid.

The switch here is not restricted to the above switch that is operated when the driver determines that the road surface has a relatively low friction coefficient. Other switches may be provided for a variety of purposes. The target speed reduction rate may be restricted in response to ON position of the switch or alternatively in response to OFF position of the switch. The target speed reduction rate may be restricted in a stepwise manner in response to the operation of the switch.

The restriction of the target speed reduction rate may be carried out under a variety of conditions. For example, in a vehicle having a specific sensor that measures the distances from adjacent vehicles on the same traffic lane, the target speed reduction rate is restricted, based on the distance of or below a predetermined level set as the restriction condition. In another example, in a vehicle having a specific apparatus that verifies the position of the vehicle in topography, the target speed reduction rate is restricted according to the variation in height of the road, on which the vehicle runs.

A variety of methods are applicable to restrict the target speed reduction rate. One method wholly restricts the variation of the target speed reduction rate relative to each quantity of operation of the operation unit for specifying the speed reduction rate. This arrangement leads to a gentler variation of the target speed reduction rate per unit quantity of operation of the operation unit.

In accordance with another preferable embodiment, the restriction unit restricts the target speed reduction rate to be not higher than a predetermined upper limit.

This arrangement advantageously facilitates the restriction of the target speed reduction rate. The variation of the target speed reduction rate per unit quantity of operation of the operation unit is fixed, irrespective of restriction or non-restriction of the target speed reduction rate. The driver can thus readily set the desired speed reduction rate.

In accordance with still another preferable embodiment, the restriction unit carries out feedback control to restrict the target speed reduction rate until the restriction condition becomes unfulfilled.

This arrangement restricts the target speed reduction rate to a specific range where the restriction condition is not fulfilled, thus further improving the driving stability of the vehicle. This arrangement does not reduce the speed reduction rate unnecessarily. For example, it is assumed that the occurrence of a slip or a skid of the driving wheels is set to the condition for restricting the target speed reduction rate. The speed reduction rate that prevents the occurrence of a slip or a skid depends upon the friction coefficient of the road surface. In the vehicle that carries out the restriction through the feedback control, the target speed reduction rate is gradually lowered until no occurrence of a slip or a skid is assured. This arrangement effectively prevents the occurrence of a slip or a skid without reducing the target speed reduction rate unnecessarily.

Although the above description regards the case of restricting the target speed reduction rate, any of the above applications may be adopted in the vehicle having a unit of extending the target speed reduction rate.

In accordance with another preferable application of the present invention, the second vehicle further includes an information unit that informs the driver of a variation in possible range of setting of the target speed reduction rate.

This arrangement enables the driver to drive the vehicle without feeling any incompatibility. The information unit may inform the driver of the widened range of setting of the target speed reduction rate or the narrowed range of setting of the target speed reduction rate. In the former case, the driver recognizes that the speed reduction rate may be set in a wider range, and drives the vehicle with a desired speed reduction rate. In the latter case, the driver is informed of the possibility that the specified speed reduction rate is not attained. This arrangement favorably reduces the incompatible feeling of the driver and the fear of a possible failure in the braking process.

The information unit may be a visual display or a sound alarm. In the vehicle having a display unit that displays the speed reduction rate set by the driver, the varied range of the target speed reduction rate may be displayed in a different form, for example, in a flash, for the purpose of information.

In any of the vehicles with the transmission discussed above, the following procedure may be applied to set and regulate the gear ratio.

The motor and the torque may be designed to have a plurality of combinations that attain a predetermined speed reduction rate at a preset vehicle speed, among a variety of combinations of the torque of the power source and the gear ratio of the transmission. Namely there are a plurality of combinations that attain the predetermined target speed reduction rate at the preset vehicle speed. This arrangement ensures the braking control with an optimum combination according to the driving state of the vehicle, and accordingly allows the braking with the motor to be utilized in a wide range of driving conditions.

In the case where both the motor and the engine can be utilized for braking, it is desirable that the plurality of combinations include those corresponding to the regenerative operation of the motor and those corresponding to the power operation of the motor.

When the vehicle has an engine as the power source, the braking control may be carried out with the torques of both the motor and the engine. According to the gear ratio, the braking torque of the engine may be insufficient or excess to the desired speed reduction rate. In the former case, the motor performs the regenerative operation to supplement the insufficiency of the speed reduction rate, so as to implement the desired braking control. In the latter case, the motor performs the power operation to ensure the braking control with the desired speed reduction rate. Even when a relatively small gear ratio is adopted for a drive, the braking control with the motor carrying out the regenerative operation enables the desired speed reduction rate to be attained without the changeover of the gear ratio, thus ensuring a smooth drive. The braking control with the motor carrying out the power operation during a drive, on the other hand, advantageously enables the quick acceleration subsequent to the deceleration.

In the above structure, the selection of the gear ratio is carried out, for example, based on the remaining charge of the accumulator unit. It is here assumed that there are a plurality of target gear ratios. One exemplified procedure selects a gear ratio corresponding to the power operation of the motor in the case where the remaining charge is not less than a predetermined level, while otherwise selecting a gear ratio corresponding to the regenerative operation of the motor. This arrangement enables the braking control to be carried out with the combination corresponding to the power operation of the motor, when the accumulator unit has the remaining charge close to its full charge level. The vehicle of such arrangement thus carries out the braking control with the motor, irrespective of the charge level of the accumulator unit.

The technique of the present invention is also actualized by a method of controlling operation of any of the vehicles discussed above.

BRIEF DESCRIPTION OF THE DRAWINGS

FIG. 3 shows the relationship between the state of engagement of the respective clutches, brakes, and one-way clutches and the position of the change-speed gear;

FIG. 5 shows operation elements mounted on a steering wheel;

BEST MODES OF CARRYING OUT THE INVENTION

Embodiments of the present invention are explained as:
A. First Embodiment
  A1. Structure of Apparatus
  A2. Generation Operations
  A3. Drive Control Process
  A4. First Modification of First Embodiment A5. Second Modification of First Embodiment
A6. Third Modification of First Embodiment
B. Second Embodiment
  B1. Structure of Apparatus
  B2. Drive Control Process
  B3. First Modification of Second Embodiment
  B4. Second Modification of Second Embodiment
  B5. Third Modification of Second Embodiment
  B6. Fourth Modification of Second Embodiment
C. Third Embodiment
D. Fourth Embodiment
E. Other Modifications The embodiments are discussed below in detail in the above order.

A. First Embodiment
A1. Structure of Apparatus

Figure 1:
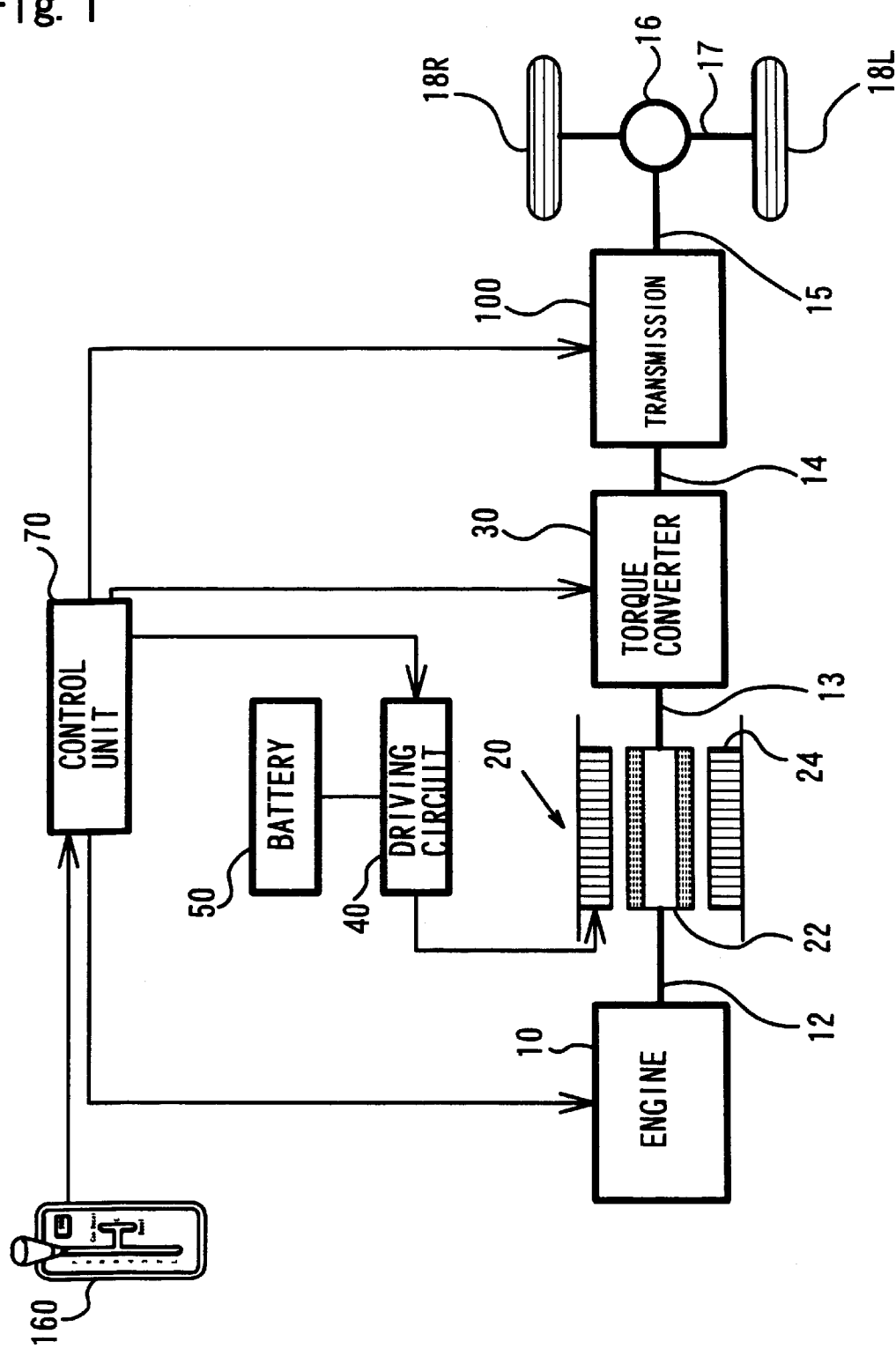
FIG. 1 schematically illustrates the structure of a hybrid vehicle in one embodiment according to the present invention.

FIG. 1 schematically illustrates the structure of a hybrid vehicle in one embodiment according to the present invention. The hybrid vehicle of the embodiment has an engine 10 and a motor 20 as the power source thereof. A power system of the hybrid vehicle of this embodiment includes the engine 10, the motor 20, a torque converter 30, and a transmission 100 that are connected in series. More specifically, the motor 20 is linked with a crankshaft 12 of the engine 10, whereas a rotating shaft 13 of the motor 20 is linked with the torque converter 30. An output shaft 14 of the torque converter 30 is linked with the transmission 100. An output shaft 15 of the transmission 100 is linked with an axle 17 via a differential gear 16. A left driving wheel 18L and a right driving wheel 18R are attached to the axle 17.

The engine 10 is an ordinary gasoline engine. The engine 10 has a mechanism of regulating the open and close timings of an intake valve, which causes a gaseous mixture of gasoline and the air to be sucked into a cylinder, and an exhaust valve, which causes the hot combustion exhaust to be discharged from the cylinder, relative to vertical movements of a piston (hereinafter this mechanism is referred to as the VVT mechanism). The structure of the VVT mechanism is known in the art and is thus not described here in detail. The VVT mechanism regulates the open and close timings of the intake and exhaust valves to delay the actual closing operations of the respective valves relative to the vertical movements of the piston, thereby reducing the pumping loss of the engine 10. This results in decreasing the braking force by engine brake. The VVT mechanism also reduces the torque to be output from the motor 20 in the course of motoring the engine 10. The VVT mechanism controls the open and close timings of the respective valves to attain the highest combustion efficiency according to the speed of the engine 10 in the process of outputting power through combustion of gasoline.

The motor 20 is a three-phase synchronous motor, which includes a rotor 22 with a plurality of permanent magnets attached on the circumferential face thereof and a stator 24 with three-phase coils wound thereon to generate a revolving magnetic field. The motor 20 is driven to rotate by the interaction between the magnetic field generated by the permanent magnets attached to the rotor 22 and the magnetic field generated by the three-phase coils wound on the stator 24. When the rotor 22 is rotated by an external force, the interaction between these magnetic fields causes an electromotive force between both ends of the three-phase coils. A sine wave polarized motor, in which the magnetic flux density between the rotor 22 and the stator 24 is distributed in the form of a sine function in the circumferential direction, is applicable for the motor 20. A non-sine wave polarized motor that can output a relatively large torque is, however, applied for the motor 20 in this embodiment.

The stator 24 is electrically connected to a battery 50 via a driving circuit 40. The driving circuit 40 is constructed as a transistor inverter that: includes a plural pairs of transistors, one as a source and the other as a sink, provided respectively for the three phases of the motor 20. As described in FIG. 1, the driving circuit 40 is electrically connected with a control unit 70. The control unit 70 carries out PWM (pulse width modulation) control of the on- and off-time of the respective transistors included in the driving circuit 40. The PWM control causes quasi three-phase alternating currents to be output from the battery 50 as the power source and flow through the three-phase coils of the stator 24, so as to generate a revolving magnetic field. The motor 20 functions either as a motor or a generator by means of the revolving magnetic field.

The torque converter 30 is a known power transmission mechanism by taking advantage of a fluid. The input shaft of the torque converter 30, that is, the output shaft 13 of the motor 20, is not mechanically linked with the output shaft 14 of the torque converter 30, so that the input and output shafts 13 and 14 of the torque converter 30 are rotatable in the presence of a slide. A turbine with a plurality of blades is attached respectively to the input and output shafts 13 and 14 of the torque converter 30. The turbines set on the input and output shafts 13 and 14 are arranged to face each other in the torque converter 30. The torque converter 30 has a sealed structure that is filled with transmission oil. The transmission oil works on the respective turbines, so that power is transmitted from one rotating shaft to the other rotating shaft. Since these rotating shafts are rotatable in the presence of a slide, the power input from one rotating shaft is converted to a different combination of revolving speed and torque and transmitted to the other rotating shaft.

Figure 2:
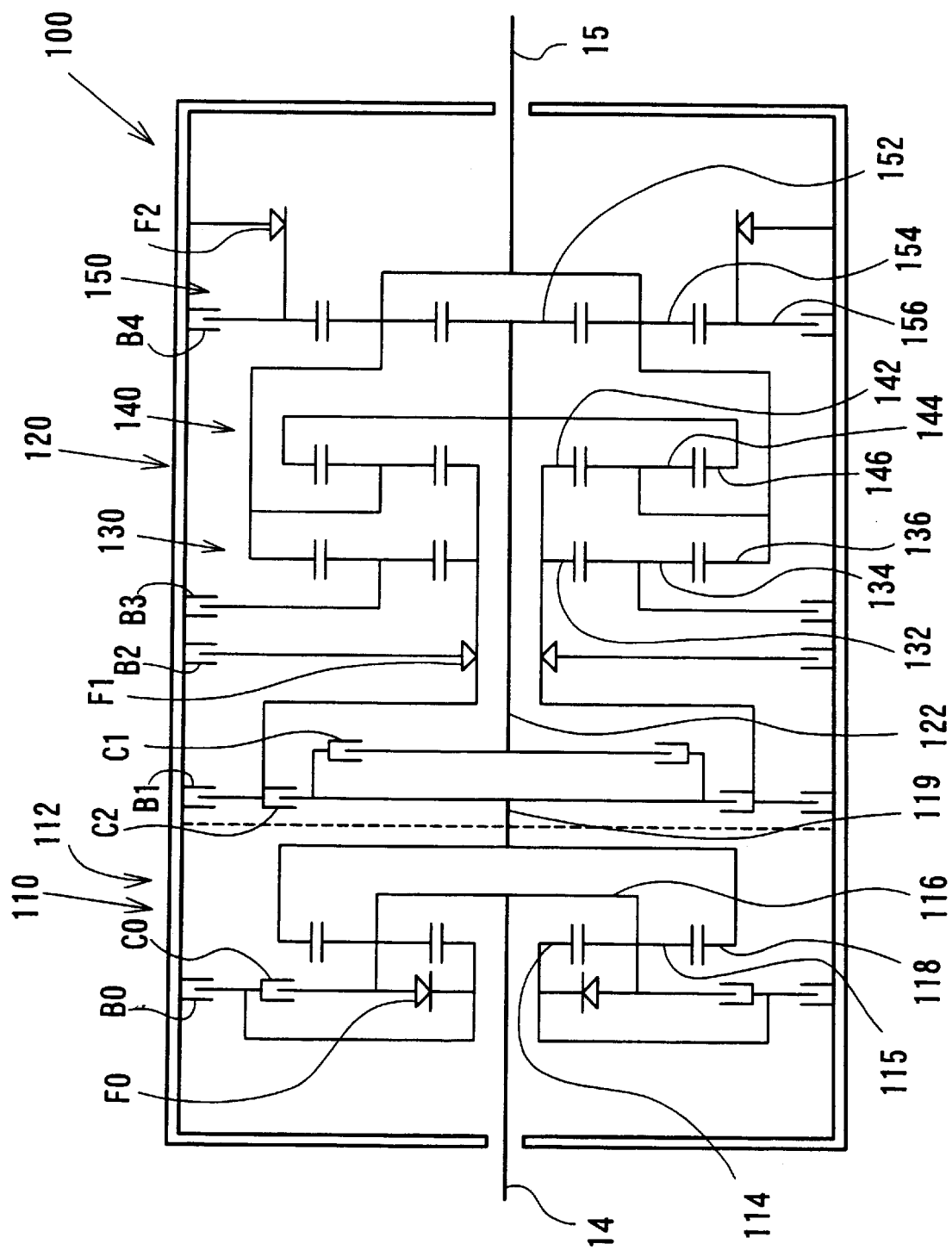
FIG. 2 illustrates the internal structure of a transmission 100.

The transmission 100 includes a plurality of gear units, clutches, one-way clutches, and brakes and changes the gear ratio, so as to enable the power input from the output shaft 14 of the torque converter 30 to be converted to a different combination of torque and revolving speed and transmitted to the output shaft 15 of the transmission 100. FIG. 2 shows the internal structure of the transmission 100. The transmission 100 of this embodiment mainly includes an auxiliary transmission unit 110 (a portion on the left side of the dotted line in FIG. 2) and a primary transmission unit 120 (a portion on the right side of the dotted line). The structure ensures five forward speeds and one reverse speed.

The detailed structure of the transmission 100 is described sequentially from the rotating shaft 14. As illustrated in FIG. 2, the auxiliary transmission unit 110 constructed as an overdrive unit converts the power input from the rotating shaft 14 at a predetermined gear ratio and transmits the converted power to a rotating shaft 119. The auxiliary transmission unit 110 includes a first planetary gear unit 112 of a single pinion type, a clutch C0, a one-way clutch F0, and a brake B0. The first planetary gear unit 112 includes three different gears, that is, a sun gear 114 revolving on the center, a planetary pinion gear 115 revolving both round the sun gear 114 and on its axis, and a ring gear 118 revolving round the planetary pinion gear 115. The planetary pinion gear 115 is supported on a rotating part called a planetary carrier 116.

In the planetary gear unit, when the rotating conditions of two gears selected among the three gears are determined, the rotating condition of the residual gear is automatically determined. The rotating conditions of the respective gears in the planetary gear unit are expressed by Equations (1) known in the field of mechanics and given below:

$$Ns=(1+\rho)/\rho \times Nc - Nr/\rho$$

$$Nc=\rho/(1+\rho)\times Ns+Nr/(1+\rho)$$

$$Nr=(1+\rho)Nc-\rho Ns$$

$$Ts=Tc\times \rho/(1+\rho)=\rho Tr$$

$$Tr=Tc/(1+\rho) \tag{1}$$

where ρ denotes the number of teeth in the sun gear to the number of teeth in the ring gear, Ns represents the revolving speed of the sun gear, Ts represents the torque of the sun gear, Nc represents the revolving speed of the planetary carrier, Tc represents the torque of the planetary carrier, Nr represents the revolving speed of the ring gear, and Tr represents the torque of the ring gear.

In the auxiliary transmission unit 110, the rotating shaft or the output shaft 14 of the torque converter 30, which corresponds to the input shaft of the transmission 100, is linked with the planetary carrier 116. The one-way clutch F0 and the clutch C0 are disposed in parallel between the planetary carrier 116 and the sun gear 114. The one-way clutch F0 is set in a specific direction that engages when the sun gear 114 has normal rotations relative to the planetary carrier 116, that is, when the sun gear 114 rotates in the same direction as that of the input shaft 14 of the transmission 100. The sun gear 114 is connected to the multiple disc brake B0 that can stop the rotation of the sun gear 114. The ring gear 118 corresponding to the output of the auxiliary transmission unit 110 is linked with the rotating shaft 119, which corresponds to the input shaft of the primary transmission unit 120.

In the auxiliary transmission unit 110 of the above configuration, the planetary carrier 116 integrally rotates with the sun gear 114 in the state of engagement of either the clutch C0 or the one-way clutch F0. According to Equations (1) given previously, when the sun gear 114 and the planetary carrier 116 have an identical revolving speed, the revolving speed of the ring gear 118 is also equal to the identical revolving speed. In this state, the revolving speed of the rotating shaft 119 is identical with the revolving speed of the input shaft 14. In the state of engagement of the brake B0 to stop the rotation of the sun gear 114, on the other hand, according to Equations (1), substitution of the value '0' into the revolving speed Ns of the sun gear 114 makes the revolving speed Nr of the ring gear 118 higher than the revolving speed Nc of the planetary carrier 116. Namely the rotation of the rotating shaft 14 is accelerated and subsequently transmitted to the rotating shaft 119. The auxiliary transmission unit 110 selectively performs the function of directly transmitting the power input from the rotating shaft 14 to the rotating shaft 119 and the function of accelerating the input power and then transmitting the accelerated power to the rotating shaft 119.

The primary transmission unit 120 includes three planetary gear units 130, 140, and 150, two clutches C1 and C2, two one-way clutches F1 and F2, and four brakes B1 through B4. Like the first planetary gear unit 112 included in the auxiliary transmission unit 110, each of the planetary gear units 130, 140, and 150 includes a sun gear, a planetary carrier, a planetary pinion gear, and a ring gear. The three planetary gear units 130, 140, and 150 are linked as discussed below.

A sun gear 132 of the second planetary gear unit 130 is integrally linked with a sun gear 142 of the third planetary gear unit 140. These sun gears 132 and 142 may be connected with the input shaft 119 via the clutch C2. The rotating shaft with these sun gears 132 and 142 is connected with the brake B1 to stop the rotation of the rotating shaft. The one-way clutch F1 is set in a specific direction that engages in the case of reverse rotation of this rotating shaft. The brake B2 is also connected with this rotating shaft to stop the rotation of the one-way clutch F1.

A planetary carrier 134 of the second planetary gear unit 130 is connected with the brake B3 to stop the rotation of the planetary carrier 134. A ring gear 136 of the second planetary gear unit 130 is integrally linked with a planetary carrier 144 of the third planetary gear unit 140 and a planetary carrier 154 of the fourth planetary gear unit 150. The ring gear 136 and the planetary carriers 144 and 154 are further connected with the output shaft 15 of the transmission 100.

A ring gear 146 of the third planetary gear unit 140 is linked with a sun gear 152 of the fourth planetary gear unit 150 and with a rotating shaft 122. The rotating shaft 122 may be linked with the input shaft 119 of the primary transmission unit 120 via the clutch C1. A ring gear 156 of the fourth planetary gear unit 150 is connected with the brake B4 to stop the rotation of the ring gear 156 and with the one-way clutch F2 that is set to engage in the state of reverse rotation of the ring gear 156.

The clutches C0 through C2 and the brakes B0 through B4 mounted on the transmission 100 engage and disengage by means of the hydraulic pressure. The respective clutches and brakes are connected with piping of hydraulic pressure and elements including solenoid valves for regulating the hydraulic pressure, although these constituents are not specifically illustrated. In the hybrid vehicle of the embodiment, the control unit 70 outputs control signals to these solenoid valves and other related elements, so as to control the operation of the respective clutches and brakes.

The transmission 100 of the embodiment can set the change-speed gear at a position selected among five forward speeds and one reverse speed through the combination of engagement and disengagement of the clutches C0 through C2 and the brakes B0 through B4. The transmission 100 also has a Neutral position and a Parking position. FIG. 3 shows the relationship between the state of engagement of the respective clutches, brakes, and one-way clutches and the position of the change-speed gear. In the table of FIG. 3, the circle represents a normal state of engagement, the double circle represents an engagement in the case of power-source braking, and the triangle represents a specific state of engagement that is not involved in the transmission of power. The power-source braking here implies the braking by means of the engine 10 and the motor 20. The engagement of the one-way clutches F0 through F2 is not based on the control signal of the control unit 70 but is based on the direction of rotation of each corresponding gear.

As shown in FIG. 3, in the case of either a Parking (P) position or a Neutral (N) position, the clutch C0 and the one-way clutch F0 engage. Since both the clutches C2 and C1 disengage, the power is not transmitted from the input shaft 119 of the primary transmission unit 120 to the downstream elements.

In the case of the first speed ($1^{st}$), the clutches C0 and C1 and the on-way clutches F0 and F2 engage. Under the application of engine brake, the brake B4 further engages. This is equivalent to the state where the input shaft 14 of the transmission 100 is directly linked with the sun gear 152 of the fourth planetary gear unit 150. The power is accordingly transmitted to the output shaft 15 at a certain gear ratio corresponding to the gear ratio of the fourth planetary gear unit 150. The ring gear 156 is restricted not to rotate reversely by the function of the one-way clutch F2. The revolving speed of the ring gear 156 is thus practically equal to zero. Under such conditions, according to Equations (1) given previously, the relations between a revolving speed Nin and a torque Tin of the input shaft 14 and a revolving speed Nout and a torque Tout of the output shaft 15 are expressed by Equations (2) given below:

$$N\text{out}=N\text{in}/k1$$

$$T\text{out}=k1 \times T\text{in}$$

$$k1=(1+\rho 4)/\rho 4 \tag{2}$$

where $\rho 4$ denotes the gear ratio of the fourth planetary gear unit 150.

In the case of the second speed ($2^{nd}$), the clutch C1, the brake B3, and the one-way clutch F0 engage. Under the application of engine brake, the clutch C0 further engages. This is equivalent to the state where the input shaft 14 of the transmission 100 is directly linked with the sun gear 152 of the fourth planetary gear unit 150 and with the ring gear 146 of the third planetary gear unit 140. In this state, the planetary carrier 134 of the second planetary gear unit 130 is fixed. The sun gear 132 of the second planetary gear unit 130 and the sun gear 142 of the third planetary gear unit 140 have an identical revolving speed. The ring gear 136 and the planetary carrier 144 have an identical revolving speed. Under such conditions, according to: Equations (1) given previously, the rotating conditions of the second and third planetary gear units 130 and 140 are determined unequivocally. The relations between the revolving speed Nin and the torque Tin of the input shaft 14 and the revolving speed Nout and the torque Tout of the output shaft 15 are expressed by Equations (3) given below. The revolving speed Nout of the output shaft 15 at the second speed ($2^{nd}$) is higher than the revolving speed at the first speed ($1^{st}$), whereas the torque Tout of the output shaft 15 at the second speed ($2^{nd}$) is smaller than the torque at the first speed ($1^{st}$).

$$N\text{out}=N\text{in}/k2$$

$$T\text{out}=k2 \times T\text{in}$$

$$k2=\{\rho 2(1+\rho 3)+\rho 3\}/\rho 2 \tag{3}$$

where $\rho 2$ and $\rho 3$ respectively denote the gear ratios of the second planetary gear unit 130 and the third planetary gear unit 140.

In the case of the third speed ($3^{rd}$), the clutches C0 and C1, the brake B2, and the one-way clutches F0 and F1 engage. Under the application of engine brake, the brake B1 further engages. This is equivalent to the state where the input shaft 14 of the transmission 100 is directly linked with the sun gear 152 of the fourth planetary gear unit 150 and the ring gear 146 of the third planetary gear unit 140. The sun gears 132 and 142 of the second and third planetary gear units 130 and 140 are restricted not to rotate reversely by the functions of the brake B2 and the one-way clutch F1. The revolving speeds of these sun gears 132 and 142 are thus practically equal to zero. Like in the case of the second speed ($2^{nd}$), under such conditions, according to Equations (1) given previously, the rotating conditions of the second and third planetary gear units 130 and 140 are determined unequivocally, and the revolving speed of the output shaft 15 is determined unequivocally. The relations between the revolving speed Nin and the torque Tin of the input shaft 14 and the revolving speed Nout and the torque Tout of the output shaft 15 are expressed by Equations (4) given below. The revolving speed Nout of the output shaft 15 at the third speed ($3^{rd}$) is higher than the revolving speed at the second speed ($2^{nd}$), whereas the torque Tout of the output shaft 15 at the third speed ($3^{rd}$) is smaller than the torque at the second speed ($2^{nd}$).

$$N\text{out}=N\text{in}/k3$$

$$T\text{out}=k3 \times T\text{in}$$

$$k3=1+\rho 3 \tag{4}$$

In the case of the fourth speed ($4^{th}$), the clutches C0 through C2 and the one-way clutch F0 engage. The brake B2 simultaneously engages but is not involved in transmission of the power. In this state, the clutches C1 and C2 simultaneously engage, so that the input shaft 14 is directly linked with the sun gear 132 of the second planetary gear unit 130, the sun gear 142 and the ring gear 146 of the third planetary gear unit 140, and the sun gear 152 of the fourth planetary gear unit 150. The third planetary gear unit 140 thus integrally rotates with the input shaft 14 at an identical revolving speed. The output shaft 15 thereby integrally rotates with the input shaft 14 at an identical revolving speed. The output shaft 15 rotates at a higher revolving speed in the fourth speed ($4^{th}$) than in the third speed ($3^{rd}$). The relations between the revolving speed Nin and the torque Tin of the input shaft 14 and the revolving speed Nout and the torque Tout of the output shaft 15 are expressed by Equations (5) given below. The revolving speed Nout of the output shaft 15 at the fourth speed ($4^{th}$) is higher than the revolving speed at the third speed ($3^{rd}$), whereas the torque Tout of the output shaft at the fourth speed ($4^{th}$) is smaller than the torque at the third speed ($3^{rd}$).

$$N\text{out}=N\text{in}/k4$$

$$T\text{out}=k4 \times T\text{in}$$

$$k4=1 \tag{5}$$

In the case of the fifth speed ($5^{th}$), the clutches C1 and C2 and the brake B0 engage. The brake B2 simultaneously engages but is not involved in transmission of the power. In this state, the clutch C0 disengages, so that the revolving speed is increased in the auxiliary transmission unit 110. The revolving speed of the input shaft 14 of the transmission 100 is increased and transmitted to the input shaft 119 of the primary transmission unit 120. The clutches C1 and C2 engage simultaneously, so that the input shaft 119 and the output shaft 15 rotate at an identical revolving speed, like in the case of the fourth speed ($4^{th}$). According to Equations (1) given previously, the relations between the revolving speeds and the torques of the input shaft 14 and the output shaft 119 of the auxiliary transmission unit 110 are obtained, in order to determine the revolving speed and: the torque of the output shaft 15. The relations between the revolving speed Nin and the torque Tin of the input shaft 14 and the revolving speed Nout and the torque Tout of the output shaft 15 are expressed by Equations (6) given below. The revolving speed Nout of t he output shaft 15 at the fifth speed ($5^{th}$) is higher than the revolving speed at the fourth speed ($4^{th}$), whereas the torque Tout of the output shaft 15 at the fifth speed ($5^{th}$) is smaller than the torque at the fourth speed ($4^{th}$).

$$N\text{out}=N\text{in}/k$$

$$T\text{out}=k5 \times T\text{in}$$

$$k5=1/(1+\rho 1) \tag{6}$$

where ρ1 denotes the gear ratio of the first planetary gear unit 112.

In the case of reverse speed (R), the clutch C2 and the brakes B0 and B4 engage. In this state, the revolving speed of the input shaft 14 is increased in the auxiliary transmission unit 110 and linked with the sun gear 132 of the second planetary gear unit 130 and the sun gear 142 of the third planetary gear unit 140. As described previously, the ring gear 136 and the planetary carriers 144 and 154 have an identical revolving speed. The ring gear 146 and the sun gear 152 also have an identical revolving speed. The revolving speed of the ring gear 156 of the fourth planetary gear unit 150 becomes equal to zero by the function of the brake B4. Under such conditions, according to Equations (1) given previously, the rotating conditions of the respective planetary gear units 130, 140, and 150 are determined unequivocally. At this moment, the output shaft 15 rotates in the negative direction to allow a reverse movement.

As described above, the transmission 100 of the embodiment can set the position of the change-speed gear among the five forward speed and one reverse speed. The power input from the input shaft 14 is converted to a different combination of revolving speed and torque and output to the output shaft 15. The output power is defined by the increasing revolving speed and the decreasing torque in the sequence of the first speed ($1^{st}$) to the fifth speed ($5^{th}$). This is also true when a negative torque, that is, a braking force, is applied to the input shaft 14. The variables k1 through k5 in Equations (2) through (6) given above denote the gear ratios at the respective positions of the change-speed gear. In the case where a fixed braking force is applied to the input shaft 14 by means of the engine 10 and the motor 20, the braking force applied to the output shaft 15 decreases in the 'sequence of the first speed ($1^{st}$) to the fifth speed ($5^{th}$). The transmission 100 may have a variety of known structures, other than the structure adopted in this embodiment. The transmission 100 may have a greater number or a less number of forward speeds.

Figure 4:
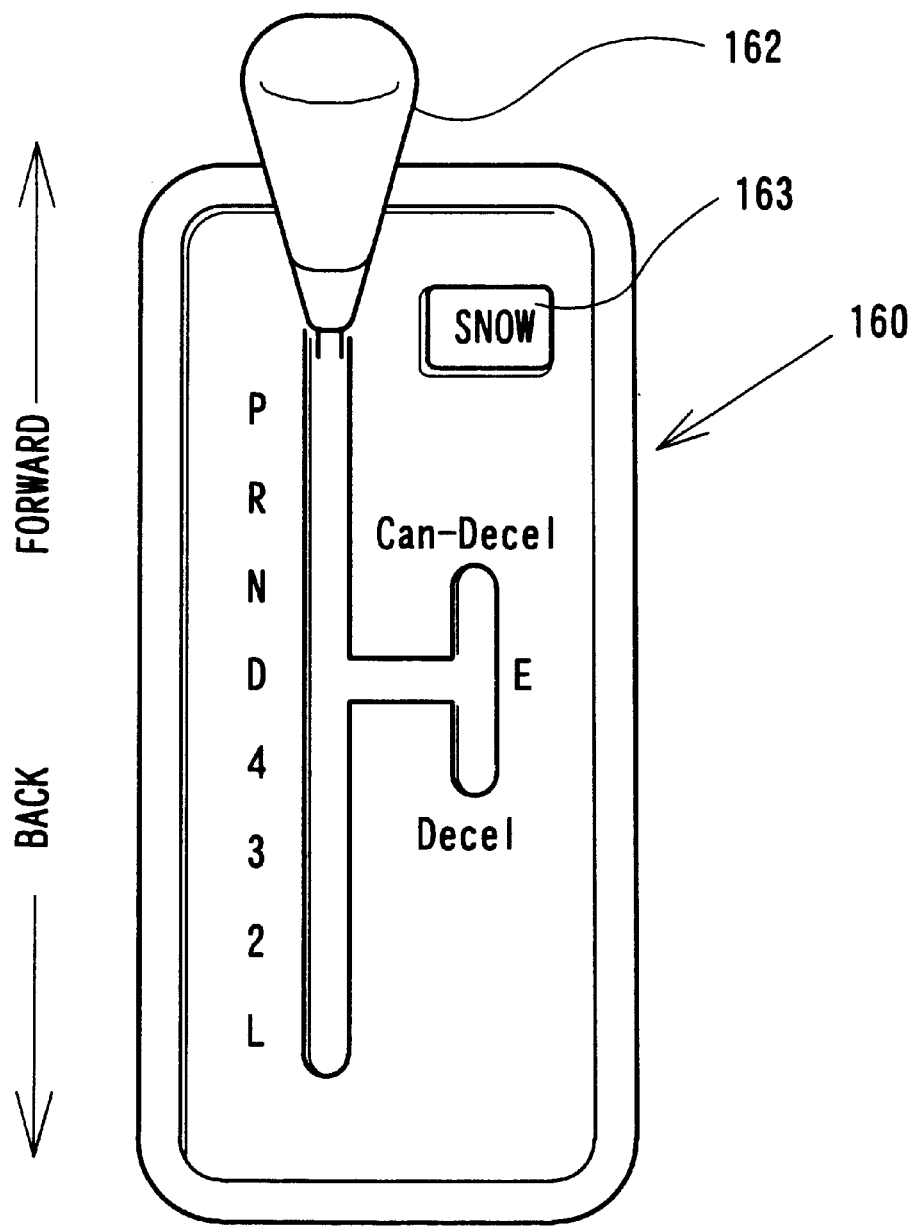
FIG. 4 shows an operation unit 160 for selecting the gearshift position in the hybrid vehicle of the embodiment.

The control unit 70 sets the position of the change-speed gear according to the vehicle speed and other conditions. The driver manually operates a gearshift lever included in an operation unit 160 in the vehicle (see FIG. 1), so as to select the gearshift position and vary the range of the change-speed gear. FIG. 4 shows the operation unit 160 for selecting the gearshift position in the hybrid vehicle of this embodiment. The operation unit 160 is located along a longitudinal axis of the vehicle on the floor next to the driver's seat.

As shown in FIG. 4, the operation unit 160 includes a gearshift lever 162. The driver slides the gearshift lever 162 along the longitudinal axis of the vehicle, so as to select one among available gearshift positions. The available gearshift positions include a parking (P) position, a reverse (R) position, a neutral (N) position, a drive (D) position, a fourth position (4), a third position (3), a second position (2), and a low position (L), which are arranged in this order from the forward of the vehicle.

The parking (P), the reverse (R), and the neutral (N) positions correspond to the engagement states shown in FIG. 3. At the drive position (D), the selected mode enables a drive using the first speed ($1^{st}$) to the fifth speed ($5^{th}$). At the fourth position (4), the selected mode enables a drive using the first speed ($1^{st}$) to the fourth speed ($4^{th}$). In a similar manner, the selected mode at the third position (3), the second position (2), and the low position (L) respectively enables a drive using the first speed ($1^{st}$) to the third speed ($3^{rd}$), using the first speed ($1^{st}$) to the second speed ($2^{nd}$), and using only the first speed ($1^{st}$).

In the hybrid vehicle of the embodiment, the driver can arbitrarily set the deceleration by the power-source braking as discussed later. The operation unit 160 for selecting the gearshift position has a mechanism for setting the deceleration.

As shown in FIG. 4, in the hybrid vehicle of the embodiment, the gearshift lever 162 may be slid sideways at the drive (D) position, as well as slid in the longitudinal direction for selecting the gearshift position. The position selected in this way is called an E position. When the gearshift lever 162 is at the E position, the setting of the deceleration by the power-source braking may be varied by operating the gearshift lever 162 in the longitudinal direction as discussed below. The operation unit 160 includes a sensor for detecting the selected gearshift position and an E position switch that is turned on when the gearshift lever 162 is at the E position. The signals of these sensor and switch are transmitted to the control unit 70 and used for the various control operations in the vehicle as discussed later.

The following describes the operation when the gearshift lever 162 is at the E position. The gearshift lever 162 is kept in the middle of the E position, that is, the neutral state, while the driver does not hold the gearshift lever 162. When the driver desires to increase the deceleration, that is, abrupt braking is required, the driver presses back the gearshift lever 162 (to the side of Decel). When the driver desires to decrease the deceleration, that is, gentle braking is required, the driver presses forward the gearshift lever 162 (to the side of Can-Decel). The gearshift lever 162 is not continuously slid in the longitudinal direction at the E position but is moved stepwise. Namely the gearshift lever 162 may be set in one of the three states, that is, the neutral state, the Can-Decel state (pressed forward), and the Decel state (pressed back), at the E position. When the driver releases the force applied to the gearshift lever 162, the gearshift lever 162 immediately returns to the neutral state. The deceleration by the power-source braking is varied in a stepwise manner according to the frequency of operation of the gearshift lever 162 in the longitudinal direction.

The hybrid vehicle of the embodiment has operation elements mounted on a steering wheel to vary the deceleration by the power-source braking, in addition to the operation of the gearshift lever 162. FIG. 5 shows the operation elements mounted on a steering wheel 164. FIG. 5(a) shows the surface of the steering wheel 164, that is, the side facing the driver. A pair of Decel switches 166L and 166R are placed on a spoke of the steering wheel 164 to increase the deceleration. The positions of these switches 166L and 166R are specified to allow an easy manual operation with the left thumb or the right thumb while the driver handles the steering wheel. In this embodiment, the two switches 166L and 166R have an identical function, in order to ensure the adequate operation without any confusion even in the event that the steering wheel 164 is rotated.

FIG. 5(b) shows the rear face of the steering wheel 164. A pair of Can-Decel switches 168L and 168R are mounted at practically reverse positions of the Decel switches 166L and 166R to decrease the deceleration. The positions of these switches 168L and 168R are also specified to allow an easy manual operation with the left index finger or the right index finger while the driver handles the steering wheel. Because of the same reason as discussed above for the Decel switches 166L and 166R, the two switches 168L and 168R have an identical function.

When the driver presses the Decel switch 166L or 166R, the deceleration is increased according to the frequency of pressing the switch. When the driver presses the Can-Decel switch 168L or 168R, on the other hand, the deceleration is decreased according to the frequency of pressing the switch. These switches 166L, 166R, 168L, and 168R are effective only in the case where the gearshift lever 162 is at the E position (see FIG. 4). This arrangement effectively prevents the setting of the target deceleration from being changed unintentionally by accidental presses of these switches 166L, 166R, 168L, and 168R while the driver handles the steering wheel 164.

The operation unit 160 also has a snow mode switch 163. The driver presses the snow mode switch 163 when the road surface has a low friction coefficient and is in a slippery condition, for example, in the case of snow-covered road. In the ON position of the snow mode switch 163, the upper limit of the target deceleration is restricted to be not greater than a preset level as discussed later. The speed reduction by a large deceleration during a drive on the road surface having a low friction coefficient may cause a slip or a skid of the vehicle. In the ON position of the snow mode switch 163, the deceleration is restricted to be not greater than the preset level, so as to prevent a slip or a skid of the vehicle. In the ON position of the snow mode switch 163, the deceleration may be changed in a certain range that does not cause a slip or a skid of the vehicle.

Figure 6:
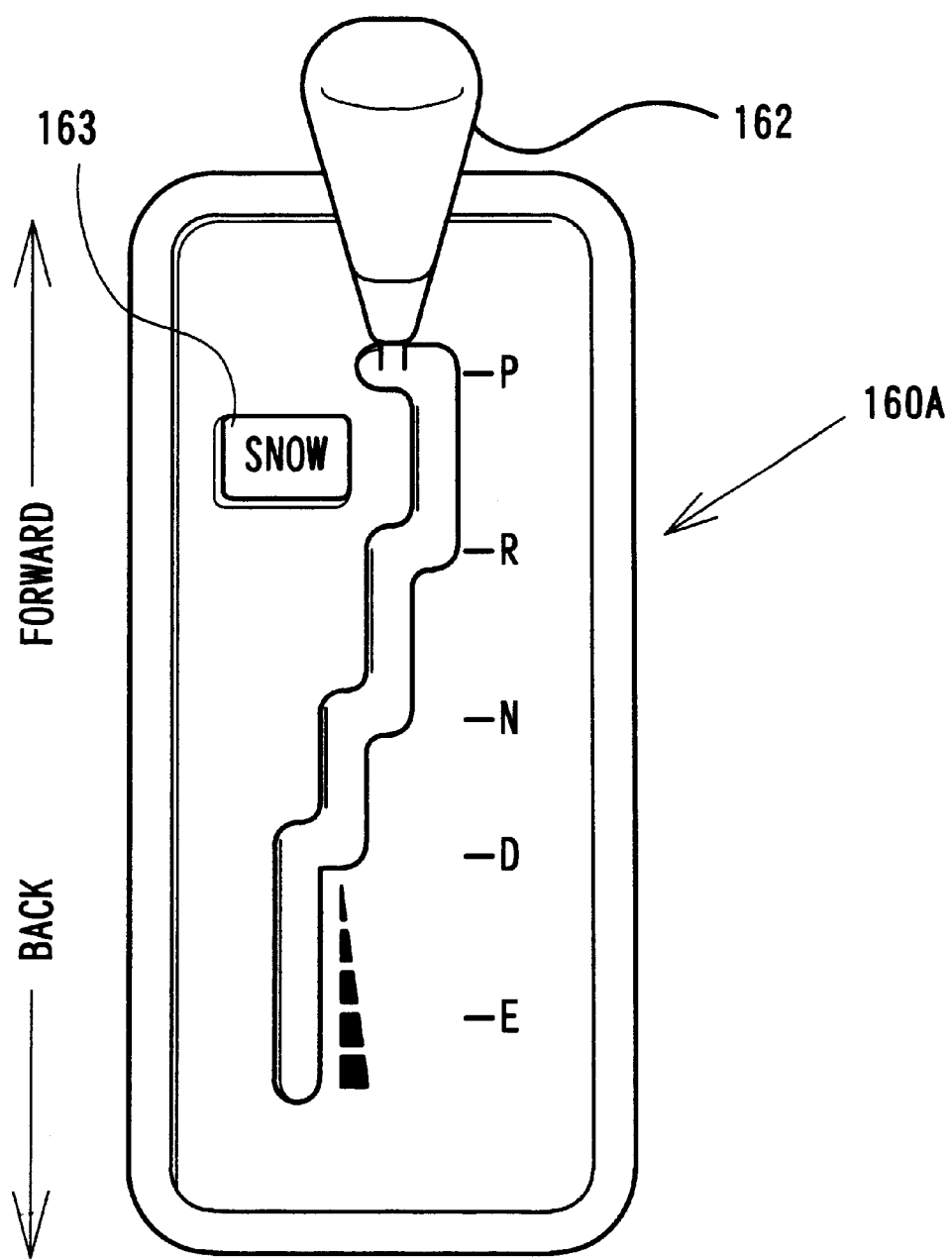
FIG. 6 shows another operation unit 160A having a modified structure.

The operation unit for selecting the gearshift position and setting the target deceleration is not restricted to the structure of the embodiment (shown in FIG. 4), but may have any suitable structure. FIG. 6 shows another operation unit 160A having a modified structure. The operation unit 160A is arranged along the longitudinal axis of the vehicle on the floor next to the driver's seat. The driver slides the gearshift lever 162 in the longitudinal direction to select one among various gearshift positions. Although the fourth to the low positions are omitted from the illustration of FIG. 6, the operation unit 160A of the modified structure may also have these gearshift positions like the operation unit 160 shown in FIG. 4. The operation unit 160A of the modified structure has the E position at the rear of the normal movable range for selecting the gearshift position. The driver slides the gearshift lever 162 along the longitudinal axis of the vehicle at the E position, so as to vary the setting of the deceleration continuously. In this example, the deceleration increases with a backward slide of the gearshift lever 162, and decreases with a forward slide of the gearshift lever 162. This modified structure is only an example, and there are a variety of other structures applicable for the mechanism of setting the deceleration.

Figure 7:
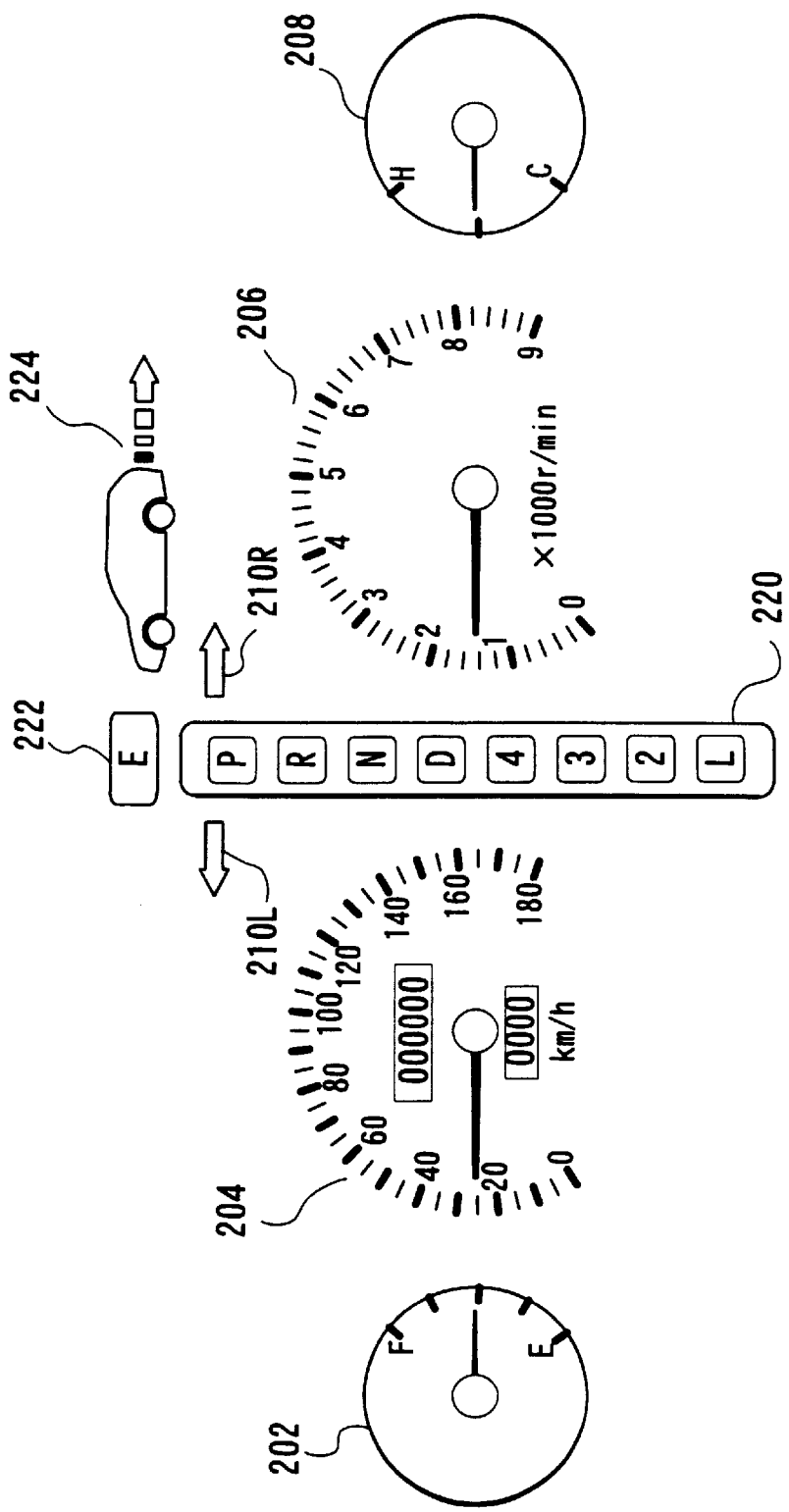
FIG. 7 shows an instrument panel in the hybrid vehicle of the embodiment.

The setting of the deceleration is displayed on an instrument panel in the vehicle. FIG. 7 shows an instrument panel in the hybrid vehicle of this embodiment. The instrument panel is placed in front of the driver like the standard vehicle. A fuel gauge 202 and a speedometer 204 are disposed on the left side of the instrument panel seen from the driver. An engine temperature gauge 208 and a tachometer 206 are disposed on the right side of the instrument panel. A gearshift position indicator 220 is arranged on the center of the instrument panel to display the gearshift position. Direction indicators 210L and 210R are set on both sides of the gearshift position indicator 220. These instruments are also found in the standard vehicle. In the hybrid vehicle of this embodiment, in addition to these instruments, an E position indicator 222 is provided above the gearshift position indicator 220. A deceleration indicator 224 is also set on the right side of the E position indicator 222 to display the deceleration currently set.

The E position indicator 222 lights up when the gearshift lever 162 is set at the E position. When the driver presses the Decel switches or the Can-Decel switches to set the deceleration, the length of a rearward arrow (rightward arrow in FIG. 7) displayed with a symbol of the vehicle in the deceleration indicator 224 is varied to sensuously express the setting of the deceleration. In the hybrid vehicle of the embodiment, the setting of the deceleration may be restricted according to a variety of conditions as discussed later. In the case where the setting of the deceleration is restricted, the E position indicator 222 and the deceleration indicator 224 flicker or give a display of different form, so as to inform the driver of the restricted setting of the deceleration.

Figure 8:
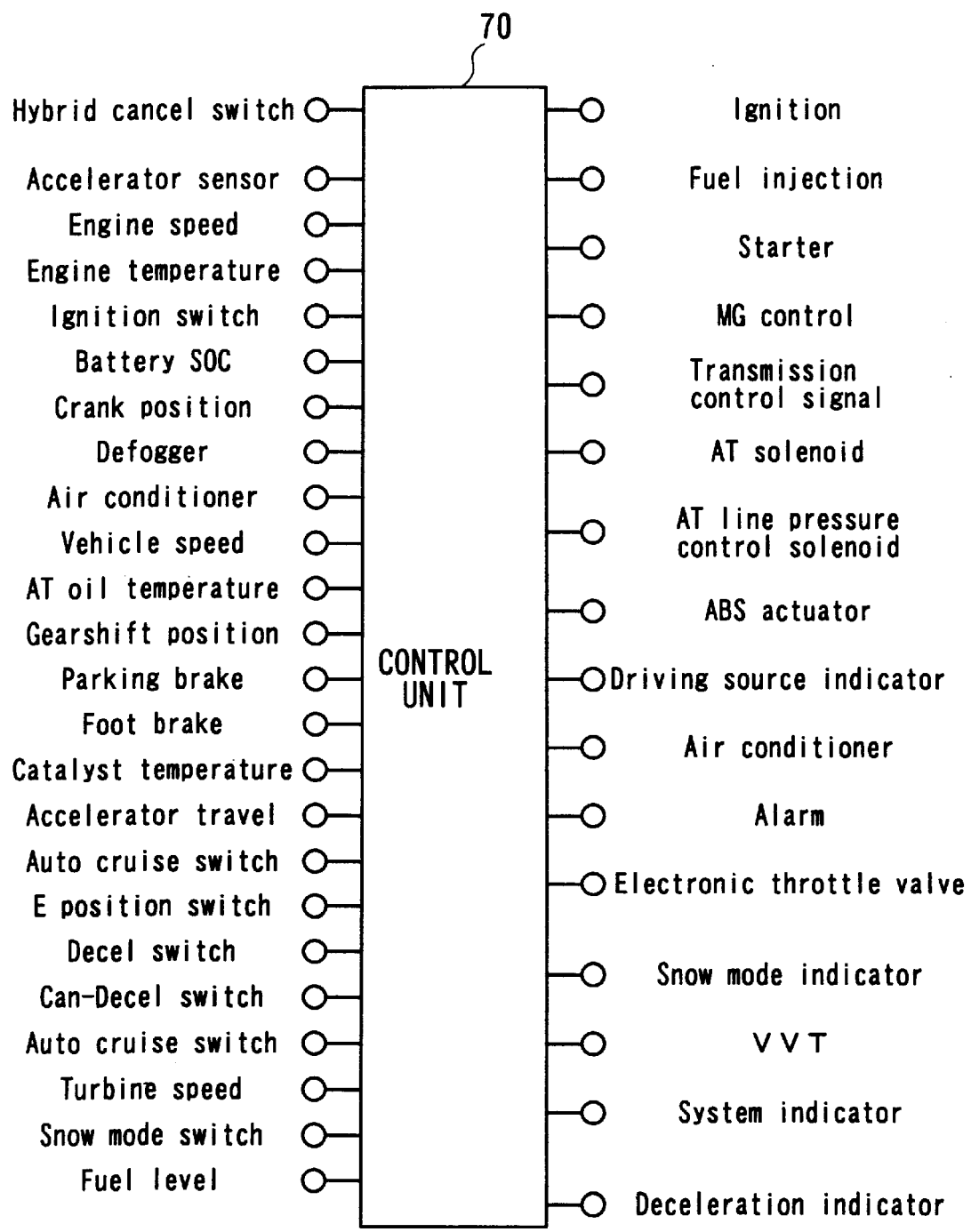
FIG. 8 shows connections of input and output signals into and from a control unit 70 in the hybrid vehicle of the embodiment.

In the hybrid vehicle of the embodiment, the control unit 70 controls the operations of the engine 10, the motor 20, the torque converter 30, and the transmission 100 (see FIG. 1). The control unit 70 is constructed as a one-chip microprocessor including a CPU, a RAM, and a ROM. The CPU carries out various control operations discussed below according to programs recorded in the ROM. A variety of input and output signals are connected to the control unit 70 to implement the control operations. FIG. 8 shows connections of input and output signals into and from the control unit 70. The left side of FIG. 8 shows the signals input into the control unit 70, whereas the right side shows the signals output from the control unit 70.

The signals input into the control unit 70 are received from various switches and sensors. The input signals represent, for example, the on-off state of a hybrid cancel switch to set a drive only with the engine 10 as the power source, the acceleration of the vehicle measured with an acceleration sensor, the speed of the engine 10, the water temperature of the engine 10, the on-off state of an ignition switch, the remaining charge SOC of the battery 50, the crank position of the engine 10, the on-off state of a defogger, the driving condition of an air conditioner, the vehicle speed, the oil temperature of the torque converter 30, the gearshift position (see FIG. 4), the on-off state of a parking brake, the amount of actuation of the brake pedal, the temperature of a catalyst for converting the exhaust of the engine 10, the travel of the accelerator, the on-off state of an auto cruise switch, the on-off state of the E position switch (see FIG. 4), the states of the Decel switch and the Can-Decel switch to change the setting of the target deceleration, the turbine speed of a supercharger, the on-off state of the snow mode switch to set a drive mode on the road surface having a low friction coefficient, such as the snow-covered road, and the level of the fuel measured by the fuel gauge. In this embodiment, the vehicle speed is calculated from the numbers of rotations of the left and right driving wheels 18L and 18R.

The signals output from the control unit 70 are used to control the engine 10, the motor 20, the torque converter 30, and the transmission 100. The output signals include, for example, an ignition signal to regulate the ignition timing of the engine 10, a fuel injection signal to control the fuel injection, a starter signal to start the engine 10, an MG control signal to carry out the switching in the driving circuit 40 and control the operation of the motor 20, a transmission control signal to change over the position of the change-speed gear in the transmission 100, an AT solenoid signal and an AT line pressure control solenoid signal to regulate the hydraulic pressure in the transmission 100, a signal for regulating an actuator of an anti-lock braking system (ABS), a driving source indicator signal to display the source of the driving force, a control signal of the air conditioner, control signals for various alarms, a control signal of an electronic throttle valve of the engine 10, a snow mode indicator signal to display the selection of the snow mode, a VVT signal to regulate the open and close timings of the intake valve and the exhaust valve of the engine 10, a system indicator signal to display the driving state of the vehicle, and a deceleration indicator signal to display the deceleration set currently.

A2. General Operations

The following describes the general operation of the hybrid vehicle of this embodiment. As discussed previously with FIG. 1, the hybrid vehicle of this embodiment has the engine 10 and the motor 20 as the power source. The control unit 70 selectively uses the engine 10 and the motor: 20 according to the driving state of the vehicle, that is, according to the vehicle speed and the torque. The adequate selection is set in advance in the form of a map and stored in the ROM included in the control unit 70.

Figure 9:
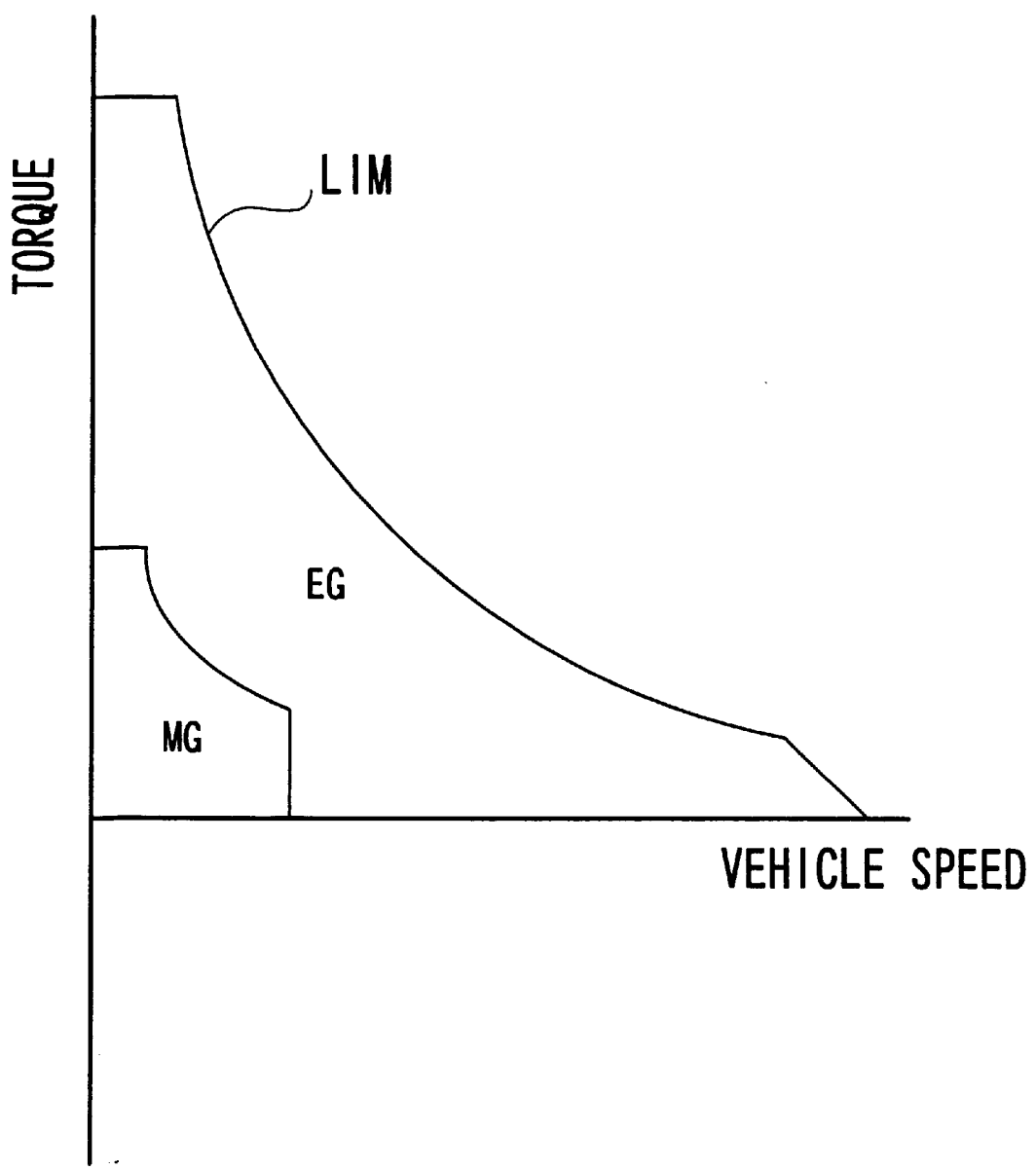
FIG. 9 is a map showing the relationship between the driving state of the vehicle and the power source.

FIG. 9 is a map showing the relationship between the driving state of the vehicle and the power source. A Curve LIM represents the limit of an operable area of the vehicle. An area MG denotes a driving area in which the motor 20 is used as the power source, and an area EG denotes a driving area in which the engine 10 is used as the power source. Hereinafter the former is referred to as the EV drive and the latter as the standard drive. The structure of FIG. 1 allows the hybrid vehicle to be driven with both the engine 10 and the motor 20 as the power source, but this embodiment does not set such a driving area.

As shown in this map, the hybrid vehicle of this embodiment starts at the EV drive. As described previously (see FIG. 1), in the hybrid vehicle of the embodiment, the engine 10 and the motor 20 integrally rotate with each other. Even in the course of the EV drive, the engine 10 accordingly rotates, but is motored without fuel injection and ignition. As described previously, the engine 10 has the VVT mechanism. The control unit 70 controls the VVT mechanism and delays the open and close timings of the intake valve and the exhaust valve, in order to reduce the load applied to the motor 20 during the EV drive and enable the power output from the motor 20 to be effectively used for driving the vehicle.

When the vehicle starting at the EV drive reaches a driving state close to the boundary between the area MG and the area EG in the map of FIG. 9, the control unit 70 starts the engine 10. Since the engine 10 has already been rotated at a predetermined speed by means of the motor 20, the control unit 70 simply carries out the fuel injection to the engine 10 and the ignition at a preset timing. The control unit 70 also controls the VVT mechanism to change the open and close timings of the intake valve and the exhaust valve to the timings suitable for the operation of the engine 10.

After the engine 10: starts, the vehicle is driven with only the engine 10 as the power source in the area EG. In response to the start of the drive in the area EG, the control unit 70 shuts down all the transistors included in the driving circuit 40. This causes the motor 20 to idle.

Figure 10:
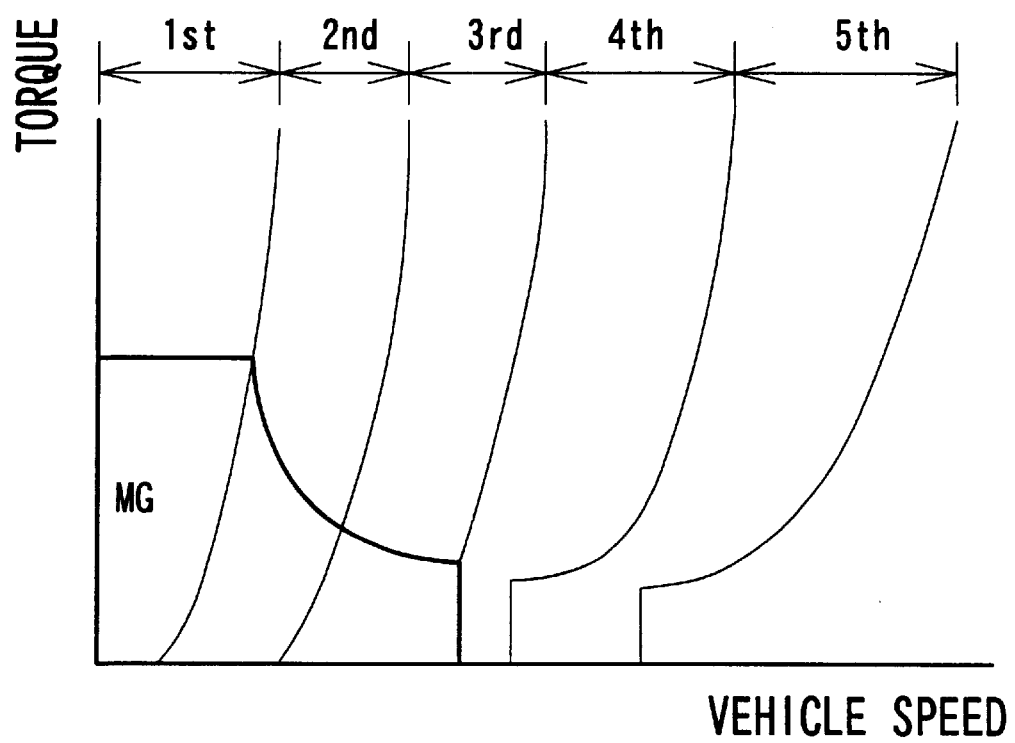
FIG. 10 is a map showing the relationship between the position of the change-speed gear in the transmission 100 and the driving state of the vehicle.

The control unit 70 carries out the control procedures to change the power source according to the driving state of the vehicle as well as to change over the position of the change-speed gear in the transmission 100. Like the changeover of the power source, the changeover of the position of the change-speed gear is implemented, based on a map that has been set in advance according to the driving state of the vehicle. FIG. 10 is a map showing the relationship between the position of the change-speed gear in the transmission 100 and the driving state of the vehicle. The control unit 70 changes over the position of the change-speed gear, in order to attain a smaller gear ratio with an increase in vehicle speed as shown in this map.

The changeover of the position of the change-speed gear is under the restriction of the gearshift position. At the drive (D) position, the vehicle is driven using the change-speed gear up to the fifth speed ($5^{th}$). At the fourth position (4), the vehicle is driven using the change-speed gear up to the fourth speed ($4^{th}$). In the latter case, the fourth speed ($4^{th}$) is used even in the area of the $5^{th}$ in the map of FIG. 10. The position of the change-speed gear is changed according to the map, as well as by a kick down control. The kick down control changes over the position of the change-speed gear to a position of a larger gear ratio by one step, when the driver slams down on the accelerator pedal. These control procedures are identical with those carried out in the known vehicle with an automatic transmission. The hybrid vehicle of this embodiment carries out the similar control procedures during the EV drive (that is, in the area MG). The relationship between the position of the change-speed gear and the driving state of the vehicle is not restricted to the map of FIG. 10, but may be set adequately according to the gear ratio of the transmission 100.

The maps of FIGS. 9 and 10 are used in the case where both the EV drive and the standard drive are selectively performed according to the driving state of the vehicle. The control unit 70 of the embodiment also has maps used in the case where only the standard drive is performed over the whole driving state of the vehicle. These maps omit the area of the EV drive (that is, the area MG) from the maps of FIGS. 9 and 10. The EV drive requires the battery 50 to store a certain level of electric power. The control unit 70 accordingly selects the right map according to the charging state of the battery 50 and carries out the control of the vehicle. When the remaining charge SOC of the battery 50 is not less than a preset level, the control unit 70 carries out the control to selectively perform both the EV drive and the standard drive based on the maps of FIGS. 9 and 10. When the remaining charge SOC of the battery 50 is less than the preset level, on the other hand, the control unit 70 carries out the control to perform the standard drive only with the engine 10 as the power source even at the time of starting and during the low-speed run. The selection of the right map is repeatedly carried out at predetermined time intervals. In some cases, the remaining charge SOC of the battery 50 is not less than the preset level and the vehicle starts at the EV drive, but the consumption of electric power after the start makes the remaining charge SOC less than the preset level. In this case, the control unit 70 changes the EV drive to the standard drive even when the driving state of the vehicle is within the area MG.

The following describes the braking in the hybrid vehicle of the embodiment. The hybrid vehicle of the embodiment adopts both the wheel braking applied in response to actuation of the brake pedal and the power-source braking by means of the loading torques from the engine 10 and the motor 20. The power-source braking is made effective when the accelerator pedal is released. The target deceleration by the power-source braking is reduced with a decrease in vehicle speed. Namely the magnitude of the power source braking is reduced with a decrease in vehicle speed. In the event that the driver steps on the brake pedal, the braking force applied to the vehicle is the sum of the power-source braking and the wheel braking.

In the hybrid vehicle of the embodiment, the driver performs the specific operation at the E position, so as to set the deceleration by the power-source braking. The operation of the Decel switch at the E position increases the deceleration by the power-source braking in a stepwise manner. The operation of the Can-Decel switch at the E position, on the other hand, decreases the deceleration by the power-source braking in a stepwise manner.

Figure 11:
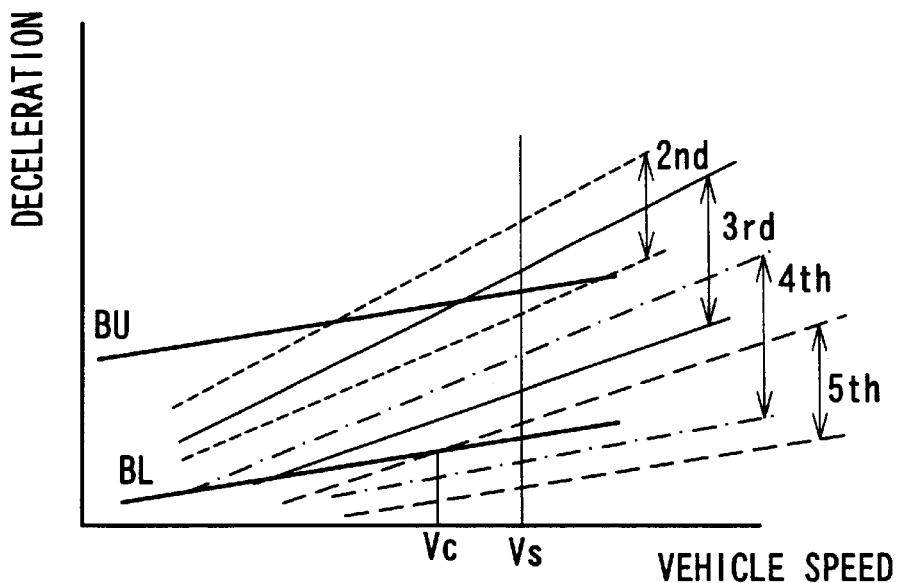
FIG. 11 is a map showing the combinations of the vehicle speed, the deceleration, and the position of the change-speed gear in the hybrid vehicle of the embodiment.

The hybrid vehicle of the embodiment implements the power-source braking set in the stepwise manner as a combination of the changeover of the position of the change-speed gear in the transmission 100 with the braking force by the motor 20. FIG. 11 is a map showing the combinations of the vehicle speed, the deceleration, and the position of the change-speed gear in the hybrid vehicle of the embodiment. In the map of FIG. 11, the deceleration is expressed as absolute values. The operation of either the Decel switch or the Can-Decel switch causes the deceleration of the vehicle to be varied in a stepwise manner in a range between straight lines BL and BU shown in FIG. 11.

The deceleration by the power-source braking is varied in a certain range by regulating the torque of the motor 20. The changeover of the position of the change-speed gear in the transmission 100 varies the ratio of the torque of the power source to the torque output to the axle 17. This enables the deceleration of the vehicle to be changed according to the position of the change-speed gear. When the position of the change-speed gear is at the second speed ($2^{nd}$), regulating the torque of the motor 20 attains the deceleration in a range defined by the short-dashed lines in FIG. 11. At the third speed ($3^{rd}$), the regulation of the torque attains the deceleration in a range defined by the solid lines in FIG. 11. At the fourth speed ($4^{th}$), the regulation of the torque attains the deceleration in a range defined by the one-dot chain lines in FIG. 11. At the fifth speed ($5^{th}$), the regulation of the torque attains the deceleration in a range defined by the long-dashed lines in FIG. 11.

The control unit 70 selects the position of the change-speed gear to attain the preset deceleration based on the map of FIG. 11 and carries out the braking control. For example, when the deceleration is set on the straight line BL in FIG. 11, in an area of higher vehicle speed than a value Vc, the braking control is performed at the fifth speed ($5^{th}$). In the area of lower vehicle speed than the value Vc, on the other hand, the braking control is performed after the position of the change-speed gear is changed to the fourth speed ($4^{th}$). In this area, the desired deceleration is not attained at the fifth speed ($5^{th}$). In the arrangement of this embodiment, the range of the deceleration attained at each position of the change-speed gear overlaps the ranges of deceleration attained at the adjacent positions of the change-speed gear. In the area of higher vehicle speed than the value Vc, the deceleration corresponding to the straight line BL may be attained at both the fourth speed ($4^{th}$) and the fifth speed ($5^{th}$). In this area, the control unit 70 selects the position of the change-speed gear more suitable for the braking, either the fourth speed ($4^{th}$) or the fifth speed ($5^{th}$), based on a variety of conditions, and carries out the braking control.

Figure 12:
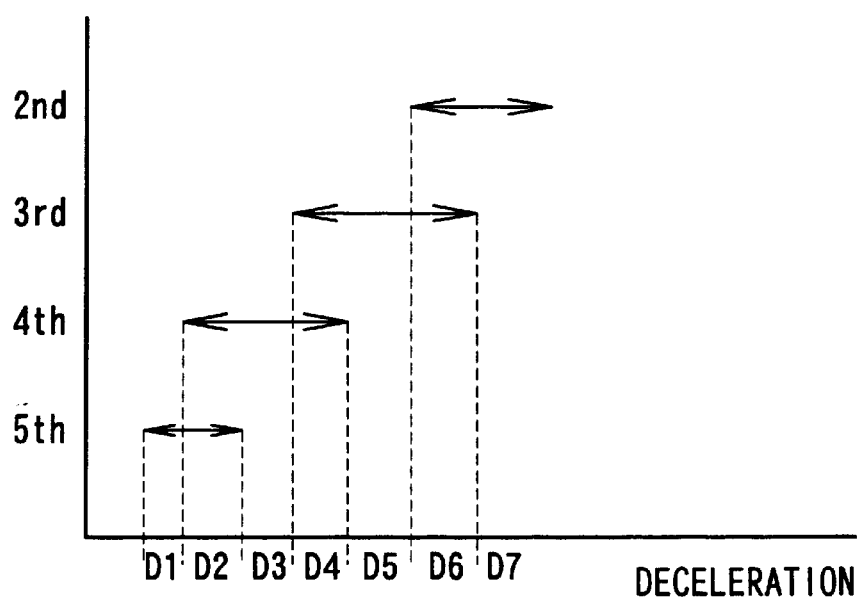
FIG. 12 is a map showing the relationship between the deceleration and the position of the change-speed gear at a certain vehicle speed Vs.

The settings at the respective positions of the change-speed gear in the embodiment are described more in detail. FIG. 12 is a map showing the relationship between the deceleration and the position of the change-speed gear at a certain vehicle speed Vs. The map of FIG. 12 corresponds to the relationship between the deceleration and the position of the change-speed gear along a straight line Vs in the map of FIG. 11. As shown in the map of FIG. 12, in a division D1 of a relatively low deceleration, the target deceleration is attained only at the fifth speed ($5^{th}$). In a division D2 of a higher deceleration, the target deceleration is attained at both the fifth speed ($5^{th}$) and the fourth speed ($4^{th}$). In a similar manner, the respective target decelerations are attained only at the fourth speed ($4^{th}$) in a division D3, at both the third speed ($3^{rd}$) and the fourth speed ($4^{th}$) in a division D4, only at the third speed ($3^{rd}$) in a division D5, at both the second speed ($2^{nd}$) and the third speed ($3^{rd}$) in a division D6, and only at the second speed ($2^{nd}$) in a division D7, where the deceleration increases in the order of the division D3 to the division D7. Although the map described here is for the braking control up to the second speed ($2^{nd}$), the map may also include the setting at the first speed ($1^{st}$).

Figure 13:
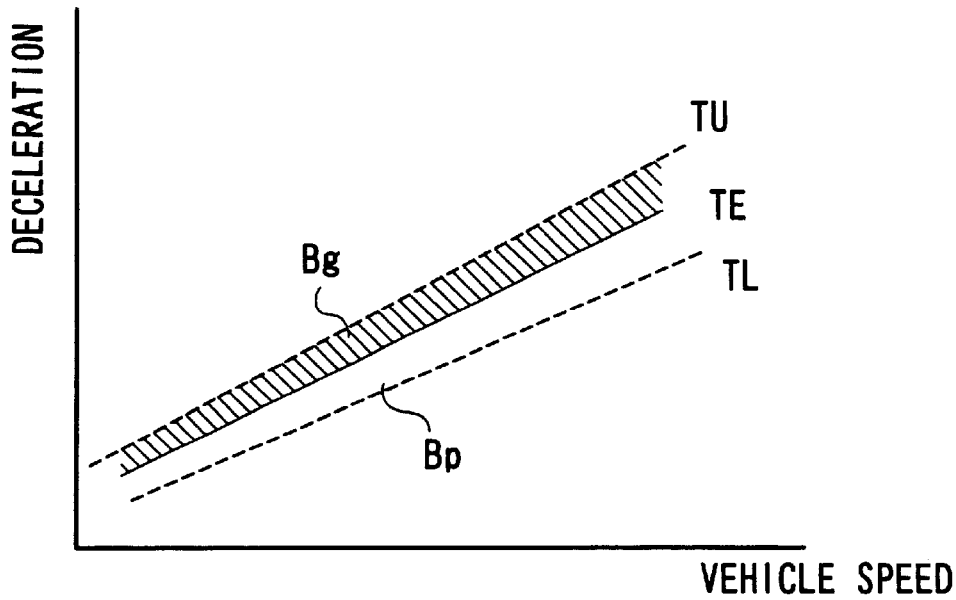
FIG. 13 is a graph showing a variation in deceleration at a fixed position of the change-speed gear.

The following gives the reason why the range of deceleration attained at each position of the change-speed gear overlaps the adjacent ranges of deceleration. FIG. 13 is a graph showing a variation in deceleration at the second speed ($2^{nd}$). Dashed lines TL and TU respectively represent the lower limit and the upper limit of deceleration attained at the second speed ($2^{nd}$). A solid line TE represents the deceleration attained only by engine brake of the engine 10. In the hybrid vehicle of the embodiment, the control of the VVT mechanism enables the deceleration by engine brake to be varied. Such control, however, has poor response and low accuracy. The technique of the embodiment accordingly does not control the VVT mechanism in the course of braking. The deceleration by engine brake is thus unequivocally determined corresponding to the vehicle speed as shown in FIG. 13.

In the hybrid vehicle of this embodiment, the deceleration is varied by regulating the torque of the motor 20. In a hatched area Bg of FIG. 13, the motor 20 carries out the regenerative operation and applies an additional braking force, thereby attaining a higher deceleration than the deceleration only by engine brake. In another area Bp, which is defined by the straight line TE and the dashed line TL, the motor 20 carries out the power operation and outputs a driving force, thereby attaining a lower deceleration than the deceleration only by engine brake.

Figure 14:
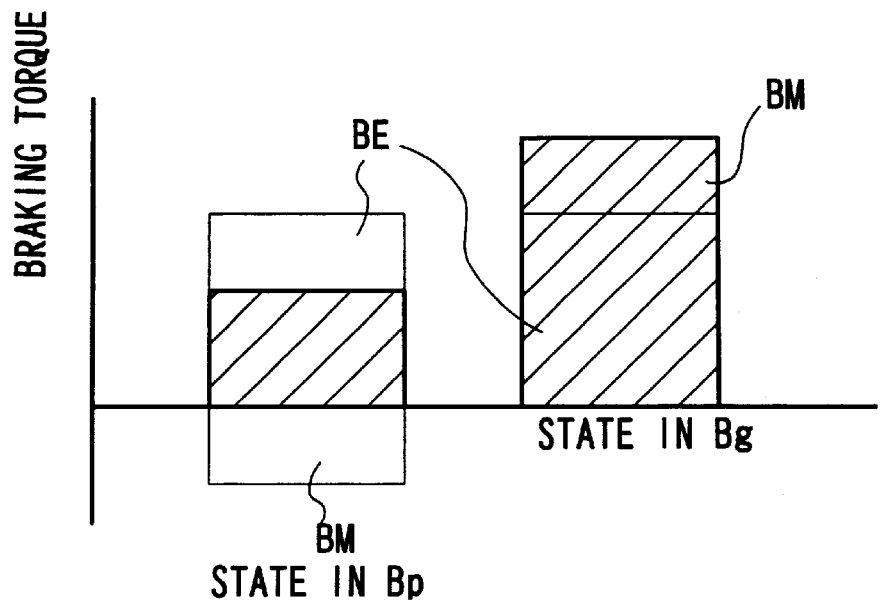
FIG. 14 schematically illustrates a comparison between a braking torque in the case where the motor 20 carries out the regenerative operation and a braking torque in the case where the motor 20 carries out the power operation.

FIG. 14 schematically illustrates the comparison between a braking torque in the case where the motor 20 carries out the regenerative operation and a braking torque in the case where the motor 20 carries out the power operation. The left bar in the graph shows the braking torque when the motor 20 carries out the power operation (that is, the state in the area Bp). The braking torque by engine brake is expressed as a bar BE. In the area Bp, the motor 20 outputs a driving force expressed as a bar BM in reverse of the direction of the braking torque BE by engine brake. The total braking torque, which is obtained as the sum of the braking torque by engine brake and the driving force by the motor 20, is output to the axle 17. The output braking torque is accordingly smaller than the braking torque BE by engine brake as shown in a hatched area.

The right bar in the graph shows the braking torque when the motor 20 carries out the regenerative operation (that is, the state in the area Bg). It is assumed that the braking torque BE by engine brake in the area Bg is identical with the braking torque BE in the area Bp. In the area Bp, the motor 20 outputs an additional braking torque expressed as a bar BM in the same direction as that of the braking torque by engine brake. The total braking torque, which is obtained as the sum of the braking torque by engine brake and the additional braking torque by the motor 20, is output to the axle 17. The output braking torque is accordingly greater than the braking torque BE by engine brake as shown in a hatched area.

The hybrid vehicle of the embodiment changes the driving state of the motor 20 between the regenerative operation and the power operation, so as to attain the higher deceleration and the lower deceleration than the deceleration only by engine brake. The map of FIG. 11 is set to make the area of deceleration attained by the power operation of the motor 20 at a specific position of the change-speed gear having a greater gear ratio overlap the area of deceleration attained by the regenerative operation of the motor 20 at a specific position of the change-speed gear having a smaller gear ratio. For example, the braking area by the power operation of the motor 20 at the second speed ($2^{nd}$) is made to overlap the braking area by the regenerative operation of the motor 20 at the third speed ($3^{rd}$).

This arrangement ensures the braking control according to the remaining charge SOC of the battery 50. In the case where the battery 50 is in a state that allows further charging, the position of the change-speed gear having a smaller gear ratio is selected to attain the desired deceleration by the regenerative operation of the motor 20. In the case where the battery 50 is in a state that is close to the full charge, on the other hand, the position of the change-speed gear having a greater gear ratio is selected to attain the desired deceleration by the power operation of the motor 20. The technique of the embodiment sets the areas of deceleration at two adjacent positions of the change-speed gear in an overlapping manner, thereby attaining the desired deceleration irrespective of the remaining charge SOC of the battery 50.

The above settings are only one example, where the area of deceleration at each position of the change-speed gear overlaps the areas of deceleration at the adjacent positions of the change-speed gear as shown in the map of FIG. 11. One possible modification sets the area of deceleration attained at each position of the change-speed gear in a non-overlapping manner. Another possible modification sets the area of deceleration attained at each position of the change-speed gear partly in an overlapping manner.

The deceleration set in the above manner corresponds to the lower limit of the power-source braking applied to the vehicle. Here it is assumed that the deceleration is set on the straight line BL. In the case where the position of the change-speed gear is at the third speed ($3^{rd}$) in the area of higher vehicle speed than Vc, the actual deceleration is always greater than the deceleration corresponding to the straight line BL. Since the lower limit of deceleration is set in the hybrid vehicle of the embodiment, the desired deceleration is attained. In this case, the control procedure does not change over the position of the change speed gear to the fourth speed ($4^{th}$) or the fifth speed ($5^{th}$) to attain a relatively low deceleration corresponding to the straight line BL. In the event that the driver presses the Can-Decel switch to lower the setting of the deceleration, the position of the change-speed gear should be changed to attain the deceleration required by the driver.

As described above, the technique of this embodiment enables the braking control with the deceleration set by the driver. Such braking control is carried out when the gearshift lever is in the E position, and is hereinafter referred to as the E position braking control. The standard braking control is performed in the case where the gearshift lever is out of the E position. The standard braking control does not change over the position of the change-speed gear, unlike the E position braking control. The standard braking control accordingly implements the braking at the position of the change-speed gear set at the time when the power-source braking starts application. When the gearshift lever is set in the drive position (D), the vehicle is generally driven at the fifth speed ($5^{th}$). The braking is thus performed at a relatively low deceleration that can be attained at the fifth speed ($5^{th}$). When the gearshift lever is set in the fourth position (4), the vehicle is driven up to the fourth speed ($4^{th}$), the braking is performed at a little higher deceleration than that in the drive position (D). In the case of standard braking control, the motor 20 carries out the regenerative operation where a braking force gives a certain load. The standard braking control does not allow the wide range of deceleration at each position of the change-speed gear as shown in the map of FIG. 11, but attains only the deceleration along one straight line at each position of the change-speed gear.

A3. Drive Control Process

In the hybrid vehicle of the embodiment, the control unit 70 controls the operations of the engine 10 and the motor 20, so as to enable the driving discussed above. The following describes the details of the speed reduction control in the course of braking operation, which is characteristic of the hybrid vehicle of the embodiment.

Figure 15:
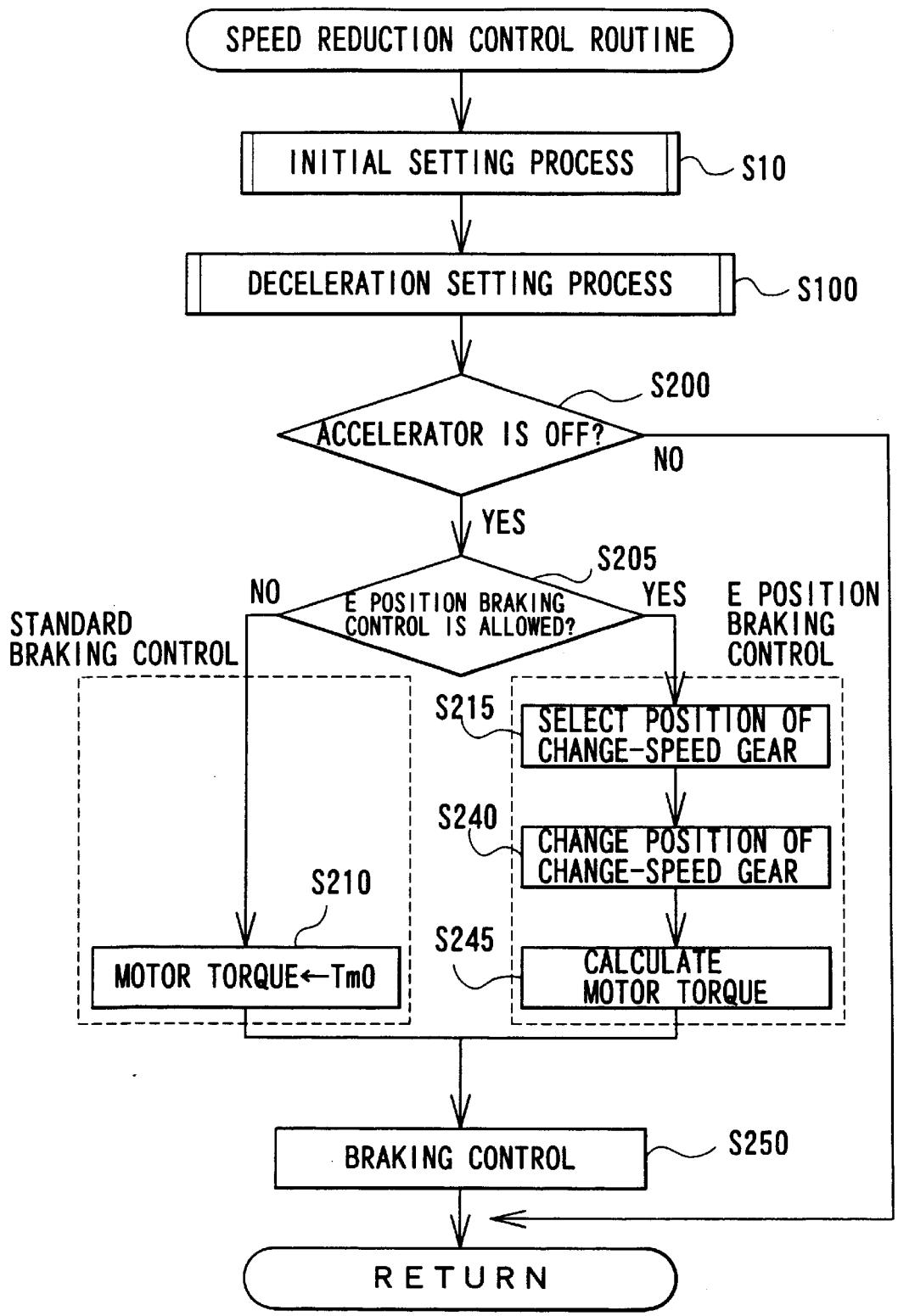
FIG. 15 is a flowchart showing a speed reduction control routine.

FIG. 15 is a flowchart showing a speed reduction control routine, which is executed at predetermined time intervals by the CPU included in the control unit 70. When the program enters the speed reduction control routine of FIG. 15, the CPU first carries out an initial setting process (step S10). The initial setting process includes the procedure of setting the initial value of the target deceleration required for the speed reduction control and canceling the setting of the target deceleration. The initial setting process is carried out every time the execution of the speed reduction control routine is repeated.

Figure 16:
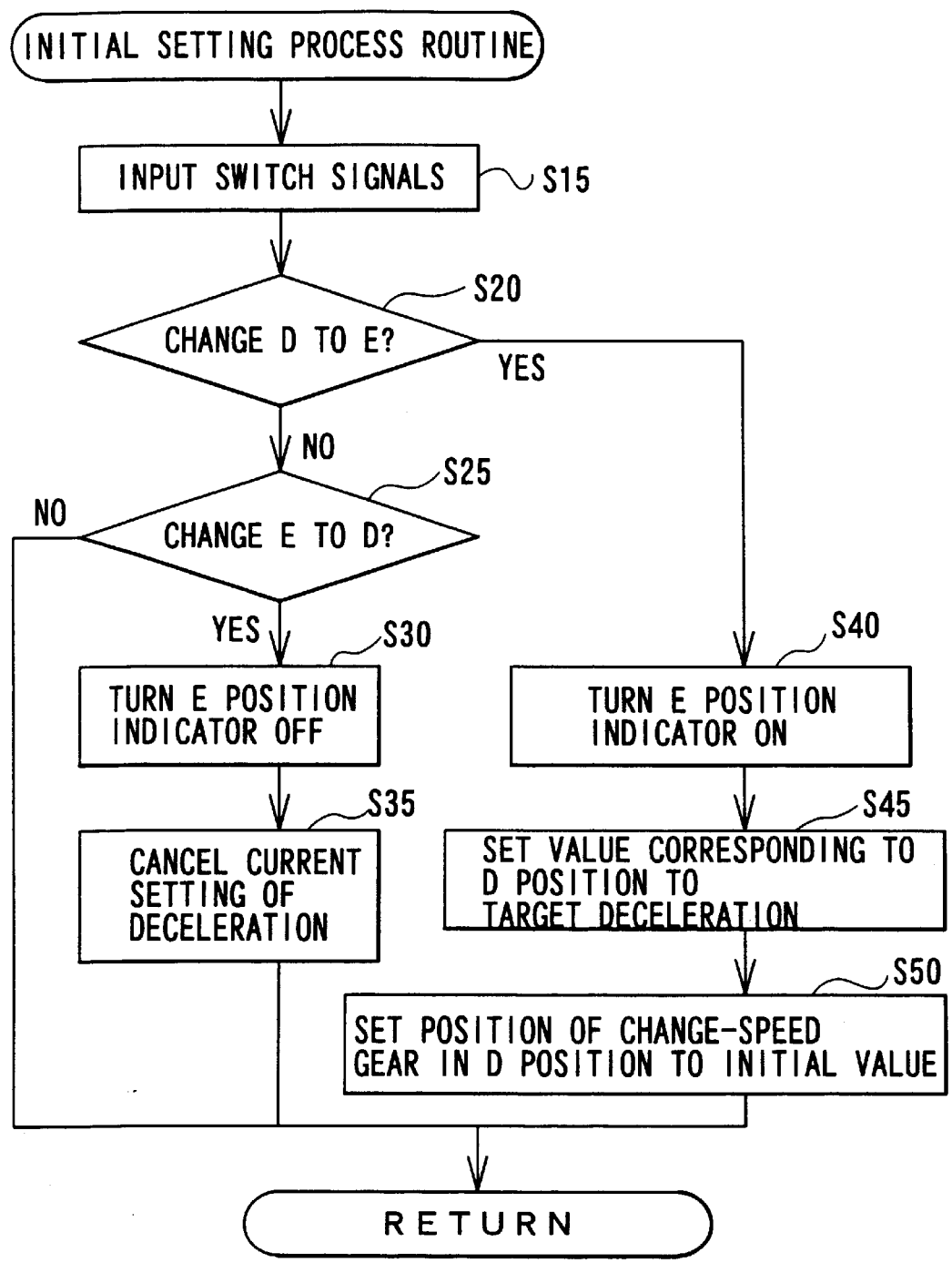
FIG. 16 is a flowchart showing a routine of the initial setting process.

FIG. 16 is a flowchart showing a routine of the initial setting process. In the initial setting process routine, the CPU first receives signals from various switches (step S15). The signals input here are those shown in FIG. 8. The signals directly relating to the initial setting process routine are only the gearshift position signal and the E position switch signal. The processing of step S15 may accordingly input only the gearshift position signal and the E position switch signal.

The CPU then determines whether or not the gearshift position has been changed from the D position to the E position, based on the input signals (step S20). In the case where the currently input gearshift position is the E position and the previously input gearshift position is the D position, the CPU determines that the above change has been implemented. The determination may alternatively be carried out, based on the change of the state of the E position switch from the OFF position to the ON position.

When it is determined that the gearshift position has been changed from the D position to the E position, the E position indicator (see FIG. 7) is turned on (step S40). An ON signal for turning the E position indicator on is output as the system indicator signal shown in FIG. 8. The E position indicator lights up in response to this ON signal. Simultaneously with the light-up of the E position indicator, the CPU sets an initial value corresponding to the D position to the target deceleration (step S45).

In the case where the power-source braking starts application at the fifth speed ($5^{th}$) while the gearshift lever is set in the D position, the processing of step S45 sets the target deceleration corresponding to the deceleration attained at the fifth speed ($5^{th}$) as the initial value. In this embodiment, as shown in the map of FIG. 11, in the area of low vehicle speed, the minimum possible deceleration (defined by the straight line BL) may be higher than the deceleration attained at the fifth speed ($5^{th}$). Although not specifically shown in the flowchart, the setting of the target deceleration at step S45 is performed only in the possible range of deceleration at the E position. When the deceleration attained at the D position is lower than the minimum possible deceleration (the straight line BL) at the E position, the value corresponding to the straight line BL is set to the target deceleration. The initial setting of the target deceleration accordingly depends upon the position of the change-speed gear used in the D position. Namely the initial setting of the target deceleration is equivalent to the deceleration attained at the D position in the area of relatively high vehicle speed. The initial setting of the target deceleration may, however, be higher than the deceleration attained at the D position in the area of relatively low vehicle speed.

One modified processing of step S45 unconditionally sets an initial value higher than the deceleration attained at the D position to the target deceleration. In many cases, the driver desires to change the deceleration at the E position when feeling insufficiency of the deceleration attained at the D position. Setting the initial value higher than the deceleration at the D position to the target deceleration at step S45 enables the deceleration required by the driver to be attained quickly. The processing of step S45 sets the initial value of the target deceleration at the E position, based on the deceleration attained at the D position. This arrangement enables the driver to easily estimate the value of deceleration immediately after the change of the gearshift position to the E position. This facilitates the setting of the deceleration at the E position and reduces the sense of incompatibility at the time of change to the E position.

The CPU then sets the position of the change-speed gear used in the D position to an initial position of the change-speed gear (step S50). As described previously, the hybrid vehicle of the embodiment regulates the torque of the motor 20 in combination with the changeover of the position of the change-speed gear at the E position, thereby attaining the braking at the target deceleration. The target deceleration here represents the minimum deceleration desired by the driver. In the case where the deceleration corresponding to the straight line BL in the map of FIG. 11 is set to the target deceleration, the position of the change-speed gear attaining the desired deceleration at the vehicle speed Vs can be selected among the second speed ($2^{nd}$) through the fifth speed ($5^{th}$). The processing of step S50 sets the position of the change-speed gear used in the D position among the possible alternatives to the initial value. This arrangement prevents the position of the change-speed gear from being changed simultaneously with the change of the gearshift position to the E position. This favorably reduces possible shocks at the time of the change to the E position.

When it is determined at step S20 that the gearshift position has not been changed from the D position to the E position, on the other hand, the CPU determines whether or not the gearshift position has bee changed from the E position to the D position (step S25). In the case where the currently input gearshift position is the D position and the previously input gearshift position is the E position, the CPU determines that the above change has been implemented. The determination may alternatively be carried out, based on the change of the state of the E position switch from the ON position to the OFF position.

When it is determined that the gearshift position has been changed from the E position to the D position, the E position indicator (see FIG. 7) is turned off (step S30). An OFF signal for turning the E position indicator off is output as the system indicator signal shown in FIG. 8. The E position indicator lights out in response to this OFF signal. Simultaneously with the light-out of the E position indicator, the CPU cancels the current setting of the target deceleration (step S35). The driver operates the Decel switch and the Can-Decel switch to set the desired deceleration during the drive at the E position as discussed later. The processing of step S35 cancels such setting of the desired deceleration.

In many cases, the deceleration required by the driver varies according to the driving state of the vehicle. There is accordingly not much necessity of storing the setting of the target deceleration as the provision for the next selection of the E position. The driver rarely remembers the previous setting of the target deceleration. The structure of not canceling the current setting of the target deceleration but using the current setting in the case of next selection of the E position may cause the braking control to be performed with the deceleration against the expectation of the driver, simultaneously with the change of the gearshift position to the E position. In order to prevent such troubles, the technique of this embodiment cancels the current setting of the target deceleration every time the gearshift position is changed from the E position to the D position.

A variety of techniques other than that discussed above may be applied to cancel the setting of the target deceleration. One available technique cancels the setting of the target deceleration every time the gearshift position is changed from the D position to the E position, instead of from the E position to the D position. The procedure of this embodiment sets the initial value of the target deceleration regardless of the previous setting at the time of the change to the E position. The processing of step S35 to cancel the setting may thus be omitted. An operation of canceling the setting the target deceleration may be provided separately. In this case, the setting of the target deceleration is not cancelled at the time of the change of the gearshift position from the E position to the D position, but is cancelled only in response to a specific operation, for example, an operation of a cancel switch.

As described above, the CPU carries out the initial setting of the target deceleration and the position of the change-speed gear or the cancellation of the setting of the target deceleration at the time of the change of the gearshift position to the E position or to the D position, and exits from the initial setting process routine. When it is determined at step S25 that the gearshift position has not been changed from the E position to the D position, that is, when the gearshift position has been kept at the E position or at the D position, the initial setting process does not require the change of the settings of the target deceleration and the position of the change-speed gear. The CPU accordingly exits from the initial setting process routine without any further processing.

Referring back to the flowchart of FIG. 15, after the conclusion of the initial setting process routine, the CPU carries out a deceleration setting process (step S100). The deceleration setting process sets the deceleration to be attained at the E position, in response to the operations of the Decel switch and the Can-Decel switch. The details of the deceleration setting process are described with reference to FIG. 17.

Figure 17:
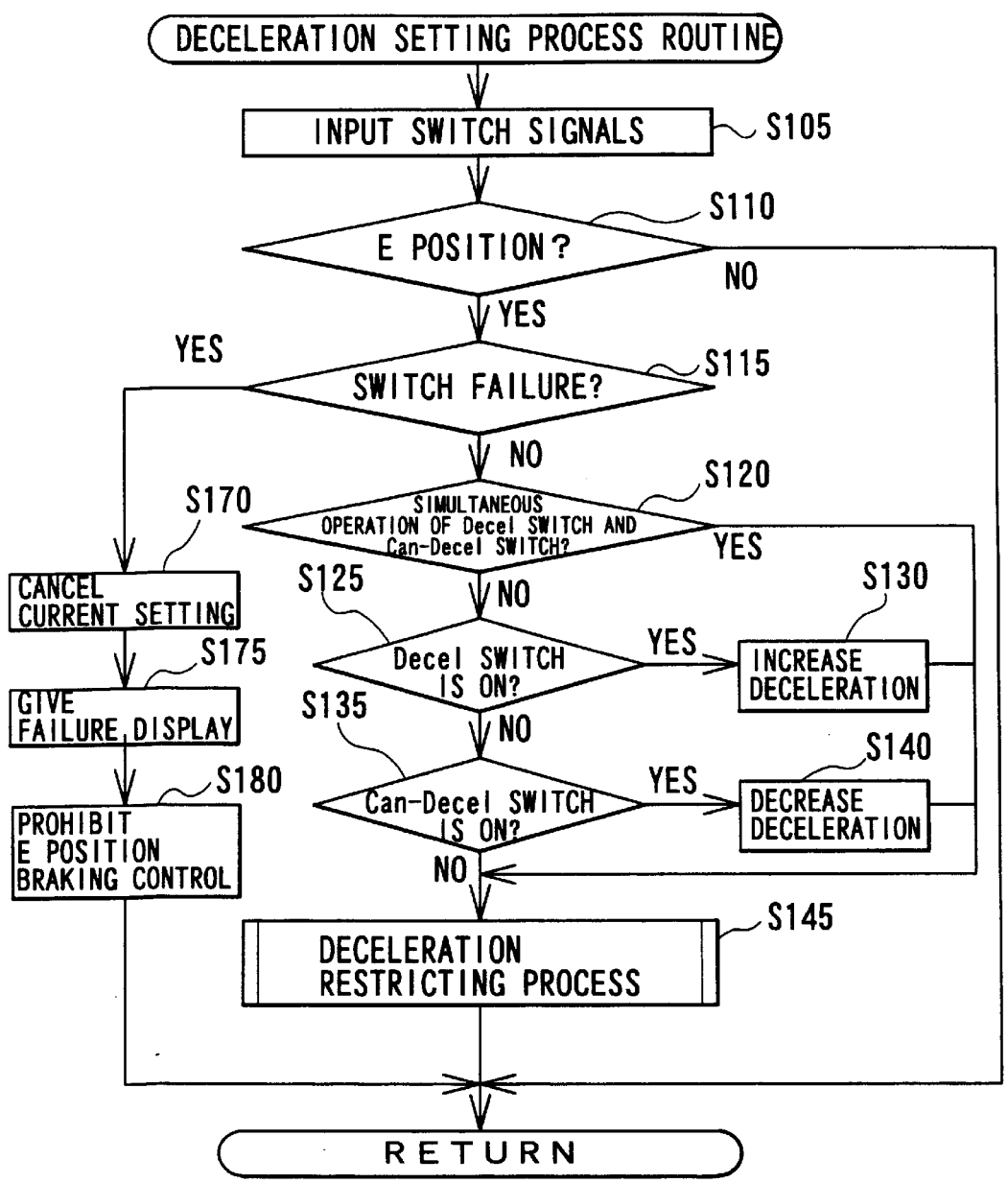
FIG. 17 is a flowchart showing a routine of the deceleration setting process.

FIG. 17 is a flowchart showing a routine of the deceleration setting process. When the program enters the deceleration setting process routine, the CPU first receives signals from various switches (step S105). The signals input here are the Decel switch signal, the Can-Decel switch signal, the E position switch signal, and the snow mode switch signal among the various signals shown in FIG. 8, although the other signals may be additionally input.

The CPU determines whether or not the E position has been selected, based on the input signals (step S110). More specifically the determination is based on the on-off state of the E position switch. When the E position has not been selected, the CPU determines that there is no necessity of changing the setting of the deceleration and exits from the deceleration setting process routine without any further processing.

When it is determined at step S110 that the E position has been selected, on the other hand, the CPU subsequently determines whether or not there is any failure with regard to the Decel switch and the Can-Decel switch (step S115). A variety of techniques are applicable to detect the possible failure. For example, in the case of a contact failure of the switch, chattering occurs to cause extremely frequent switch-over between the ON position and the OFF position. The detection of the on-off change at a frequency of or over a predetermined level for a preset time period leads to detection of the switch failure. On the contrary, the detection of the continuous switch-on state for a longer time period than expected from the standard operation also leads to detection of the switch failure.

When any failure of the switch is detected, the CPU cancels the current setting of the target deceleration (step S170), in order to prevent the deceleration from being set against the intention of the driver. The processing may alternatively keep the current setting of the target deceleration unchanged. The processing adopted in this embodiment takes into account the possibility that there is a failure of the switch while the driver corrects the deceleration set against the intention of the driver, and cancels the current setting of the target deceleration. After the cancellation of the setting of the target deceleration, the CPU gives a failure display, so as to inform the driver of the switch failure (step S175). A variety of techniques may be applied for the failure display. The technique adopted in this embodiment gives a sound alarm while flashing the E position indicator (see FIG. 7). These alarms are given by outputting adequate signals as the alarm signal and the system indicator signal shown in FIG. 8.

The CPU then prohibits the E position braking control (step S180). A concrete process of step S180 in this embodiment sets a prohibition flag, which is used to prohibit braking at the E position. As discussed later, in the actual process of braking control, braking at the E position is prohibited or allowed by the set and reset of the prohibition flag. This arrangement causes the braking control corresponding to the D position to be performed, whether or not the gearshift lever is at the E position. In the case of the switch failure, the CPU carries out the above processing and then exits from the deceleration setting process routine.

When it is determined at step S115 that there is no switch failure, the CPU shifts to the processing to change the setting of the target deceleration. The CPU first determines whether or not the Decel switch and the Can-Decel switch are operated simultaneously (step S120). In the case of the simultaneous operation of both the switches, it is unclear which of these switches is preferential. The CPU accordingly skips the subsequent process of changing the setting of the target deceleration and keeps the current setting of the target deceleration unchanged.

As shown in FIGS. 4 and 5, the hybrid vehicle of the embodiment sets the target deceleration with the switches provided on the gearshift lever and the steering wheel. There is a possibility that the driver simultaneously operates the switch on the gearshift lever and the switch on the steering wheel by accident or by mistake. The technique of the embodiment maintains the current setting of the target deceleration in the case of the simultaneous operation of both the Decel switch and the Can-Decel switch, in order to prevent the setting of the target deceleration from being changed by the wrong operation against the intention of the driver.

In the case of non-simultaneous operation of the Decel switch and the Can-Decel switch, on the other hand, the setting of the target deceleration is changed in response to the corresponding switch operation. When it is determined that the Decel switch is on (step S125), the CPU increases the value of the target deceleration (step S130). When it is determined that the Can-Decel switch is on (step S135), on the contrary, the CPU decreases the value of the target deceleration (step S140). In the procedure of this embodiment, the setting of the target deceleration is changed stepwise according to the frequency of operation of the corresponding switch. In the case of no operation of either switch, the setting of the target deceleration is naturally not changed.

Figure 18:
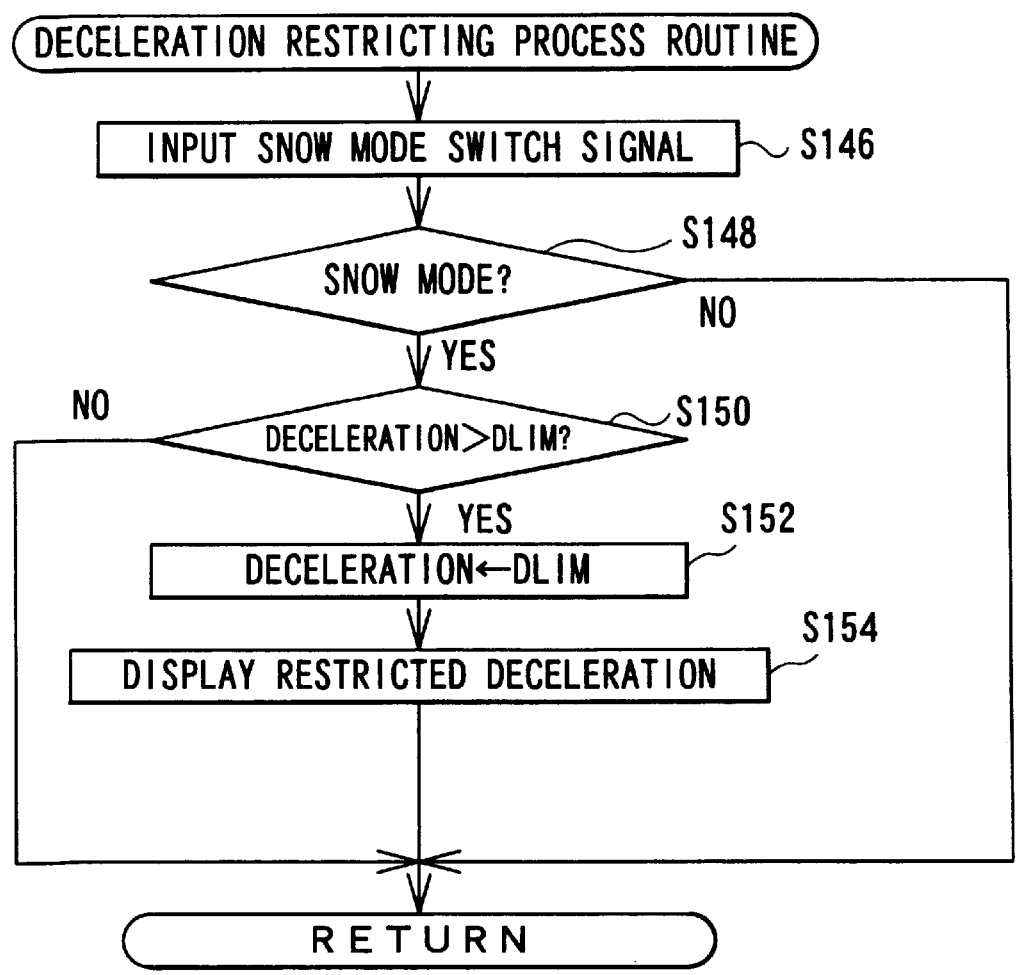
FIG. 18 is a flowchart showing a routine of the deceleration restricting process.

After setting the target deceleration by the processing discussed above (steps S120 through S140), the CPU carries out a deceleration restricting process (step S145). FIG. 18 is a flowchart showing a routine of the deceleration restricting process. In the deceleration restricting process routine, the CPU first receives the signal of the snow mode switch (see FIG. 4) (step S146). The technique of this embodiment changes the upper limit of deceleration, based on the on-off state of the snow mode switch. When it is determined that the snow mode switch is off, that is, in the case of non-snow mode (step S148), the CPU determines that there is no necessity of restricting the deceleration and immediately exits from the deceleration restricting process routine.

When it is determined that the snow mode switch is on, that is, in the case of snow mode (step S148), on the other hand, the target deceleration currently set by the processing of steps S125 through S140 in the deceleration setting process routine is compared with an upper limit DLIM (step S150). In the case where the target deceleration is not higher than the upper limit DLIM, the CPU determines that there is no necessity of restricting the deceleration and exits from the deceleration restricting process routine without any further processing. In the case where the target deceleration is higher than the upper limit DLIm, on the other hand, the value DLIM is set to the target deceleration, in order to restrict the deceleration (step S152). The driver presses the snow mode switch on when driving on the road surface having a low friction coefficient, such as the snow-covered road. Abrupt braking during a drive on the road surface of a low friction coefficient may cause a slip or a skid of the vehicle. When the driver sets the snow mode switch on, the upper limit of deceleration is restricted to a preset value that prevents a possible slip or a skid of the vehicle.

The deceleration restricting process routine is executed repeatedly at predetermined time intervals. In the case where the snow mode switch is on in the course of the braking control, the restriction of the upper limit of deceleration is actually implemented at a first timing when the deceleration restricting process routine is executed after the on-operation of the snow mode switch. In the case where the snow mode switch is off in the course of the braking control, on the contrary, the restriction of the upper limit of deceleration is cancelled at a first timing when the deceleration restricting process routine is executed after the off-operation of the snow mode switch. The execution of the deceleration restricting process routine is repeated at relatively short time intervals. The time lag between the operation of the snow mode switch and the restriction of the deceleration or its cancellation is negligible in the actual state. In the hybrid vehicle of this embodiment, the operation of the snow mode switch is made effective not only before the start of braking control but even after the start of braking control.

The CPU informs the driver of the restricted setting of the target deceleration (step S154), simultaneously with the above processing. The technique adopted in this embodiment flashes the deceleration indicator 224 for approximately one second, simultaneously with sounding an alarm. These alarms are given by outputting adequate signals as the alarm signal and the deceleration indicator signal shown in FIG. 8. After restricting the target deceleration to be not higher than the upper limit DLIM according to the on-off state of the snow mode switch, the CPU exits from the deceleration restricting process routine and returns to the deceleration setting process routine of FIG. 17. The CPU displays the preset deceleration on the deceleration indicator 224 (see FIG. 7) (step S160), and exits from the deceleration setting process routine.

Figure 19:
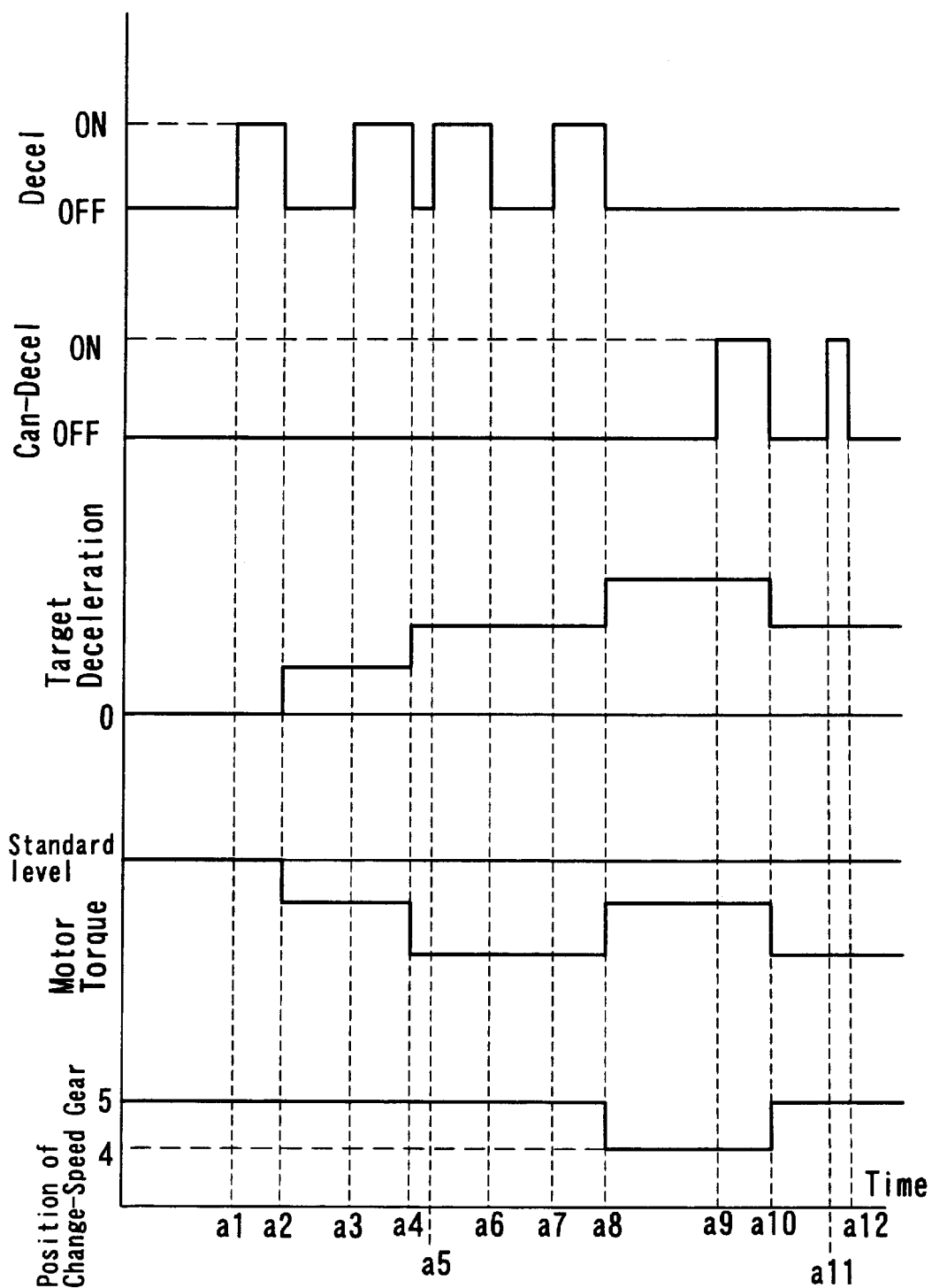
FIG. 19 is a timing chart showing a first example of the setting of the deceleration.

The detailed process of changing the setting of the target deceleration by the processing discussed above (steps S120 through S140) is described with referring to concrete examples of FIGS. 19 through 22. FIG. 19 is a timing chart showing a first example of the setting. In the timing chart of FIG. 19, variations of the on-off state of the Decel switch and the Can-Decel switch, the setting of the target deceleration, the torque of the motor 20 to attain the target deceleration, and the position of the change-speed gear are plotted against the time. The vehicle speed is set to a fixed value in the example of FIG. 19.

The Decel switch is on at a time point a1. Although not specifically shown in the flowchart of FIG. 17, the technique of this embodiment accepts the change of the setting only when the switch is continuously on for a predetermined time period. The CPU inputs the operation of the switch at step S105 in the deceleration setting process routine (FIG. 17), based on the determination of whether or not the switch is continuously on for a predetermined time period. Because of the phenomenon called chattering, the on signal and the off signal are detected alternately at very short cycles when the switch is turned on or off. The structure of accepting the change of the setting after the elapse of the predetermined time period effectively prevents the deceleration from being significantly changed against the intention of the driver due to the chattering.

Accepting the input of the switch after the continuous actuation thereof for the predetermined time period desirably prevents the setting of the target deceleration from being changed when the driver unintentionally touches the switch. The mechanism of preventing the setting of the target deceleration from being changed by an accidental operation of the switch is especially effective in the structure of the embodiment where the Decel switches and the Can-Decel switches are provided on the steering wheel.

The predetermine time period (hereinafter referred to as the on-decision reference time) is set as the criterion used to determine whether the driver operates the switch intentionally or unintentionally. The shorter on-decision reference time heightens the possibility that the setting of the target deceleration is changed even by an accidental operation of the driver. The longer on-decision reference time, however, worsens the response of the Decel switch and the Can-Decel switch. An appropriate value is set, for example, experimentally, to the on-decision reference time by taking into account these conditions. The driver may alternatively set a desired value to the on-decision reference time.

In the example of FIG. 19, the time period between the time point a1 and a time point a2 exceeds the on-decision reference time. The target deceleration is accordingly increased by one step at the time point a2. As described previously with FIG. 11, the technique of the embodiment carries out the torque control in combination with the changeover of the position of the change-speed gear, in order to attain an arbitrary deceleration in a wide range. As clearly shown in the map of FIG. 11, the target deceleration is varied on the large scale by changing over the position of the change-speed gear and on the fine scale by regulating the motor torque. In this embodiment, the target deceleration is varied stepwise on a relatively fine scale. The variation of the deceleration at the time point a2 in FIG. 19 is not accompanied with the changeover of the position of the change-speed gear but is implemented by the regulation of the motor torque. In this example, the fifth speed ($5^{th}$) is set as the initial position of the change-speed gear.

When the Decel switch is continuously on for a time period between time points a3 and a4, which exceeds the on-decision reference time, the target deceleration is further increased by another step as shown in FIG. 19. The variation of the deceleration at the time point a4 is also not accompanied with the changeover of the position of the change-speed gear but is implemented by the regulation of the motor torque. In this embodiment, the respective steps of the deceleration are set on the fine scale. This widens the possible range of selection on the setting of the target deceleration without changing over the position of the change-speed gear. The driver can thus readily set a desired deceleration. The motor torque is varied at the time point a4, whereas the position of the change-speed gear is kept at the fifth speed ($5^{th}$) as shown in FIG. 19.

In the technique of the embodiment, an operation interval reference time, which relates to the interval between successive operations of the switch, as well as the on-decision reference time, is set as the condition of accepting the input of the switch. In the case of successive operations of the switch, only when there is a time interval of or over the operation interval reference time between a first operation and a second operation, the second operation is accepted as effective. The CPU inputs the operation of the switch at step S105 in the deceleration setting process routine (FIG. 17), based on the determination of whether or not the time interval of or over the operation interval reference time has elapsed since the previous operation.

In the example of FIG. 19, as the third operation, the Decel switch is continuously on for a time period between time points a5 and a6. The time period exceeds the on-decision reference time. However, the time interval between the second operation and the third operation, that is, the time interval between the time points a4 and a5, is rather short. Here the time interval is shorter than the operation interval reference time. Although the operation time of the switch exceeds the on- decision reference time, the third operation is not accepted as effective and changes none of the setting of the target deceleration, the motor torque, and the position of the change-speed gear.

Using the operation interval reference time effectively prevents the setting of the target deceleration from being varied in an excessively abrupt manner in response to the operation of the driver. When the driver carries out some operation to vary the deceleration, there is generally a certain time delay to the actual speed reduction at the varied deceleration. If the change of the setting of the target deceleration is accepted without the operation interval reference time, there is a possibility that the setting of the target deceleration is successively changed without checking the actual decelerations attained by the successive settings. This may cause the deceleration to be varied significantly over the intention of the driver. The arrangement of this embodiment sets the operation interval reference time, in order to prevent such troubles.

The shorter operation interval reference time does not allow the sufficiently gentle: variation of the setting of the target deceleration. The longer operation interval reference time, however, requires an undesirably long time to vary the setting of the target deceleration, thereby lowering the controllability. An appropriate value is set, for example, experimentally, to the operation interval reference time by taking into account these conditions. The driver may alternatively set a desired value to the operation interval reference time.

In the example of FIG. 19, as the fourth operation, the Decel switch is continuously on for a time period between time points a7 and a8, which exceeds the on-decision reference time. The target deceleration is further increased in response to the fourth operation. The target deceleration is accordingly increased by three steps from the reference level prior to any operation of the Decel switch. In this embodiment, the variation in deceleration of this level is not attained only by regulating the motor torque. In response to the fourth operation, the position of the change-speed gear is thus changed from the fifth speed ($5^{th}$) to the fourth speed ($4^{th}$) with the increase of the target deceleration. The changeover of the position of the change-speed gear is implemented according to the map of FIG. 11 as discussed previously. Changing over the position of the change-speed gear to the fourth speed ($4^{th}$) widens the possible range of deceleration. The motor torque is accordingly decreased in response to the fourth operation, in order to attain the level of deceleration that is increased by three steps from the reference level. The motor torque is specified against the target deceleration and the position of the change-speed gear according to the map of FIG. 11.

Changing over the position of the change-speed gear with an increase in deceleration advantageously attains quick acceleration, as well as the required deceleration. After the braking is performed at a high deceleration, quick acceleration is generally required to return the vehicle speed to the previous level prior to the braking control. Changing over the position of the change-speed gear to a greater gear ratio with an increase in deceleration ensures the quick acceleration at the changed position of the change-speed gear after the braking control. Changing over the position of the change-speed gear according to the target deceleration thus improves the response of the vehicle at the time of speed reduction and acceleration.

The following description regards an operation to increase the deceleration. A similar operation is carried out to decrease the deceleration. In the example of FIG. 19, the Can-Decel switch is continuously on as the fifth operation for a time period between time points a9 and a10. The time period exceeds the on-decision reference time. The target deceleration is lowered by one step to the level set at the time point a4, in response to this operation. The position of the change-speed gear and the motor torque are simultaneously changed, so as to attain this deceleration.

As the sixth operation, the Can-Decel switch is continuously on for a time period between time points a11 and a12, which is however, shorter than the on-decision reference time. The sixth operation is accordingly ineffective and does not change the target deceleration, the motor torque, or the position of the change-speed gear. Although not specifically illustrated in the example of FIG. 19, when the time interval between two consecutive operations of the Can-Decel switch is shorter than the operation interval reference time, the second operation is determined to be ineffective and does not change the deceleration or other related factors.

Figure 20:
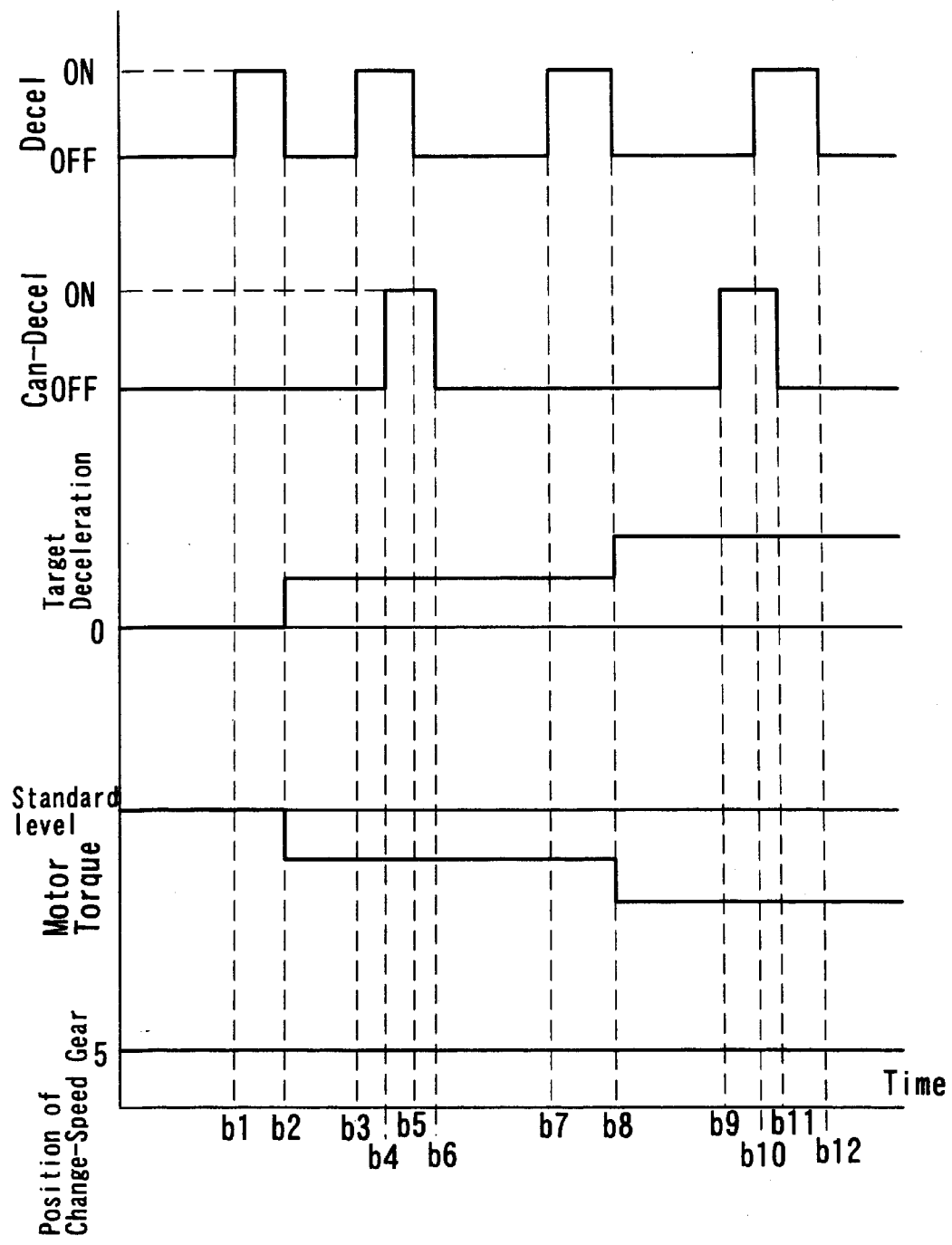
FIG. 20 is a timing chart showing a second example of the setting of the deceleration.

The following describes a second example of the setting of deceleration. FIG. 20 is a timing chart showing the second example of the setting of deceleration. In this example, the Decel switch is continuously on for a time period between time points b1 and b2, which exceeds the on-decision reference time. As described in the first example of the setting, the target deceleration is increased by one step in response to this operation. The motor torque also increases, in order to attain the target deceleration.

The Decel switch is then continuously on as the second operation for a time period between time points b3 and b6, which exceeds the on-decision reference time. In this case, the Can-Decel switch is also on for a time period between time points b4 and b6, with the operation of the Decel switch. A time period between the time point b3 at which the operation of the Decel switch starts and the time point b4 at which the operation of the Can-Decel switch starts is shorter than the on-decision reference time. At the time point b4 when the operation of the Can-Decel switch starts, the operation of the Decel switch is not accepted as effective.

As described previously in the deceleration setting process routine, the CPU of the control unit 70 does not change the setting of the target deceleration in the case of simultaneous operation of the Decel switch and the Can- Decel switch (see step S120 in FIG. 17). In the example of FIG. 20, although the Decel switch is continuously on for the time period between the time points b3 and b5, which exceeds the on-decision reference: time, this operation changes none of the target deceleration, the motor torque, and the position of the change-speed gear. This is because both the time period while only the Decel switch is operated (the time period between the time points b3 and b4) and the time period while only the Can-Decel switch is operated (the time period between the time points b5 and b6) are shorter than the on-decision reference time. In one example, if the time period between the time points b3 and b4 exceeds the on-decision reference time, the target deceleration is increased by one step in response to the operation of the Decel switch. In another example, if the time period between the time points b5 and b6 exceeds the on-decision reference time, the target deceleration is decreased by one step in response to the operation of the Can-Decel switch.

After the elapse of a time interval of or over the operation interval reference time, the Decel switch is continuously on as the third operation for a time period between time points b7 and b8, which exceeds the on-decision reference time. The third operation is accepted as effective and increases the setting of the target deceleration by another step and the motor torque.

In the second operation discussed above, the operation of the an-Decel switch starts while the Decel switch is continuously on. n the case of simultaneous operation of the Decel switch and the an-Decel switch where the Can-Decel switch is operated first, the setting of the target deceleration is not changed. In the example of FIG. 20, the Can-Decel switch is continuously on as the fourth operation for a time period between time points b9 and b11. The Decel switch is also on for a time period between time points b10 and b12, with the operation of the Can-Decel switch. Both the switches are simultaneously on for a time period between the time points b10 and b11. As described previously in the second operation, the fourth operation changes none of the target deceleration, the motor torque, and the position of the change-speed gear.

When the Decel switch and the Can-Decel switch are operated simultaneously, the setting of the target deceleration is kept unchanged. This arrangement effectively prevents the target deceleration from being changed mistakenly or accidentally against the intention of the driver. This arrangement also prevents the setting of the target deceleration from being changed frequently at the respective pressing timings of the Decel switch and the Can-Decel switch.

Figure 21:
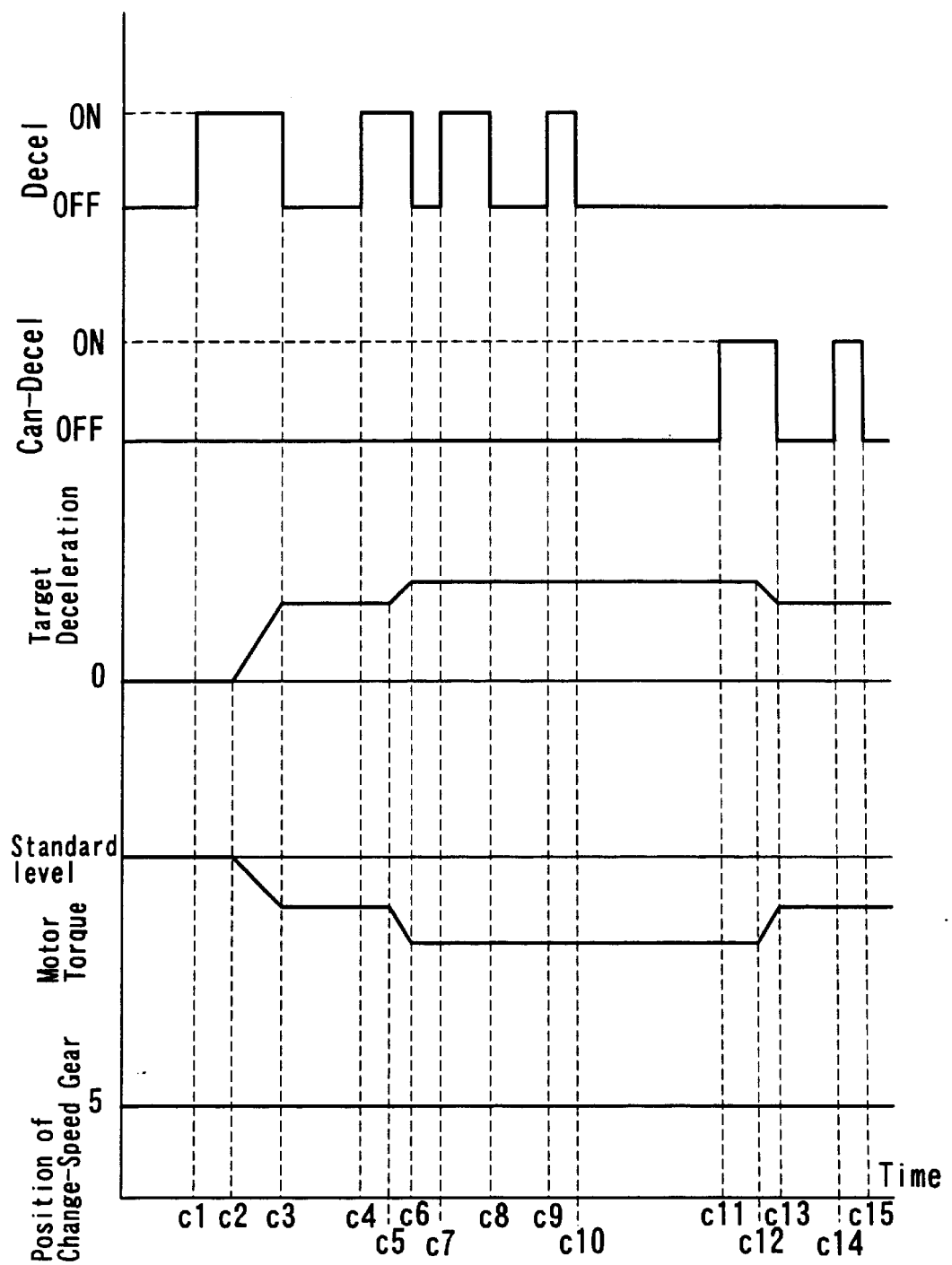
FIG. 21 is a timing chart showing a third example of the setting of the deceleration.

In the first and the second examples of the setting (FIGS. 19 and 20), the target deceleration is varied in a stepwise manner according to the frequency of operation of the Decel switch and the Can-Decel switch. This arrangement enables the target deceleration to be varied in a wide range by an operation of a relatively short time, thereby attaining the excellent controllability. The setting of the target deceleration may be varied in a continuous manner according to the operation time of the switch. The timing chart of FIG. 21 shows a third example of the setting of the target deceleration, which is varied according to the operation time.

In this example, the Decel switch is continuously on as the first operation for a time period between time points c1 and c3. Like the first and the second examples of the setting, the switch operation is accepted as effective when the time period of the switch operation exceeds the on-decision reference time. In the example of FIG. 21, a time period between the time points c1 and c2 corresponds to the on-decision reference time. In the first operation, the target deceleration is increased.in proportion to the operation time of the Decel switch between the time points c2 and b3. The motor torque simultaneously varies, in order to attain the target deceleration.

When the Decel switch is continuously on as the second operation for a time period between time points c4 and c6, the target deceleration is increased in proportion to the operation time of the Decel switch after the time period c5 when the on-decision reference time has elapsed since the start of the operation. The motor torque varies simultaneously with the increase in deceleration. In the third example of the setting, the target deceleration set by the first and the second operations is attained only by varying the motor torque, so that the position of the change-speed gear is not changed. In the case where the variation in target deceleration is not attained by only a variation in motor torque, the position of the change-speed gear is changed according to the map of FIG. 11.

The Decel switch is again continuously on as the third operation for a time period between time points c7 and c8. In this case, the time interval between the time point c6 when the second operation is concluded and the time point c7 when the third operation starts is shorter than the operation interval reference time. As described previously in the first example of the setting, the third operation is not accepted as effective and does not vary the target deceleration.

As the fourth operation, the Decel switch is continuously on for a time period between time points c9 and c10, which is shorter than the on-decision reference time. The fourth operation is accordingly not accepted as effective and does not vary the target deceleration.

In the third example of the setting, like the case of increasing the target deceleration, the target deceleration is decreased according to the operation time of the Can-Decel switch. When the Can-Decel switch is continuously on as the fifth operation for a time period between time points c11 and c13, the target deceleration is decreased in proportion to the operation time of the Can-Decel switch after the time period c12 when the on-decision reference time has elapsed.

As the sixth operation, the Can-Decel switch is continuously on for a time period between time points c14 and c15, which is shorter than the on-decision reference time. The fourth operation is accordingly not accepted as effective and does not vary the target deceleration.

The arrangement of varying the target deceleration continuously according to the operation time of the switch as described in the third example of the setting enables the driver to obtain the desired deceleration without operating the switch many times. The continuous variation in target deceleration ensures the minute regulation of the target deceleration according to the intention of the driver. Although the target deceleration is varied in proportion to the operation time of the switch in the third example of the setting, the target deceleration may be varied non-linearly relative to the operation time of the switch. One available process varies the target deceleration by a gentle slope at the beginning of the operation of the switch and by a more abrupt slope with an increase in operation time.

Figure 22:
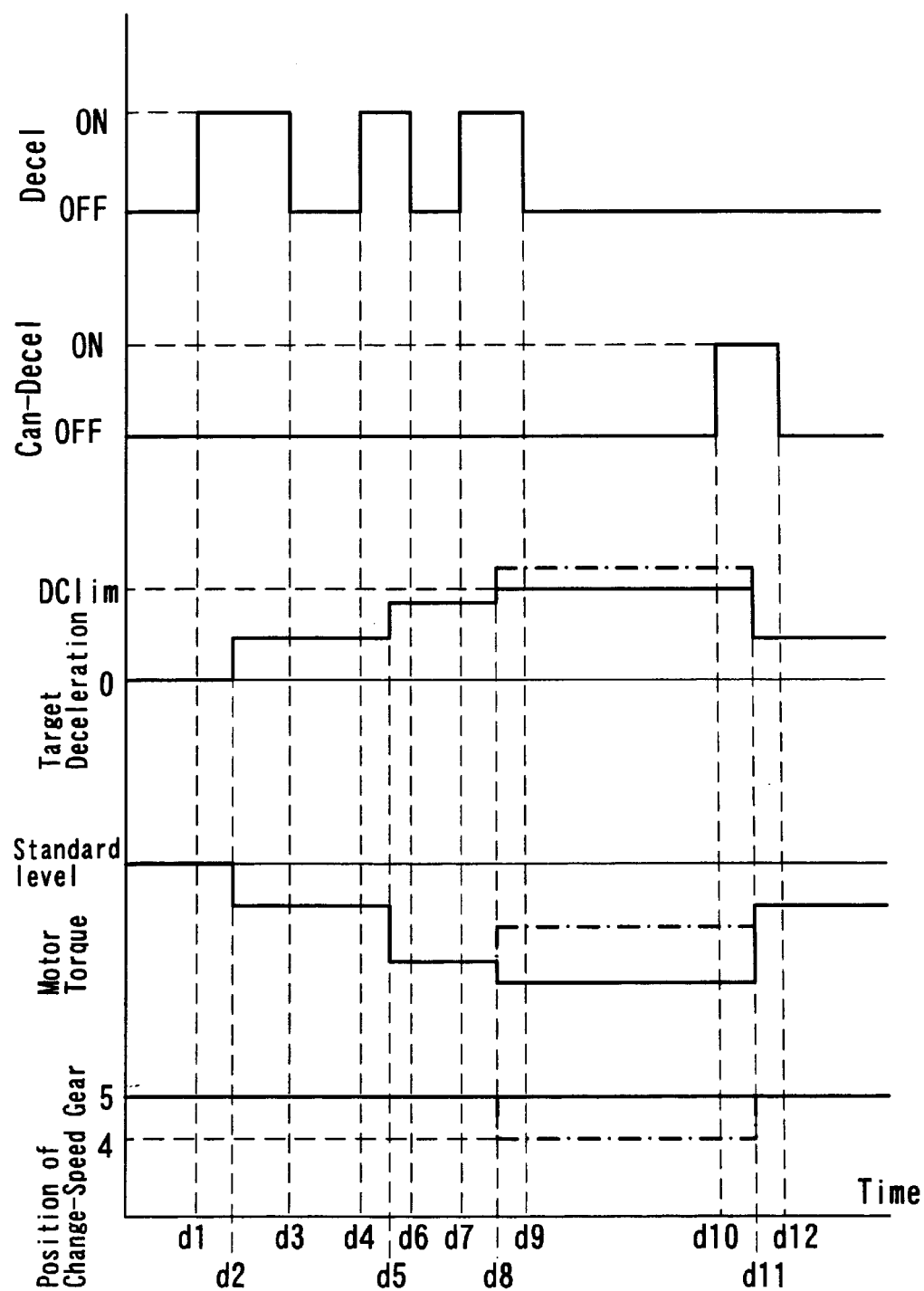
FIG. 22 is a timing chart showing a fourth example of the setting of the deceleration.

The timing chart of FIG. 22 shows a fourth example of the setting, where the target deceleration enters a rejection range. In this example, the Decel switch is continuously on as the first operation for a time period between time points d1 and d3. The operation of the Decel switch is accepted as effective at a time point d2 when the on-decision reference time has elapsed since the start of the operation. The first operation accordingly increases the target deceleration by one step and raises the motor torque.

When the Decel switch is continuously on again as the second operation for a time period between time points d4 and d6, the operation of the Decel switch is accepted as effective at a time point d5 when the on-decision reference time has elapsed. The second operation increases the target deceleration by another step and raises the motor torque.

The Decel switch is continuously on again as the third operation for a time period between time points d7 and d9. The operation of the Decel switch is accepted as effective at a time point d8 when the on-decision reference time has elapsed. The third operation also increases the target deceleration. In the case where the upper limit of the target deceleration is not set, the target deceleration is increased by one step as shown by the one-dot chain line in FIG. 22. In this case, like the first example of the setting (FIG. 19), the operation requires not only a variation in motor torque but a change in position of the change-speed gear as shown by the one-dot chain lines.

In the fourth example of the setting, however, the upper limit of the target deceleration is restricted to a value DClim. Varying the target deceleration to the value defined by the one-dot chain line in response to the third operation makes the target deceleration exceed the upper limit DClim. In this case, the target deceleration enters the rejection range. As described previously (see step S150 in the flowchart of FIG. 17), the target deceleration is restricted to the upper limit DClim, that is, a value defined by the solid line in FIG. 22. This also requires a variation in motor torque and a change in position of the change-speed gear respectively defined by the solid line. In the example of FIG. 22, the motor torque is higher than the level before the restriction, while the position of the change-speed gear maintains the fifth speed ($5^{th}$). This is based on the map of FIG. 11, in order to attain the deceleration DClim. The position of the change-speed gear and the motor torque after the restriction are, however, not limited to such variations.

As described above with some concrete examples, in the hybrid vehicle of this embodiment, the driver operates the Decel switch and the Can-Decel switch to set the desired deceleration. The arrangement of the embodiment effectively prevents the deceleration from being varied accidentally or extremely frequently against the intention of the driver.

After the conclusion of the deceleration setting process routine, the program returns to the speed reduction control routine (FIG. 15). The CPU determines whether or not the accelerator pedal is off, at the criterion of performing the power-source braking control (step S200). The determination is based on the input signal regarding the travel of the accelerator pedal (see FIG. 8). In the case where the accelerator pedal is not off, it is not the state of performing the power-source braking control. The CPU thus exits from the speed reduction control routine without any further processing.

In the case where the accelerator pedal is off, the CPU subsequently determines whether or not the E position braking control is allowed (step S205). As described previously in the deceleration setting process routine (FIG. 17), in the case of the switch failure, the prohibition flag is set to prohibit the E position braking control (step S180 in FIG. 17). When the prohibition flag is set, the CPU determines that the E position braking control is not allowed. The E position braking control is also not allowed when the gearshift lever is not in the E position.

When it is determined at step S205 that the E position braking control is not allowed, the CPU carries out the standard braking control and sets a predetermined negative value Tm0 to the target torque of the motor 20 (step S210). The predetermined value Tm0 is arbitrarily set within the range of the rated torque of the motor 20. In this embodiment, the predetermined value Tm0 is set to a level that ensures a sufficient deceleration at the D position by the power-source braking.

When it is determined at step S205 that the E position braking control is allowed, on the other hand, the CPU carries out the E position braking control. The concrete procedure of the E position braking control first selects the position of the change-speed gear (step S215) according to the procedure of FIG. 23.

Figure 23:
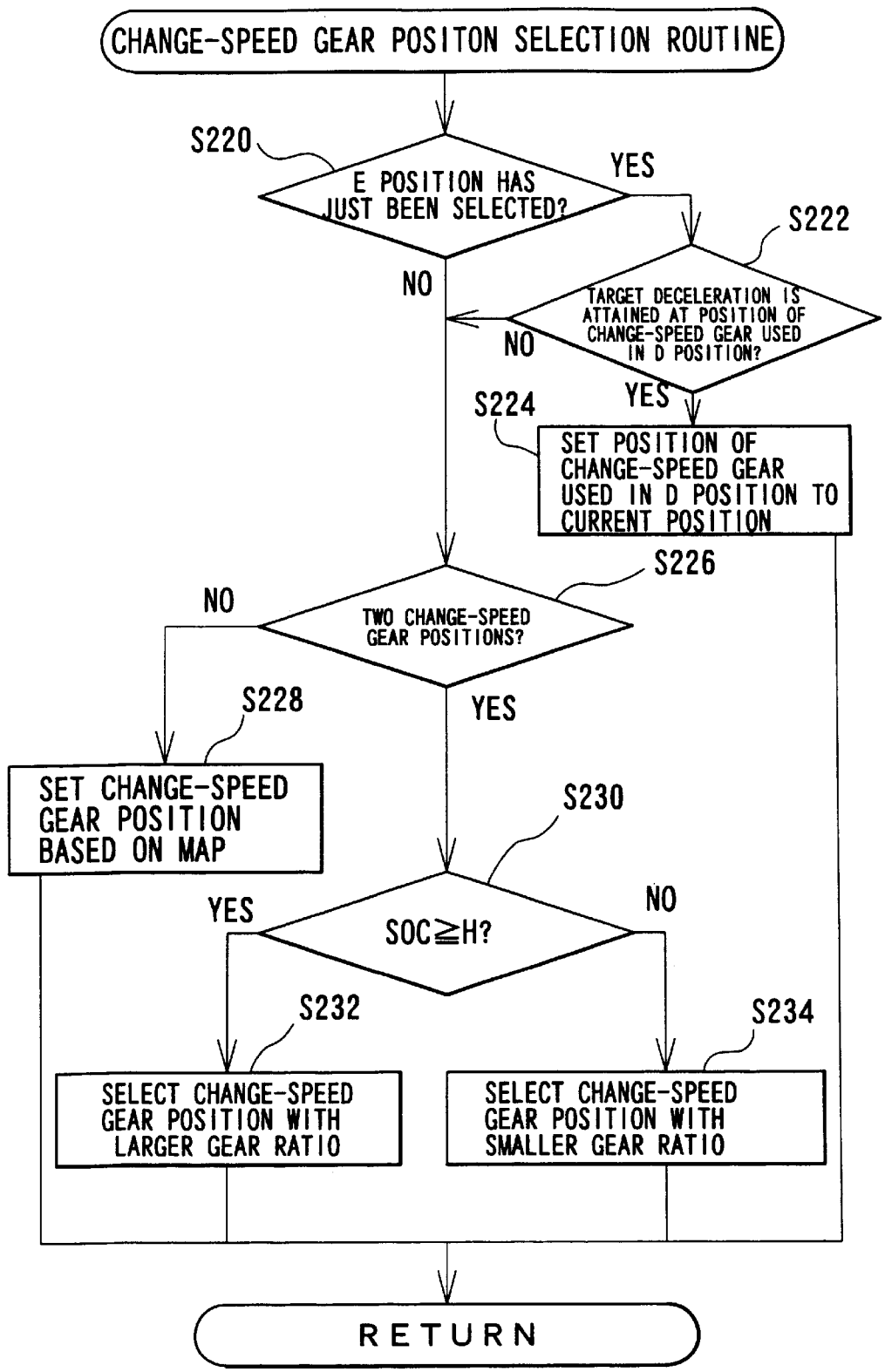
FIG. 23 is a flowchart showing a change-speed gear position selection routine.

FIG. 23 is a flowchart showing a routine of the change-speed gear position selection process. In the change-speed gear position selection routine, the CPU determines whether or not the E position has just been selected (step S220). Like step S20 in the initial setting process routine (FIG. 16), it is determined whether or not the gearshift position has just been changed from the D position to the E position. The term 'just' implies a time interval between the change of the gearshift position to the E position and the variation in setting of the target deceleration.

When it is determined that the E position has just been selected, the CPU subsequently determines whether or not a preset deceleration is attained at the position of the change-speed gear used in the D position (step S222). As described previously in the initial setting process routine (FIG. 16), when the gearshift position has just been changed from the D position to the E position, the position of the change-speed gear used in the D position is set to the initial position of the change-speed gear. The CPU accordingly determines whether or not the preset deceleration is attained at the initial position of the change-speed gear at step S222. In the case of an affirmative answer at step S222, the CPU sets the initial position of the change-speed gear, that is, the position of the change-speed gear used in the D position, to the current position of the change-speed gear (step S224). The preset deceleration means the required minimum deceleration as described previously. If the maximum deceleration attained at the position of the change-speed gear used in the D position is not lower than the preset deceleration, the CPU determines at step S222 that the preset deceleration is attained at the position of the change-speed gear used in the D position.

When it is determined at step S220 that the E position has just not been selected or when it is determined at step S224 that the preset deceleration is not attained at the position of the change-speed gear used in the D position, the position of the change-speed gear is set according to the map of FIG. 11. In this case, the CPU refers to the map and determines whether or not there are a plurality of different positions of the change-speed gear mapped to the preset target deceleration (step S226). In the case where there is only one position of the change-speed gear mapped to the preset deceleration, the position of the change-speed gear read from the map is set to the current position of the change-speed gear step S228).

In the case where there are two different positions of the change-speed gear mapped to the preset deceleration, on the other and, the CPU compares the remaining charge SOC of the battery 50 with a predetermined value H (step S230). As described previously with the map of FIG. 13, there are two different decelerations attained at each position of the change-speed gear, that is, the deceleration by the regenerative operation of the motor 20 and the deceleration by the power operation of the motor 20. When there are two different positions of the change-speed gear mapped to the preset deceleration, the preset deceleration is attained by the regenerative operation of the motor 20 at one position of the change-speed gear, while being attained by the power operation of the motor 20 at the other position of the change-speed gear. In the case where there are two different positions of the change-speed gear mapped to the preset deceleration, the appropriate position of the change-speed gear is selected according to the remaining charge SOC of the battery 50.

When the remaining charge SOC of the battery 50 is not less than the predetermined value H, it is desirable to consume the electric power accumulated in the battery 50, in order to prevent the battery 50 from being excessively charged. The CPU accordingly selects the position of the change-speed gear that attains the preset deceleration by the power operation of the motor 20, that is, the position of the change-speed gear having a larger gear ratio out of the two alternatives (step S232). When the remaining charge SOC of the battery 50 is less than the predetermined value H, on the other hand, it is desirable to charge the battery 50. The CPU accordingly selects the position of the change-speed gear that attains the preset deceleration by the regenerative operation of the motor 20, that is, the position of the change-speed gear having a smaller gear ratio out of the two alternatives (step S234). In order to prevent the position of the change-speed gear from being frequently switched over between the two alternatives according to the remaining charge SOC, it is desirable to set a certain hysteresis for the determination of step S230.

When the appropriate position of the change-speed gear is selected, the program returns to the speed reduction control routine. The CPU then actually changes over the position of the change-speed gear (step S240). The actual changeover of the position of the change-speed gear is implemented by outputting an appropriate signal to the transmission control signal (see FIG. 8) and controlling the on and off conditions: of the clutches and the brakes included in the transmission 100 according to the table of FIG. 3, based on the selected position of the change-speed gear.

After the position of the change-speed gear has actually been changed, the CPU calculates the target torque to be output from the motor 20 (step S245). The total torque to be output from the engine 10 and the motor 20 functioning as the power source is calculated from the preset deceleration, that is, the torque to be output to the axle 17, at the selected position of the change-speed gear according to Equations (2) through (6) with the gear ratios k1 through k5. The braking force output from the engine 10, that is, the power of the engine brake, is substantially unequivocally determined according to the revolving speed of the crankshaft 12. The torque to be output from the motor 20 is thus obtained by subtracting the torque by the engine brake from the total torque to be output from the power source.

In this embodiment, the target torque of the motor 20 is calculated in the above manner. A map for specifying the target torque of the motor 20 may alternatively be provided with the map of FIG. 11. Another possible procedure measures the deceleration of the vehicle with an acceleration sensor and feedback controls the torque of the motor 20, in order to attain the preset deceleration. Although the calculation of the motor torque is performed after the actual changeover of the position of the change-speed gear in the flowchart of FIG. 15, this is just for convenience of illustration. The calculation may thus be performed simultaneously with the actual changeover of the position of the change-speed gear.

The above processing causes the target torque of the motor 20 to be set under the standard braking control or under the E position braking control. The CPU then carries out a braking control (step S250), so as to control the operations of the motor 20 and the engine 10. The CPU stops the fuel injection to the engine 10 and the ignition, in order to apply the engine brake. The CPU may simultaneously control the VVT mechanism incorporated in the engine 10. Since the braking force by the power-source braking can be regulated by the torque of the motor 20, the procedure of this embodiment does not control the VVT mechanism here.

The motor 20 is driven by the PWM control. The CPU sets a voltage to be applied to the coils on the stator 24 in the motor 20. The voltage is determined corresponding to the revolving speed and the target torque of the motor 20, based on a preset table. In the case of the regenerative operation of the motor 20, a negative value is set to the voltage. In the case of the power operation of the motor 20, on the contrary, a positive value is set to the voltage. The CPU controls the on-off conditions of the respective transistors included in the driving circuit 40, in order to cause the preset voltage to be applied to the coils. The PWM control is a known technique and is thus not described in detail here.

The hybrid vehicle of the embodiment repeatedly carries out the speed reduction control routine discussed above, so as to implement the braking control by the power source braking. The hybrid vehicle may also carry out the braking control by the wheel braking in combination with the braking control by the power source braking.

The hybrid vehicle of the embodiment changes over the position of the change-speed gear in the transmission 100 according to the map shown in FIG. 11, while controlling the torque of the motor 20, thereby attaining the braking control at the desired deceleration corresponding to the instruction of the driver in a wide range. The arrangement enables the braking and acceleration of the vehicle to be carried out with the minimum frequency of the change of the foot position between the accelerator pedal and the brake pedal, thus significantly improving the controllability of the vehicle.

Applicability of the power-source braking in a wide range enables the kinetic energy of the vehicle to be recovered efficiently, thus improving the energy efficiency of the vehicle.

The hybrid vehicle of the embodiment carries out the restriction of the deceleration set by the driver in the snow mode. This effectively prevents the driver from setting the higher deceleration than required and thus prevents a slip or a skid of the vehicle due to the braking at the high deceleration on the road surface having a relatively small friction coefficient, such as the snow-covered road. This arrangement ensures the sufficient driving stability of the vehicle. This arrangement also enables the driver to vary the setting of the target deceleration without the fear of a skip or a skid of the vehicle, thus improving the controllability of the vehicle.

In the hybrid vehicle of the embodiment, the snow mode switch is located near the gearshift lever (see FIG. 4). The gearshift lever is disposed at a specific position that ensures the easy operation thereof. Positioning the snow mode switch near the gearshift lever accordingly ensures the excellent controllability for the driver. The snow mode switch may, however, be arranged on the gearshift lever, on the steering wheel, or at any suitable place.

The hybrid vehicle of the embodiment displays the restricted deceleration, that is, the fact that the deceleration set by the driver can not be attained, when the upper limit of the deceleration is restricted to the predetermined level. The driver can thus continuously drive the vehicle without feeling any incompatibility with regard to the deceleration attained and without having the fear of a possible failure.

In the hybrid vehicle of the embodiment, the map (FIG. 11) is specified to make two different positions of the change-speed gear mapped to each preset deceleration. Among the two positions of the change-speed gear, one corresponds to the regenerative operation of the motor 20 and the other corresponds to the power operation of the motor 20. Such specification of the map enables the hybrid vehicle of the embodiment to select an appropriate position of the change-speed gear according to the remaining charge SOC of the battery 50, so as to actuate the power source braking to brake the vehicle. This arrangement enables the hybrid vehicle of the embodiment to utilize the power source braking, irrespective of the remaining charge SOC of the battery 50, thereby attaining a drive of excellent operatability.

A4. First Modification of First Embodiment

Figure 24:
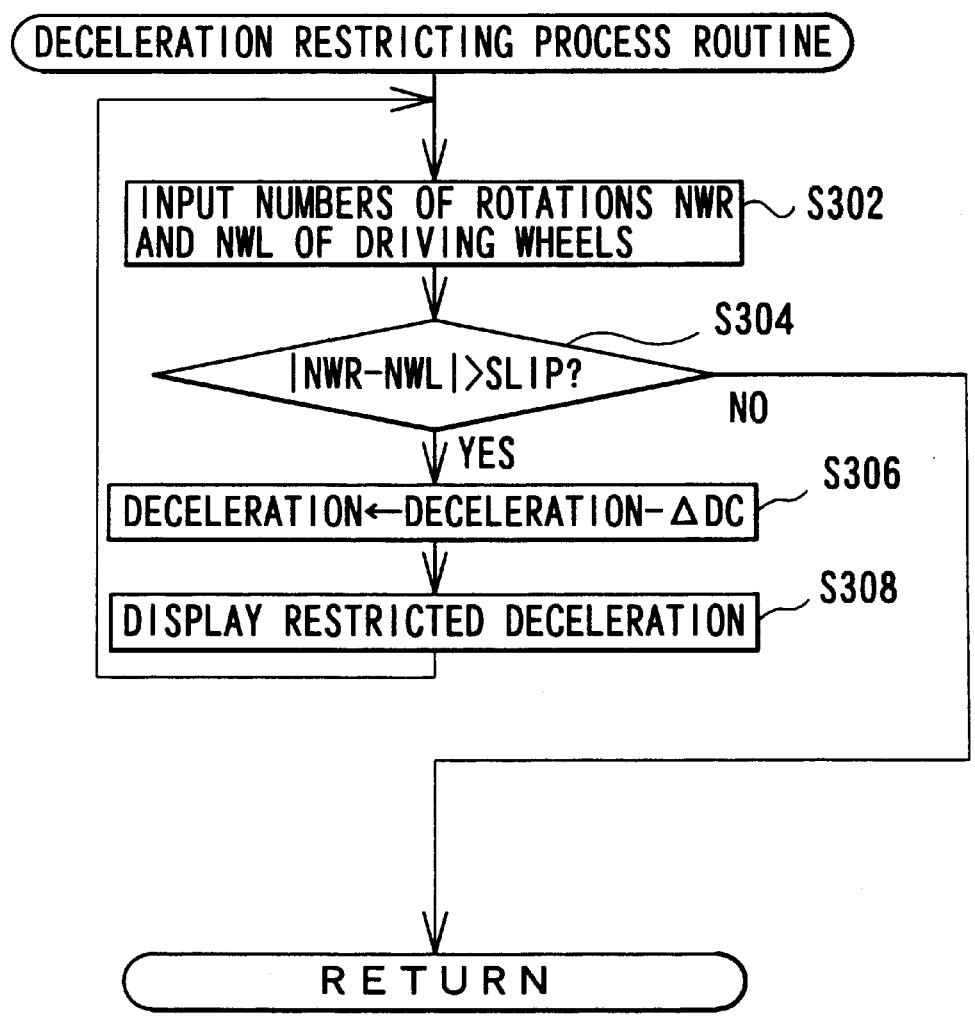
FIG. 24 is a flowchart showing another routine of the deceleration restricting process as one modification.

When the snow mode switch is on, the embodiment carries out the deceleration restricting process to restrict the deceleration not to be higher than the predetermined upper limit (see the flowchart of FIG. 18). A variety of other technique are applicable to restrict the deceleration. FIG. 24 is a flowchart showing another deceleration restricting process routine as one modification. In this modified procedure, the CPU detects the driving state of the vehicle and restricts the deceleration, irrespective of the on-off state of the snow mode switch.

When the program enters the deceleration restricting process routine of FIG. 24, the CPU first inputs numbers of rotations NWR and NWL of the driving wheels 18R and 18L (step S302). As described previously in FIG. 8, the numbers of rotations of the left and right driving wheels 18L and 18R are input to calculate the vehicle speed. The CPU separately inputs the respective numbers of rotations at step S302.

The CPU then calculates the absolute value of the difference between the numbers of rotations NWL and NWR and compares the absolute value with a predetermined reference value SLIP (step S304). The predetermined reference value SLIP is used as the criterion of the determination of whether or not a slip occurs on the driving wheels 18L and 18R. In the case of no slip, the number of rotations of the left driving wheel 18L is substantially coincident with the number of rotations of the right driving wheel 18R. When the vehicle changes the traffic lane, the difference in diameter of the inner ring causes a slight difference between the numbers of rotations of the left and right driving wheels 18L and 18R.

In the case of a slip, there is a significantly large difference between the numbers of rotations of the left and right driving wheels 18L and 18R. The reference value SLIP is accordingly set to be greater than the possible difference between the numbers of rotations occurring when the driver changes the lane but to be smaller than the possible difference between the numbers of rotations occurring at the time of a slip.

When it is determined that the absolute value of the difference between the numbers of rotations NWL and NWR of the driving wheels 18L and 18R is not greater than the predetermined reference value SLIP, there is no occurrence of the slip. The CPU accordingly exits from the deceleration restricting process routine without any further processing. When it is determined that the absolute value of the difference between the numbers of rotations NWL and NWR of the driving wheels 18L and 18R is greater than the predetermined reference value SLIP, on the other hand, there is occurrence of the slip. The CPU accordingly subtracts a predetermined value ΔDC from the preset deceleration (step S306), and informs the driver of the restricted setting of the deceleration (step S308). The same technique as described in the embodiment (see step S154 in the flowchart of FIG. 18) is applicable to display the restricted deceleration.

After the restriction of the deceleration, the CPU again reads the numbers of rotations NWR and NWL of the driving wheels 18R and 18L (step S302) and determines the occurrence or non-occurrence of a slip (step S304). The preset deceleration is successively decreased by the predetermined value ΔDC until there is no occurrence of a slip.

The restriction of the deceleration by the feedback control effectively prevents the occurrence of a slip or a skid of the vehicle. In the structure of the embodiment (FIG. 18), the deceleration is restricted to the predetermined upper limit that has an extremely low probability of causing a slip. This, however, means that there is still a very little possibility of causing a slip. The modified procedure of FIG. 24, on the other hand, ensures the perfect prevention of the occurrence of a slip and thereby further improves the driving stability of the vehicle. The modified procedure gradually lowers the deceleration until there is no occurrence of a slip. This arrangement effectively prevents the possible setting range of the deceleration from being narrowed unnecessarily. Although the procedure of FIG. 24 successively decreases the setting of the deceleration by the predetermined value ADC, the predetermined value may not be fixed but be varied according to any suitable technique adopted in the feedback control.

The deceleration restricting process routine of the modified procedure may be used in place of the deceleration restricting process routine of the embodiment (FIG. 18), or together with the routine of the embodiment. In the latter case, the deceleration can be restricted, based on both the requirement of the driver and the detected driving state of the vehicle. This further improves the driving stability of the vehicle.

Figure 25:
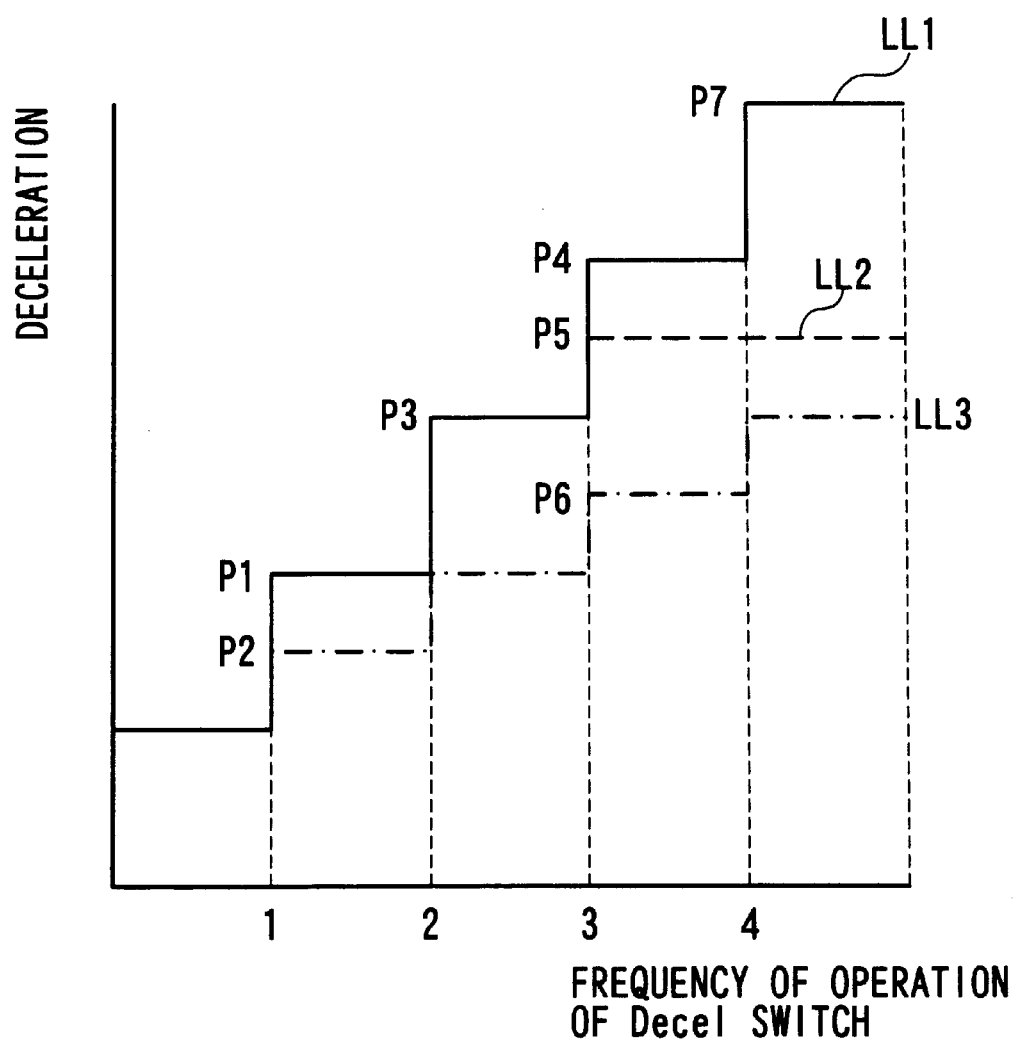
FIG. 25 is a graph showing another process of restricting the deceleration.

A variety of other techniques may be applied to restrict the deceleration. FIG. 25 is a graph showing another process of restricting the deceleration, or more specifically showing a stepwise variation of the deceleration in response to the operation of the Decel switch, with the deceleration as ordinate and the frequency of operations of the Decel switch as abscissa. When the deceleration is not restricted, the deceleration increases to a level corresponding to a point P1 by a first operation of the Decel switch, to a point P3 by a second operation, to a point P4 by a third operation, and to a point P7 by a fourth operation as shown by a plot LL1 of the solid line.

A plot LL2 of the dashed line represents the case where the upper limit of deceleration is restricted as discussed in the above embodiment. The upper limit of deceleration is set to a point P5 in the ON position of the snow mode switch. The deceleration should originally be increased to the point P4 and the point P7 by the third and the fourth operations of the Decel switch. When the deceleration restricting process is carried out, however, the upper limit of deceleration is restricted to the point P5. The deceleration accordingly varies as shown by the plot LL2 of the dashed line.

The upper limit of deceleration may alternatively be restricted by lowering the rate of increase of the deceleration by each operation of the Decel switch. A plot LL3 of the one-dot chain line represents a variation in deceleration when this technique is adopted. In this technique, in the ON position of the snow mode switch, the deceleration increases to a level corresponding to a point P2, which is lower than the level of the standard deceleration plot LL1, by the first operation of the Decel switch, to the point P1 by the second operation, to a point P6 by the third operation, and to the point P7 by the fourth operation. The four successive operations of the Decel switch set the deceleration to the level corresponding to the point P7 in the OFF position of the snow mode switch, but restrict the deceleration to the lower level corresponding to the point P3 in the ON position of the snow mode switch. In the graph of FIG. 25, for the simplicity of illustration, the upper limit of the plot LL2 is set to be different from the upper limit of the plot LL3.

The above description regards the restricting process in the case where the deceleration varies in a stepwise manner. The similar process is, however, applicable to the case where the deceleration varies in a continuous manner. In this case, the upper limit of deceleration may be restricted simply to a preset level. A gentler slope may alternatively be set to the variation in deceleration by each operation of the switch, in order to restrict the upper limit of deceleration. Although the upper limit of deceleration is set to a fixed value in the above description, the upper limit may be varied in a stepwise manner in response to the operation of the driver or according to the driving state of the vehicle.

The above embodiment and its modified example regard the case where the upper limit of deceleration is restricted. The principle of the present invention is, however, applicable to the case where the lower limit of deceleration is restricted. For example, when the vehicle runs with relatively narrow distances from adjacent vehicles on the same traffic lane, it is desirable to keep a certain level of deceleration, in order to assure a sufficient interval between vehicles. In such cases, for example, the driver operates a switch similar to the snow mode switch (see FIG. 4), so as to restrict the lower limit of deceleration to be not less than a predetermined level. In a vehicle with a sensor that measures distances from adjacent vehicles by utilizing radio wave or laser, the feedback control is carried out to vary the lower limit of deceleration, in order to assure the interval of or over a preset distance.

The above embodiment and its modified example regard the case in which the possible setting range of the deceleration is narrowed in response to the operation of the snow mode switch. The principle of the present invention is also applicable to the case in which the possible setting range of the deceleration is widened under predetermined conditions. By way of example, in the graph of FIG. 25, it is assumed that the plot LL2 of the dashed line represents a normal possible setting range of the deceleration. In response to a driver's operation of a certain switch, the possible setting range of the deceleration may be widened to the level defined by the plot LL1 of the solid line.

A5. Second Modification of First Embodiment

The first embodiment regards the case where two different positions of the change-speed gear are mapped to a deceleration corresponding to a certain vehicle speed. One of the two positions of the change-speed gear corresponds to the regenerative operation of the motor 20, whereas the other corresponds to the power operation of the motor 20. The principle of the present invention is, however, not restricted to this arrangement but may be applied to another arrangement where three or more different positions of the change-speed gear are mapped to a preset deceleration. The present invention is also applicable to still another arrangement where all the positions of the change-speed gear correspond to either one of the regenerative operation and the power operation of the motor 20.

Figure 26:
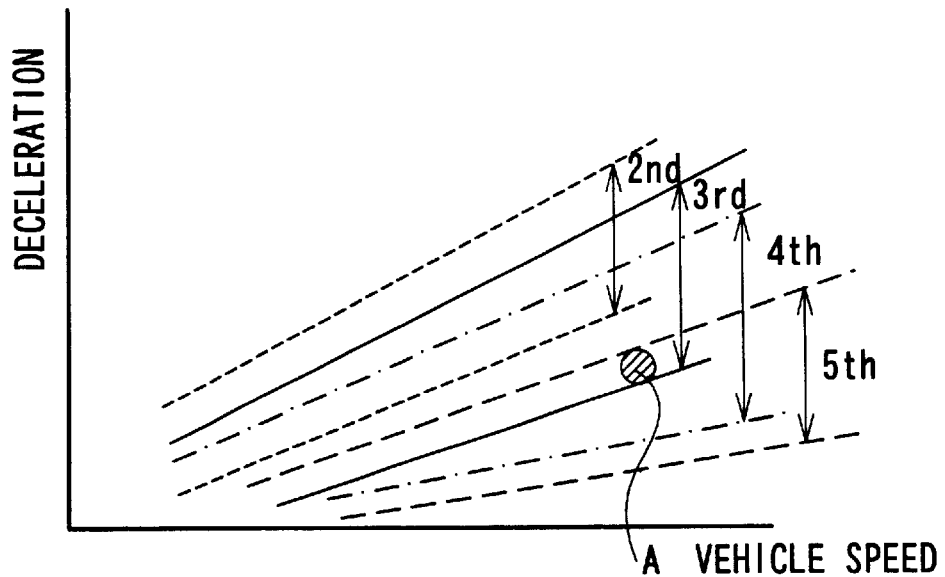
FIG. 26 is a modified example of the map showing the combinations of the vehicle speed, the deceleration, and the position of the change-speed gear.

FIG. 26 is a modified example of the map showing the combinations of the vehicle speed, the deceleration, and the position of the change-speed gear. In this modification, for example, three different positions of the change-speed gear, that is, third speed ($3^{rd}$) through fifth speed ($5^{th}$), are mapped to a certain deceleration defined by an area A in FIG. 26.

Figure 27:
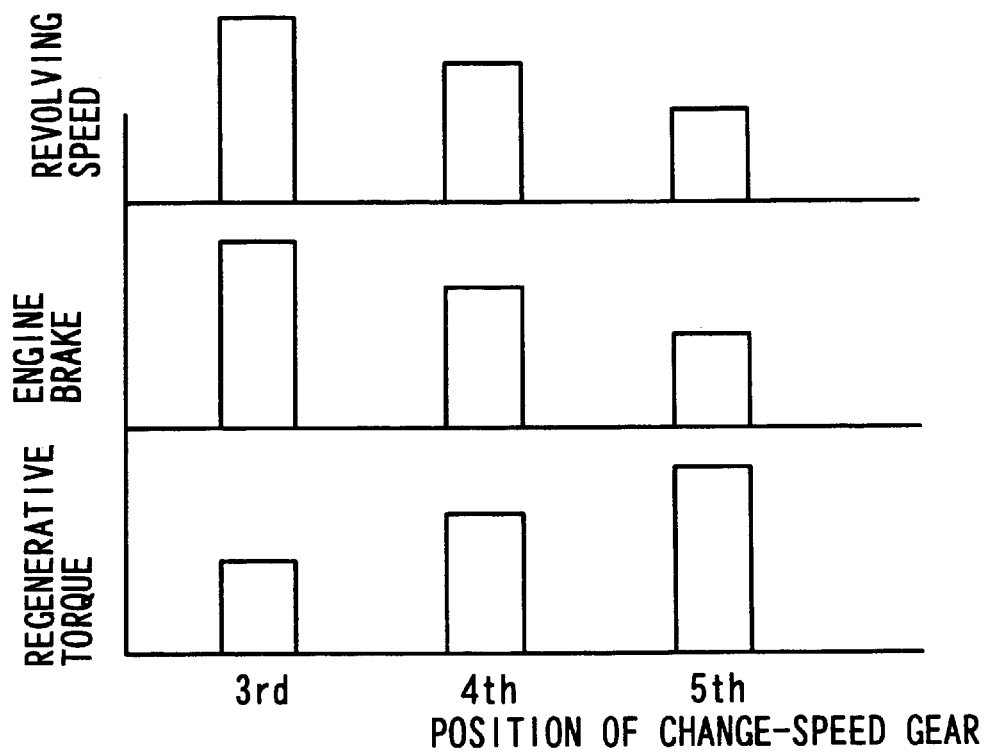
FIG. 27 shows the revolving speed of the power source, the engine brake, and the regenerative torque at the respective positions of the change-speed gear to attain a deceleration shown by an area A in FIG. 26.

FIG. 27 shows the revolving speed of the power source, the engine brake, and the regenerative torque at the respective positions of the change-speed gear to attain the deceleration shown by the area A. Under the condition of a fixed vehicle speed, that is, a fixed rotating speed of the axle 17, the revolving speed of the motor 20 and the engine 10 functioning as the power source decreases with a shift of the change-speed gear position from the third speed ($3^{rd}$) to the fifth speed ($5^{th}$). Although the revolving speed decreases at a fixed proportion in FIG. 27, the variation in revolving speed actually depends upon the gear ratio attained at each position of the change-speed gear.

With a variation in revolving speed of the engine 10, the braking force by the engine brake varies. The middle graph of FIG. 27 shows a variation in braking force by the engine brake against the position of the change-speed gear. The braking force by the engine brake is lowered with the shift of the position of the change-speed gear from the third speed ($3^{rd}$) to the fifth speed ($5^{th}$) and the resulting decrease in revolving speed.

The decrease in braking force by the engine brake raises the braking torque of the motor 20 required to attain the deceleration defined by the area A shown in FIG. 26. The lower graph of FIG. 27 shows a variation in regenerative torque. In this modified example, the motor 20 carries out the regenerative operation at all the positions of the change-speed gear from the third speed ($3^{rd}$) to the fifth speed ($5^{th}$). The setting may, however, be changed to make the third speed ($3^{rd}$) correspond to the power operation of the motor 20. In the case where there are three or more different positions of the change-speed gear mapped to a preset deceleration as discussed above, the respective positions of the change-speed gear have different quantities of regenerated electric power.

Figure 28:
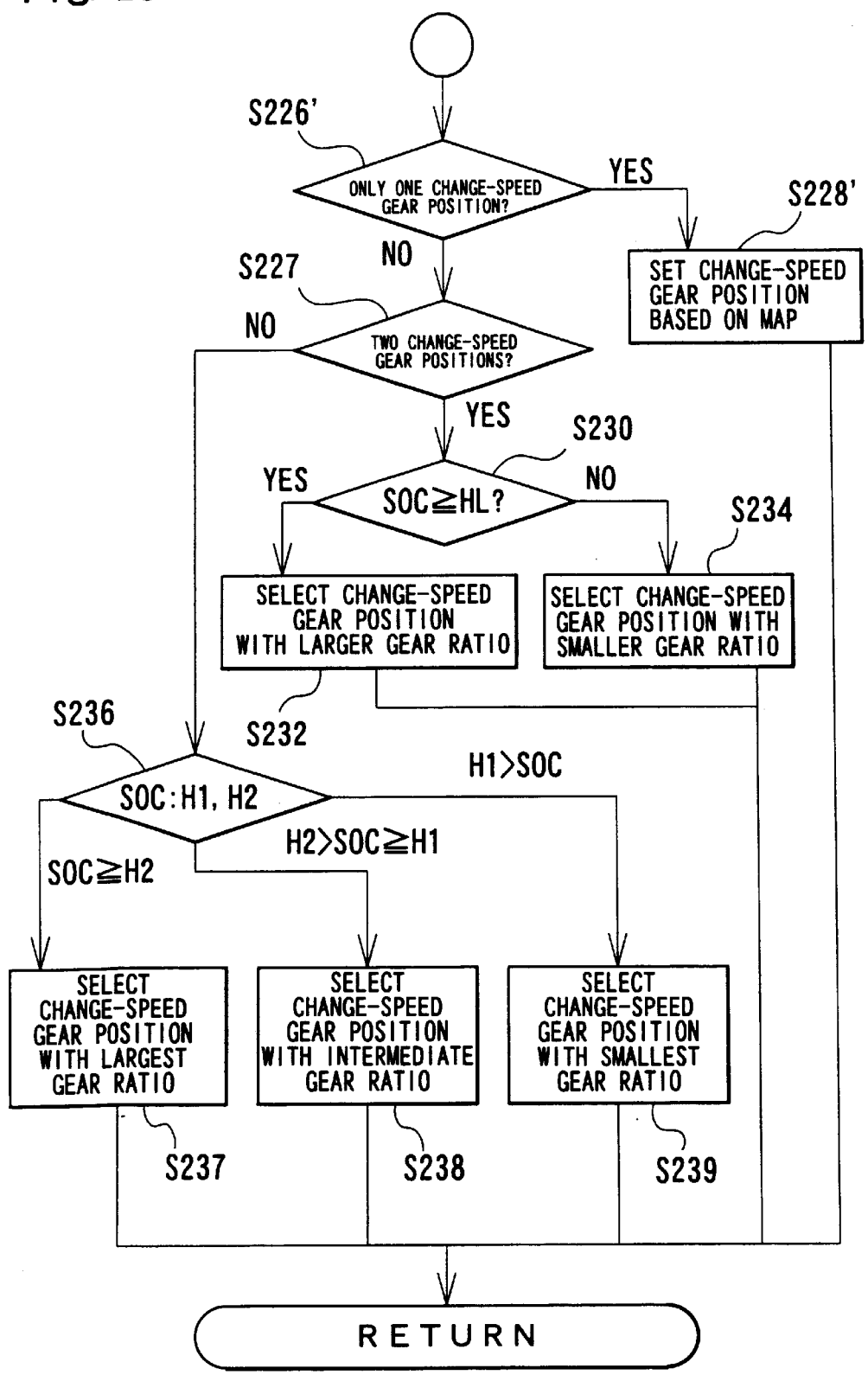
FIG. 28 is a flowchart showing another change-speed gear position selection routine executed in this modified example.

FIG. 28 is a flowchart showing another change-speed gear position selection routine executed in this modified example. In the modified example, the processing of and after step S226 in the change-speed gear position selection routine (FIG. 23) discussed previously is replaced by this series of processing. The CPU refers to the map shown in FIG. 26 and determines whether or not there is only one position of the change-speed gear mapped to the preset target deceleration (step S226'). In the case where the preset deceleration is attained at only one position of the change-speed gear, the position of the change-speed gear read from the map of FIG. 26 is set to the current position of the change-speed gear (step S228').

In the case where there are a plurality of different positions of the change-speed gear mapped to the preset deceleration, the CPU then determines whether the preset deceleration is attained at two different change-speed gear positions or more (step S227). When it is determined that there are two different positions of the change-speed gear mapped to the preset deceleration, the CPU refers to the remaining charge SOC of the battery 50 and compares the remaining charge SOC with a predetermined value H (step S230). In the case where the remaining charge SOC is not less than the predetermined value H, the CPU selects the position of the change-speed gear having the lesser quantity of regenerated electric power, that is, the position of the change-speed gear having a larger gear ratio out of the two alternatives (step S232), with a view to preventing the battery 50 from being excessively charged. In the case where the remaining charge SOC is less than the predetermined value H, on the other hand, the CPU selects the position of the change-speed gear suitable for charging the battery 50, that is, the position of the change-speed gear having a smaller gear ratio out of the two alternatives (step S234). This series of the processing is identical with the processing described previously in the embodiment (FIG. 23).

When it is determined that there are more than two different positions of the change-speed gear, that is, there are three different positions of the change-speed gear, mapped to the preset deceleration, the CPU compares the remaining charge SOC of the battery 50 with two predetermined threshold values H1 and H2 (step S236). A relationship H1<H2 holds between these threshold values. In the case where the remaining charge SOC is not less than the threshold value H2, the CPU selects the position of the change-speed gear most suitable for charging, that is, the position of the change-speed gear having a largest gear ratio (step S237). In the case where the remaining charge SOC is less than the threshold value H2 but is not less than the threshold value HI, the CPU selects the position of the change-speed gear having an intermediate gear ratio out of the three alternatives (step S238). In the case where the remaining charge SOC is less than the threshold value HI, the CPU selects the position of the change-speed gear having the least quantity of regenerated electric power, that is, the position of the change-speed gear having a smallest gear ratio (step S239).

The threshold values H1 and H2 used for the decision at step S236 are criteria to change over the position of the change-speed gear. Appropriate values are set to the threshold values H1 and H2, so that the optimum position of the change-speed gear having the desired quantity of regenerated electric power is selected corresponding to the charge level of the battery 50. Both the threshold values H1 and H2 may be different from the reference value HL used at step S230, or alternatively either one of the threshold value H1 and H2 may be coincident with the reference value HL. In the change-speed gear position selection routine of the modified example, it is also desirable to set certain hystereses for the decisions of steps S230 and S236, in order to prevent the position of the change-speed gear from being frequently switched over between and among the alternatives according to the remaining charge SOC.

Setting the map (FIG. 26) to allow selection among the three or more different positions of the change-speed gear advantageously enables the charge level of the battery to be regulated minutely. In the modified example discussed above, the regenerative braking control is carried out in the range of the third speed ($3^{rd}$) to the fifth speed ($5^{th}$). The map may, however, be set to cause the motor 20 to carry out the power operation at all the positions of the change speed gear. The map may alternatively be set to cause the motor 20 to carry out either the regenerative operation or the power operation in the adopted range of the change-speed gear position.

In the embodiment.and its modified example discussed above, when there are a plurality of different positions of the change-speed gear mapped to a target deceleration, the optimum position of the change-speed gear is selected, based on the remaining charge SOC of the battery 50. The technique of the present invention is, however, applicable to other arrangements of selecting the position of the change-speed gear based, on a diversity of other conditions. For example, in the change-speed gear position selection routine, preference may be given to the previous position of the change-speed gear selected for a previous drive. Such preference effectively reduces a possible shock due to the changeover of the position of the change-speed gear in the braking process by the power source braking. In a vehicle that enables the position of the vehicle to be verified in topography, the change-speed gear position having the larger gear ratio may be selected while the vehicle runs on an upward slope. This ensures smooth acceleration subsequent to braking. The optimum position of the change-speed gear may be selected, based on any combination of these diversity of conditions.

A6. Third Modification of First Embodiment

The above embodiment regards the parallel hybrid vehicle in which the engine 10 is directly linked with the motor 20 and connected with the axle 17 via the transmission 100. The principle of the present invention is, however, applicable to any parallel hybrid vehicles of various configurations, in which the output from the engine is directly transmittable to the axle. The present invention is further applicable to series hybrid vehicles of various configurations, in which the output of the engine is not directly transmitted to the drive shaft but is used only for power generation.

Figure 29:
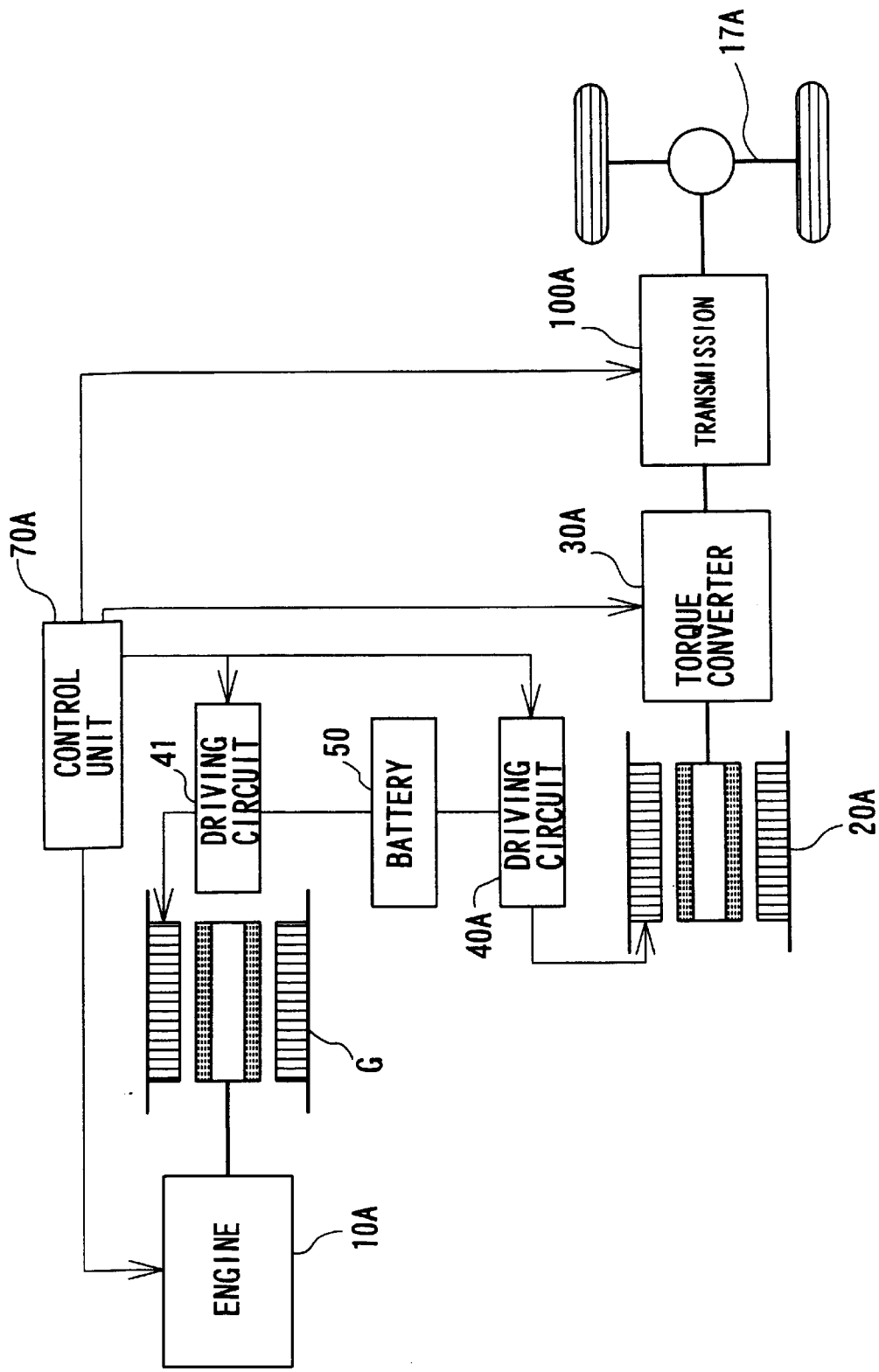
FIG. 29 illustrates the structure of a series hybrid vehicle.

FIG. 29 shows the structure of such a series hybrid vehicle. In the series hybrid vehicle, a motor 20A as the power source is connected with an axle 17A via a torque converter 30A and a transmission 100A. An engine 10A is not connected with the axle 17A but is linked with a generator G. The motor 20A is connected to a battery 50A via a driving circuit 40A. The generator G is connected with the battery 50A via a driving circuit 41. The driving circuits 40A and 41 are constructed as transistor inverters like the driving circuit 40 discussed in the above embodiment. The operations of these driving circuits 40A and 41 are controlled by a control unit 70A.

In the series hybrid vehicle of the above structure, the power output from the engine 10A is converted to electric power by means of the generator G. The electric power is accumulated in the battery 50A and also used to drive the motor 20A. The vehicle is driven by the power of the motor 20A. The motor 20A outputs a negative torque as the braking force, so as to apply the power-source braking. Like the parallel hybrid vehicle of the embodiment, the series hybrid vehicle of this modified structure having the transmission 100A carries out the braking:control by the combination of the torque of the motor 20A with the position of the change-speed gear, so as to attain the deceleration set by the driver in a wide range.

In the hybrid vehicle of the embodiment, the target torque of the motor 20 is calculated by subtracting the braking torque by engine brake from the total torque to be output to the axle 17. In the hybrid vehicle of the modified structure, the braking force by engine brake is equal to zero, so that the braking torque to be output to the axle 17A is coincident with the target torque of the motor 20A.

The embodiment described above uses the transmission 100 that changes the gear ratio in a stepwise manner. The transmission 100 may have any other suitable structure, for example, a mechanism of continuously varying the gear ratio.

The principle of the present invention is applicable to a vehicle using only the motor as the power source. The structure of such a vehicle corresponds to the structure of the series hybrid vehicle shown in FIG. 29 without the engine 10A, the generator G, and the driving circuit 41. In this vehicle, in the same manner as the parallel hybrid vehicle of the embodiment and the series hybrid vehicle of FIG. 29, controlling the torque of the motor 20A linked with the axle and the position of the change-speed gear attains the target deceleration set by the driver in a wide range. Although the driver sets the target deceleration in the above embodiment, the driver may set another speed reduction rate, such as the braking force or the quantity of braking applied to the wheels.

B. Second Embodiment

B1. Structure of Apparatus

Figure 30:
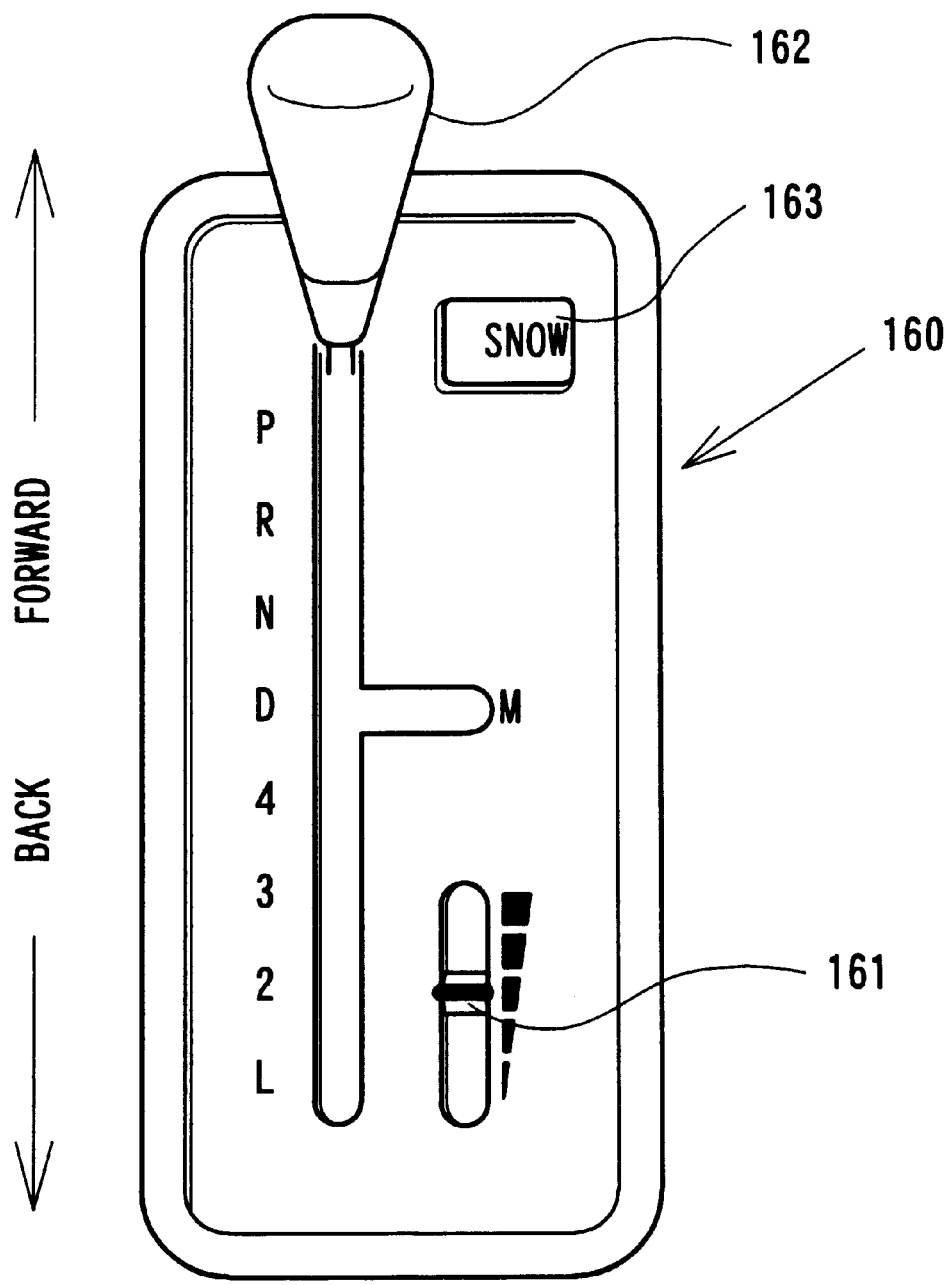
FIG. 30 shows an operation unit 160 for selecting the gearshift position in a hybrid vehicle of a second embodiment according to the present invention.

The following describes a second embodiment according to the present invention. The hybrid vehicle of the second embodiment has a similar hardware configuration to that of the first embodiment, except a structure in the vicinity of a gearshift lever. FIG. 30 shows an operation unit 160 for selecting the gearshift position in the hybrid vehicle of the second embodiment. The operation unit 160 is located along a longitudinal axis of the vehicle on the floor next to the driver's seat.

As shown in FIG. 30, the operation unit 160 includes a gearshift lever 162. The driver slides the gearshift lever 162 along the longitudinal axis of the vehicle, so as to select one among available gearshift positions. The available gearshift positions include a parking (P) position, a reverse (R) position, a neutral (N) position, a drive (D) position, a fourth position (4), a third position (3), a second position (2), and a low position (L), which are arranged in this order from the forward of the vehicle.

The operation unit 160 for selecting the gearshift position also has a slide knob 161 as a mechanism of setting the deceleration. The driver slides the slide knob 161 along the longitudinal axis of the vehicle to set the deceleration. The driver shifts the slide knob 161 forward to continuously increase the deceleration, while shifting the slide knob 161 backward to continuously decrease the deceleration. The setting of the deceleration using the slide knob 161 is carried out, irrespective of the current gearshift position of the gearshift lever 162. The shift of the slide knob 161 in the deceleration-increasing direction enhances the power source braking in a stepwise manner. The shift of the slide knob 161 in the deceleration-decreasing direction weakens the power source braking in a stepwise manner.

The structure of this embodiment enables the driver to manually change over the position of the change-speed gear. Selection between an automatic changeover mode and a manual changeover mode is implemented by an operation of the gearshift lever 162. As shown in FIG. 30, the gearshift lever 162 of this embodiment is not only slide along the longitudinal axis of the vehicle to select the gearshift position but is slid horizontally at the drive (D) position. The position selected by the horizontal slide is referred to as an M position. While the gearshift lever 162 is at the M position, the manual changeover mode is selected to allow manual changeover of the change-speed gear position.

While the gearshift lever 162 is located at any other positions, the automatic changeover mode is selected to automatically change over the position of the change-speed gear. Not the gearshift lever 162 but switches provided on the steering wheel are used for the manual changeover of the change-speed gear position as discussed later. The structure of the first embodiment shown in FIG. 5 may be applied for gearshift position UP and DOWN switches.

The operation unit 160 includes a sensor for detecting the gearshift position and an M position switch, which is on when the gearshift lever 162 is at the M position. Signals from these sensor and switch are transmitted to the control unit 70 and used for a diversity of control processes executed in the vehicle as discussed later.

Figure 31:
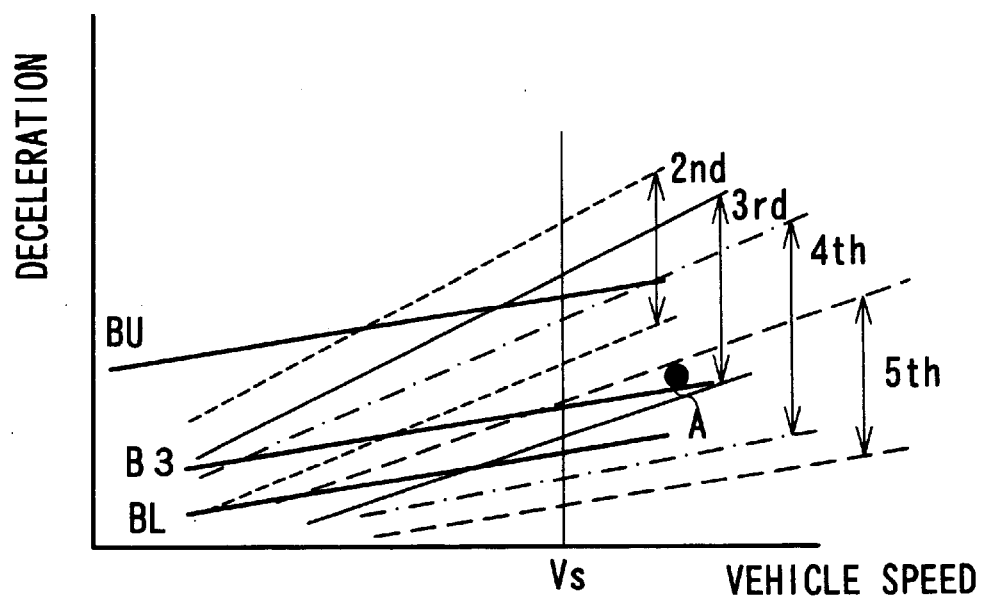
FIG. 31 is a graph showing a variable range of the deceleration at each position of the change-speed gear in the hybrid vehicle of the second embodiment.

Like the hybrid vehicle of the first embodiment, the hybrid vehicle of the second embodiment varies the deceleration at each position of the change-speed gear by regulating the torque of the motor 20. FIG. 31 is a graph showing a variable range of the deceleration at each position of the change-speed gear in the hybrid vehicle of the second embodiment. The deceleration attained at each position of the change-speed gear is varied by regulating the torque of the motor 20. At the second speed ($2^{nd}$), the deceleration is varied in a range defined by the short-dashed lines. The decelerations at the third speed ($3^{rd}$), at the fourth speed ($4^{th}$), and at the fifth speed ($5^{th}$) are respectively varied in a range defined by the solid lines, in a range defined by the one-dot chain lines, and in a range defined by the long-dashed lines.

The driver operates the slide knob 163 to set the deceleration of the vehicle. In this embodiment, the deceleration may be set continuously in a range of a straight line BL to a straight line BU. The possible setting range of the deceleration by the driver depends upon the gearshift position. For example, when the gearshift position is at the third (3) position, the deceleration may be set in a range using up to the third speed ($3^{rd}$), that is, a range of a straight line B3 to the straight line BU. The technique of the second embodiment reads the gear ratio attaining the deceleration set by the driver against the vehicle speed in the map of FIG. 31 and carries out the braking control.

Figure 32:
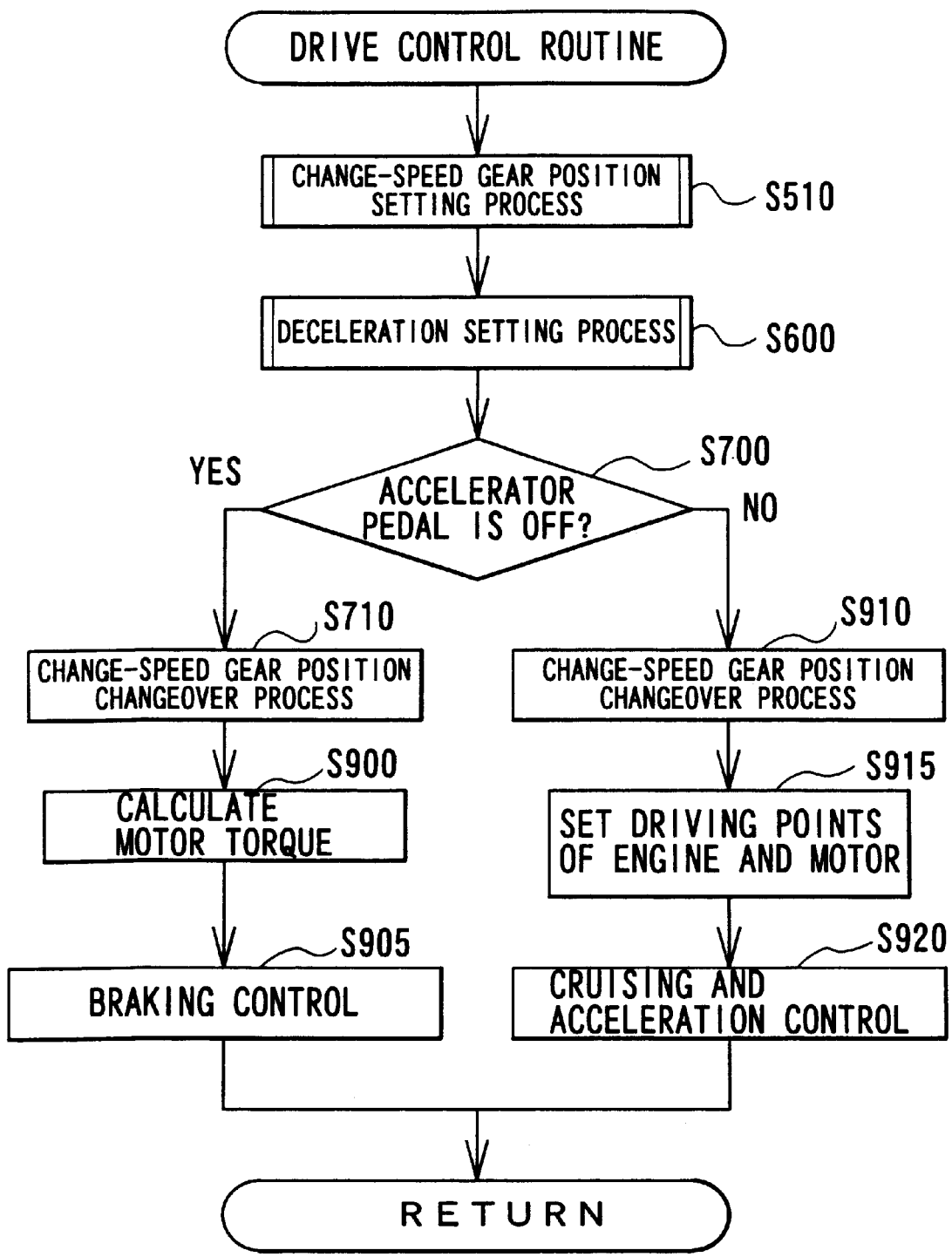
FIG. 32 is a flowchart showing a drive control routine executed in the second embodiment.

B2. Drive Control Process:

In the hybrid vehicle of the second embodiment, the control unit 70 executes a drive control process discussed below and controls the operations of the engine 10 and the motor 20, so as to enable the driving discussed above. FIG. 32 is a flowchart showing a drive control routine executed in the second embodiment. This series of the processing is executed at preset time intervals by the CPU in the control unit 70.

Figure 33:
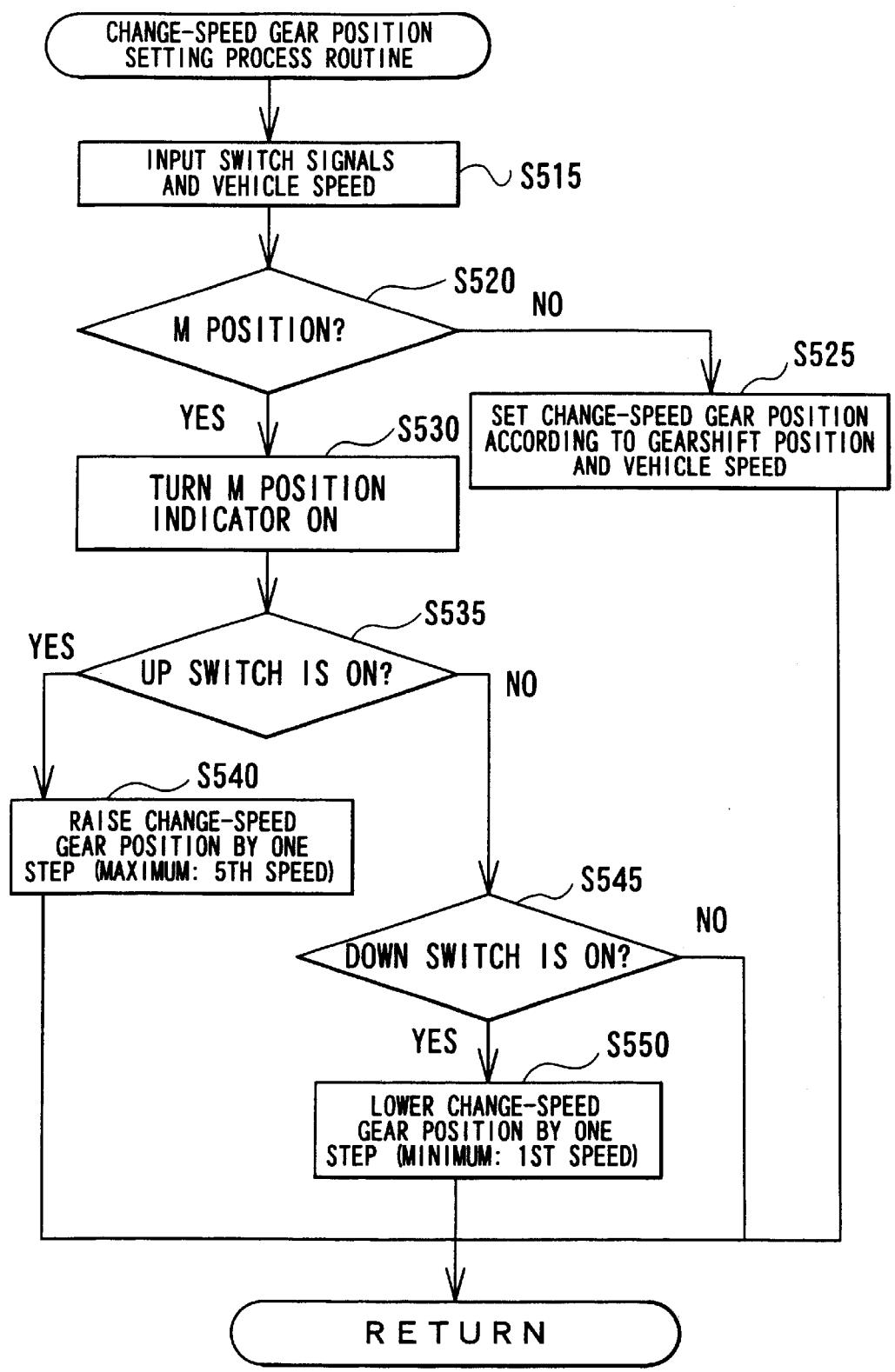
FIG. 33 is a flowchart showing a routine of the change-speed gear position setting process executed in the second embodiment.

When the program enters the routine, the CPU first carries out a change-speed gear position setting process (step S510). FIG. 33 is a flowchart showing a routine of the change-speed gear position setting process. When the program enters the change-speed gear position setting process routine, the CPU first receives signals from various switches and the vehicle speed (step S515). The signals directly relating to the change-speed gear position setting process routine include the signal representing the gearshift position, the signal of the M position switch, and the signals of the UP and DOWN switches.

The CPU then determines whether or not the current gearshift position is the M position, in response to the input signal (step S520). The decision is based on the on-off state of the M position switch.

In the case where the current gearshift position is other than the M position, the position of the change-speed gear is set according to the current gearshift position and the vehicle speed (step S525). In the case of the gearshift position other than the position M, after setting the change-speed gear position according to the current gearshift position and the vehicle speed, the CPU exits from the change-speed gear position setting process routine.

In the case where the current gearshift position is the M position, on the other hand, the CPU turns on an M position indicator (step S530). In parallel with this processing, the CPU sets the position of the change-speed gear in response to the operations of the UP and DOWN switches. The CPU determines whether or not the UP switch is in ON position (step S535). When the UP switch is in the ON position, the CPU raises the current setting of the change-speed gear position by one step (step S540). The increase in setting of the change-speed gear position means that the setting of the change-speed gear position is changed to a higher speed having a higher number allocated thereto, that is, the speed having a smaller gear ratio. The transmission 100 of the second embodiment does not have higher speeds than the fifth speed ($5^{th}$) for the available position of the change-speed gear. The raise in setting at step S35 is accordingly performed in the range up to the fifth speed ($5^{th}$). After the position of the change-speed gear reaches the fifth speed ($5^{th}$), any further on operation of the UP switch does not change the setting of the change-speed gear position.

When it is determined at step S535 that the UP switch is not in the ON position, the CPU subsequently determines whether or not the DOWN switch is in ON position (step S545). When the DOWN switch is in the ON position, the CPU lowers the current setting of the change-speed gear position by one step (step S550). The reduction in setting of the change-speed gear position means that the setting of the change-speed gear position is changed to a lower speed having a lower number allocated thereto, that is, the speed having a larger gear ratio. The reduction in setting at step S550 is performed in the range down to the first speed (L). After the position of the change-speed gear reaches the first speed (L), any further on operation of the DOWN switch does not change the setting of the change-speed gear position.

When it is determined at step S545 that the DOWN switch is not in the ON position, that is, in the case where neither the UP switch nor the DOWN switch is operated, the setting of the change-speed gear position is not changed. On completion of the setting of the change-speed gear position at the current gearshift position, the CPU concludes the change-speed gear position setting process and returns to the drive control routine. The change-speed gear position setting process only sets the position of the change-speed gear to be used, and the actual changeover of the change-speed gear position is carried out in the drive control routine as discussed below.

Referring back to the flowchart of FIG. 32, after conclusion of the change-speed gear position setting process, the CPU executes a deceleration setting process (step S600). This series of the processing sets a target deceleration in response to the operation of the slide knob 161. The details of the deceleration setting process are described with FIG. 34.

Figure 34:
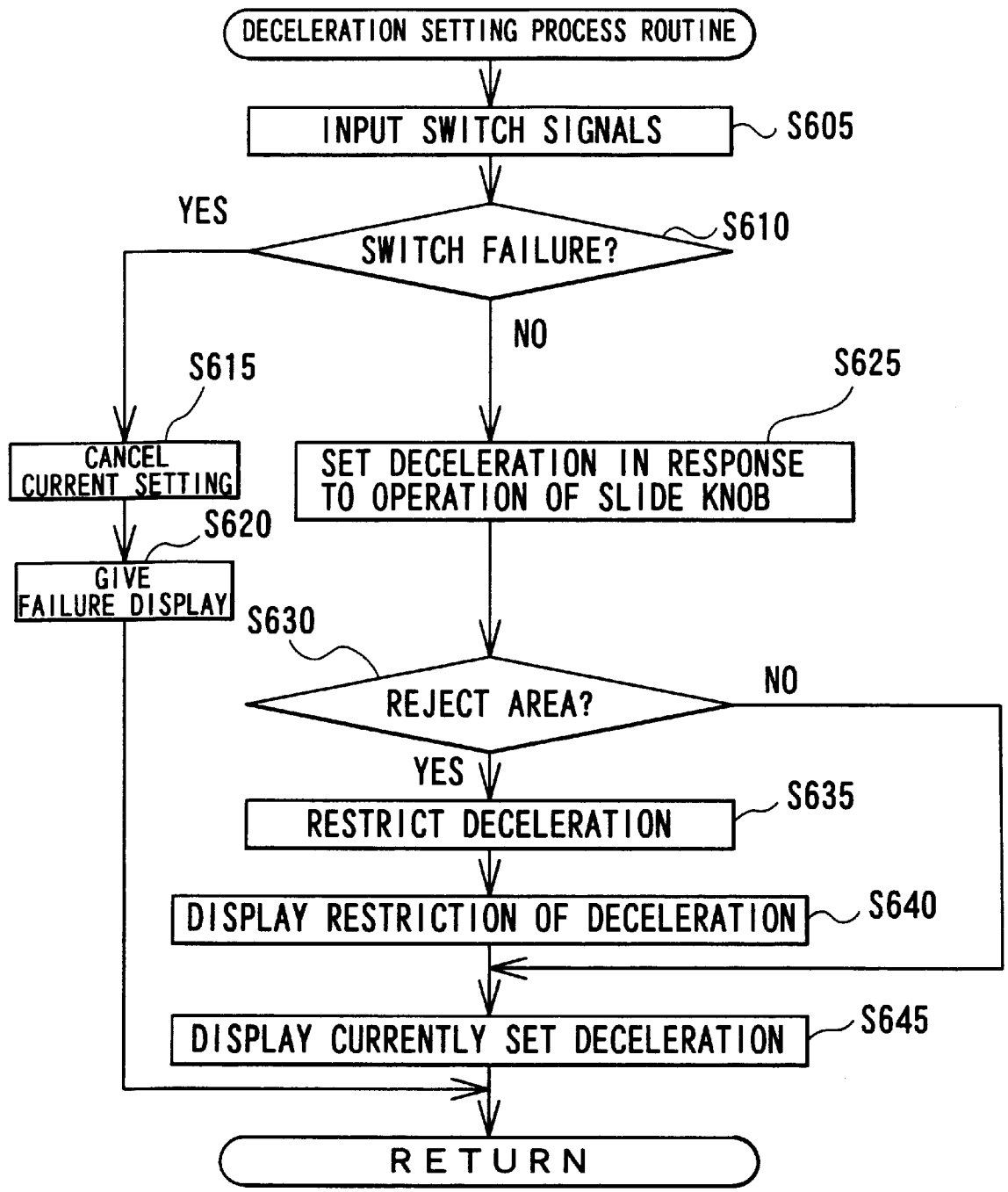
FIG. 34 is a flow chart showing a routine of the deceleration setting process executed in the second embodiment.

FIG. 34 is a flowchart showing a routine of the deceleration setting process. When the program enters this routine, the CPU first receives signals from various switches (step S605). The signals input here are the slide knob signal and the snow mode switch signal among the various signals shown in FIG. 7. Other signals may also be input here.

The CPU determines whether or not there is any failure with regard to the switch of the slide knob 161, in response to the input signal (step S610). A variety of techniques are applicable to detect the possible failure. For example, in the case of a contact failure of the switch, chattering occurs to cause an extremely frequent variation in observed quantity of operation of the slide knob 161. Detection of a variation of or over a predetermined level leads to detection of the switch failure. The failure of the switch may be detected by any other techniques.

When any failure of the switch is detected, the CPU cancels the current setting of the target deceleration (step S615), in order to prevent the deceleration from being set against the intention of the driver. The processing may alternatively keep the current setting of the target deceleration unchanged. The processing adopted in the second embodiment takes into account the possibility that there is a failure of the switch while the driver corrects the deceleration set against the intention of the driver, and cancels the current setting of the target deceleration. After the cancellation of the setting of the target deceleration, the CPU gives a failure display, so as to inform the driver of the switch failure (step S620). A variety of techniques may be applied for the failure display. The technique adopted in the second embodiment gives a sound alarm while flashing the M position indicator. In the case of any failure of the switch, the CPU carries out the series of the processing discussed above and subsequently exits from the deceleration setting process routine.

When it is determined at step S610 that there is no failure of the switch, the CPU sets the target deceleration according to the quantity of operation of the slide knob 161 (step S625). As discussed previously with FIG. 10, the deceleration is set in the range of the straight line BL to the straight line BU according to the quantity of operation of the slide knob 161. The possible setting range of the deceleration depends upon the gearshift position. For example, when the current gearshift position is the third position (3), the deceleration is set in the range allowed at the second speed ($2^{nd}$) and the third speed ($3^{rd}$), that is, in the range of the straight line B3 to the straight line BU shown in FIG. 10. When the current gearshift position is the M position, the deceleration is set in the range allowed at the position of the change-speed gear selected by the driver.

After setting the target deceleration, the CPU determines whether or not the preset target deceleration is within a reject area (step S630). This series of the processing follows the routine of the first embodiment. In the case where the target deceleration is within the reject area, the CPU restricts the preset deceleration to an allowable upper limit (step S635). The CPU then informs the driver of the restriction of the setting of the target deceleration (step S640). The technique adopted in the second embodiment flashes the deceleration indicator 224 for approximately one second, simultaneously with sounding an alarm. When it is determined at step S630 that the preset target deceleration is not within the reject area, the processing of steps S635 and S640 is skipped. After setting the target deceleration, the CPU displays the result of the setting on the deceleration indicator 224 (step S645) and exits from the deceleration setting process routine.

Figure 35:
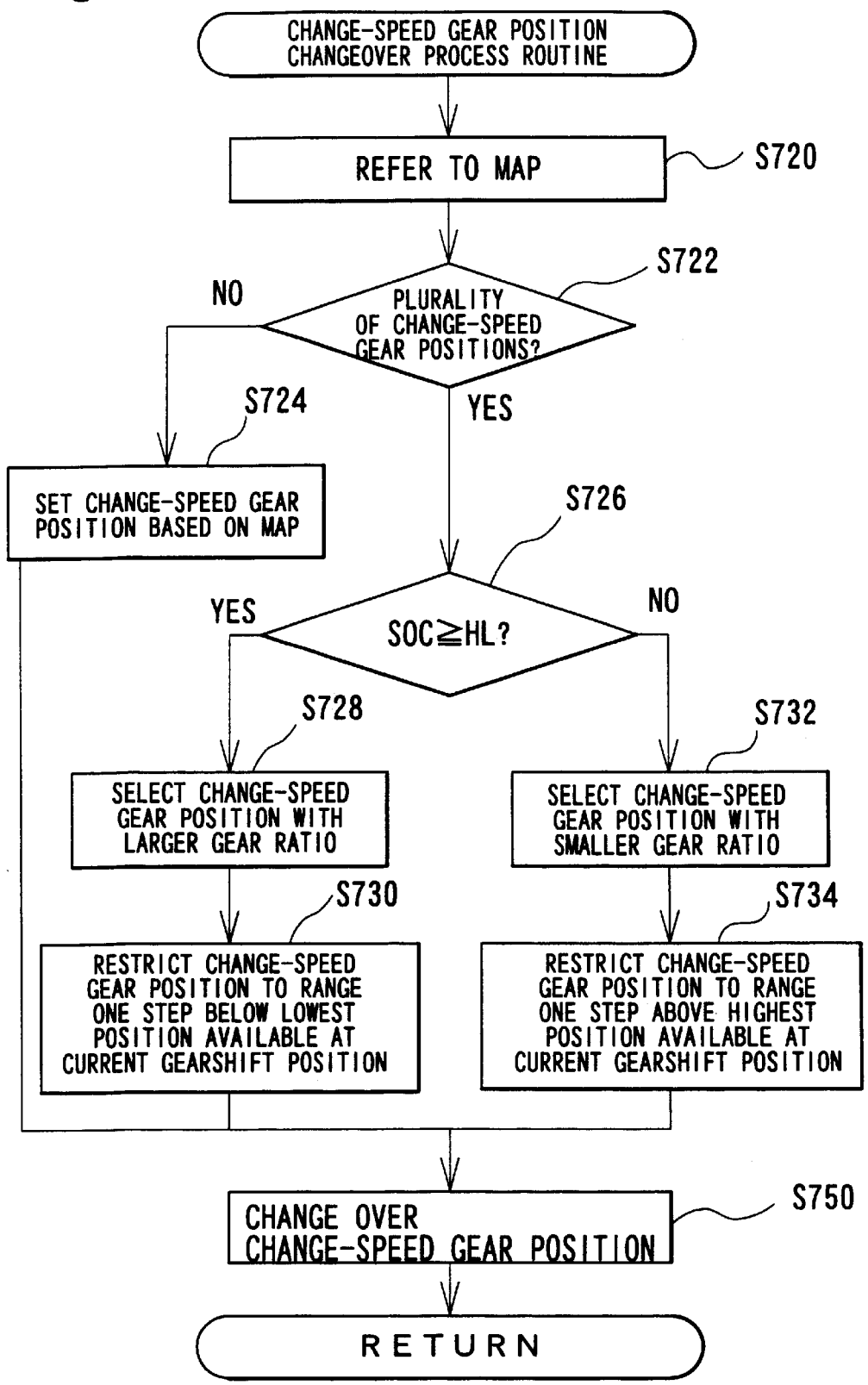
FIG. 35 is a flowchart showing a routine of the change-speed gear position changeover process executed in the second embodiment.

After completion of the deceleration setting process, the program returns to the drive control routine (FIG. 32). The CPU then determines whether or not the accelerator pedal is off (step S700), in order to specify which operation is to be carried out, that is, braking, stationary driving, or acceleration. When the accelerator pedal is off, the CPU executes a change-speed gear position changeover process (step S710). FIG. 35 is a flowchart showing a routine of the change-speed gear position changeover process. When the program enters this routine, the CPU first refers to the map (FIG. 31) representing the relationship between the deceleration and the change-speed gear position (step S722). The CPU selects the position of the change-speed gear that attains the target deceleration set by the driver, based on this map.

The CPU subsequently determines whether or not there are a plurality of different positions of the change-speed gear mapped to the target deceleration (step S722). As shown in FIG. 31, in the hybrid vehicle of the second embodiment, the ranges of the deceleration allowed at the respective change-speed gear positions are partly overlapped. A plurality of positions of the change-speed gear are accordingly mapped to some target deceleration. The processing of step S722 determines whether or not the target deceleration is attained at a plurality of different positions of the change-speed gear.

When it is determined at step S722 that the target deceleration is attained at only one position of the change-speed gear, the CPU sets the position of the change-speed gear read from the map to the current position of the change-speed gear (step S724). When it is determined at step S722 that the target deceleration is attained at a plurality of different positions of the change-speed gear, on the other hand, the CPU selects the optimum position of the change-speed gear according to the remaining charge SOC of the battery. In the case where the remaining charge SOC of the battery is not less than a predetermined value HL, the CPU selects the position of the change-speed gear having a largest gear ratio among the plurality of alternatives (step S728). The change-speed gear position having the largest gear ratio means the position of the change-speed gear closer to the first speed (L).

The change-speed gear position having the larger gear ratio leads to the smaller braking force to be output from the power source for braking at a fixed deceleration. The larger gear ratio results in the smaller quantity of electric power regenerated by the motor. At some deceleration, the motor carries out the power operation to relieve the braking force by the engine 10 and thereby attain the desired braking control. When the remaining charge SOC of the battery is not less than the predetermined value HL, the CPU selects the change-speed gear position having the least quantity of regenerated electric power, that is, the change-speed gear position having the largest gear ratio, in order to prevent the battery from being excessively charged in the braking process. Any appropriate value is set to the predetermined value HL used as a criterion of the determination of whether or not the charge level of the battery may cause excessive charging. In order to prevent the position of the change-speed gear from being frequently switched over among the plurality of alternatives according to the remaining charge of the battery, it is desirable to set a certain hysteresis for the determination of step S726.

The CPU subsequently restricts the selected change-speed gear position to a specific range down to one step below the lowest speed allowed at the current gearshift position (step S730). In the structure of the second embodiment, there is no restriction set for the lower limit of the change-speed gear position at any gearshift position other than the. M position. Namely any speed down to the first speed (L) is allowed at the gearshift position other than the M position. No processing is thus practically carried out at step S730 at the gearshift position other than the M position. At the M position, the position of the change-speed gear set by the driver is compared with the position of the change-speed gear selected at step S728. For example, the driver sets the fourth speed ($4^{th}$) for the change-speed gear position, while the change-speed gear position selected at step S728 is either the third speed ($3^{rd}$) or the fourth speed ($4^{th}$). In this case, the difference is only one step, so that no processing is practically performed at step S730. When the change-speed gear position selected at step S728 is the second speed ($2^{nd}$), however, the difference from the change-speed gear position set by the driver is two steps. At step S730, the selected change-speed gear position is accordingly changed to the third speed ($3^{rd}$) that is one step below the change-speed gear position set by the driver.

When it is determined at step S726 that the remaining charge SOC of the battery is less than the predetermined value HL, the CPU selects the position of the change-speed gear having a smallest gear ratio (step S732). In this case, it is required to quickly charge the battery, so that the desirable selection is the position of the change-speed gear having the greatest possible quantity of regeneration. The change-speed gear position having the smaller gear ratio leads to the greater regenerative loading of the motor to attain a predetermined deceleration. The CPU accordingly selects the position of the change-speed gear having the smallest gear ratio, so as to enable the battery to be charged quickly.

The CPU subsequently restricts the selected change-speed gear position to a specific range up to one step above the highest speed allowed at the current gearshift position (step S734). Here the CPU compares the position of the change-speed gear set by the driver with the position of the change-speed gear selected at step S728. For example, when the driver selects the third (3) position for the current gearshift position or when the driver sets the third speed ($3^{rd}$) at the M position, the upper limit of the available change-speed gear position is the third speed ($3^{rd}$). When the position of the change-speed gear selected at step S732 is either the third speed ($3^{rd}$) or the fourth speed ($4^{th}$), the difference is one step, so that no processing is practically performed at step S734. When the change-speed gear position selected at step S732 is the fifth speed ($5^{th}$), however, the difference from the upper limit is two steps. At step S734, the selected change-speed gear position is accordingly changed to the fourth speed ($4^{th}$) that is one step above the change-speed gear position set by the driver.

This corresponds to, for example, the case of attaining the deceleration defined by a point A shown in the map of FIG. 31. As clearly understood from the map, the deceleration defined by the point A is attained at three different positions of the change-speed gear, that is, the third speed ($3^{rd}$) to the fifth speed ($5^{th}$). When the gearshift position is the third (3) position, the CPU selects not the fifth speed ($5^{th}$) but the fourth speed ($4^{th}$) as the position of the change-speed gear attaining the deceleration defined by the point A at step S234.

The change-speed gear position changeover process for the braking control selects and changes over the position of the change-speed gear across the range specified by the gearshift position. The technique of the second embodiment selects the position of the change-speed gear with preference to advantageous charging of the battery. When the change-speed gear position of the transmission 100 is set by the series of the processing discussed above, the CPU actually changes over the position of the change-speed gear (step S750).

On completion of the changeover of the change-speed gear position, the CPU returns to the drive control routine (FIG. 32) and calculates a target torque to be output from the motor 20 (step S400).

The total torque to be output from the engine 10 and the motor 20 functioning as the power source is calculated from the preset deceleration, that is, the torque to be output to the axle 17, at the selected position of the change-speed gear according to Equations (2) through (6) with the gear ratios k1 through k5. The braking force output from the engine 10, that is, the power of the engine brake, is substantially unequivocally determined according to the revolving speed of the crankshaft 12. The torque to be output from the motor 20 is thus obtained by subtracting the torque by the engine brake from the total torque to be output from the power source.

The change-speed gear position changeover process (FIG. 35) selects the position of the change-speed gear from the viewpoint of the better energy recovery rate, irrespective of the restriction by the gearshift position. Such selection, however, does not change the target deceleration set by the driver. Namely the position of the change-speed gear should be selected in the range that attains the target deceleration. The torque of the motor 20 calculated by the above processing is accordingly the torque attaining the target deceleration set under the condition of the selected gearshift position.

The procedure of the second embodiment determines the target torque of the motor 20 by calculation. Another possible procedure provides a map to determine the target torque of the motor 20. Still another possible procedure measures the deceleration of the vehicle with an acceleration sensor and feedback controls the torque of the motor 20, in order to attain the preset deceleration. Although the calculation of the motor torque is performed after completion of the change-speed gear position changeover process in the flowchart of FIG. 32, this is just for convenience of illustration.

The calculation may thus be performed simultaneously with the change-speed gear position changeover process.

The CPU then carries out a braking control (step S905) based on the target torque determined as discussed above, so as to control operations of the motor 20 and the engine 10. The CPU stops the fuel injection to the engine 10 and the ignition, in order to apply the engine brake. The CPU may simultaneously control the VVT mechanism incorporated in the engine 10. Since the deceleration by the power-source braking can be regulated by the torque of the motor 20, the procedure of the second embodiment does not control the VVT mechanism here.

The motor 20 is driven by the PWM control. The CPU sets a voltage to be applied to the coils on the stator 24 in the motor 20. The voltage is determined corresponding to the revolving speed and the target torque of the motor 20, based on a preset table. In the case of the regenerative operation of the motor 20, a negative value is set to the voltage. In the case of the power operation of the motor 20, on the contrary, a positive value is set to the voltage. The CPU controls the on-off conditions of the respective transistors included in the driving circuit 40, in order to cause the preset voltage to be applied to the coils. The PWM control is a known technique and is thus not described in detail here.

When it is determined at step S700 that the accelerator pedal is not off, that is, the accelerator pedal is stepped on, the CPU carries out a control process for the stationary driving or acceleration.

For the purpose of the control, the CPU changes over the position of the change-speed gear (step S910). The changeover of the change-speed gear position in the course of the stationary driving or acceleration follows the map of the first embodiment shown in FIG. 10. The processing of step S910 carries out the change to the position of the change-speed gear set by the change-speed gear position setting process (FIG. 33). The position of the change-speed gear in the course of the stationary driving or acceleration is changed over in the range specified by the gearshift position set by the driver.

After setting the position of the change-speed gear, the CPU sets the driving points of the engine 10 and the motor 20 (step S915). As described previously, the hybrid vehicle of the second embodiment has two drive modes selectively used according to the vehicle speed and the torque, that is, the motor drive mode using only the motor 20 as the power source and the engine drive mode using only the engine 10 as the power source. There is no drive mode using both the motor 20 and the engine 10 as the power source. The CPU selects the appropriate drive mode according to the driving state of the vehicle and sets the driving points of the engine 10 and the motor 20 that can output the power corresponding to the step-on amount of the accelerator pedal. After setting the respective driving points, the CPU carries out a cruising and acceleration control (step S920), so as to control operations of the engine 10 and the motor 20. The concrete procedures of the control are identical with those carried out at step S905.

Figure 36:
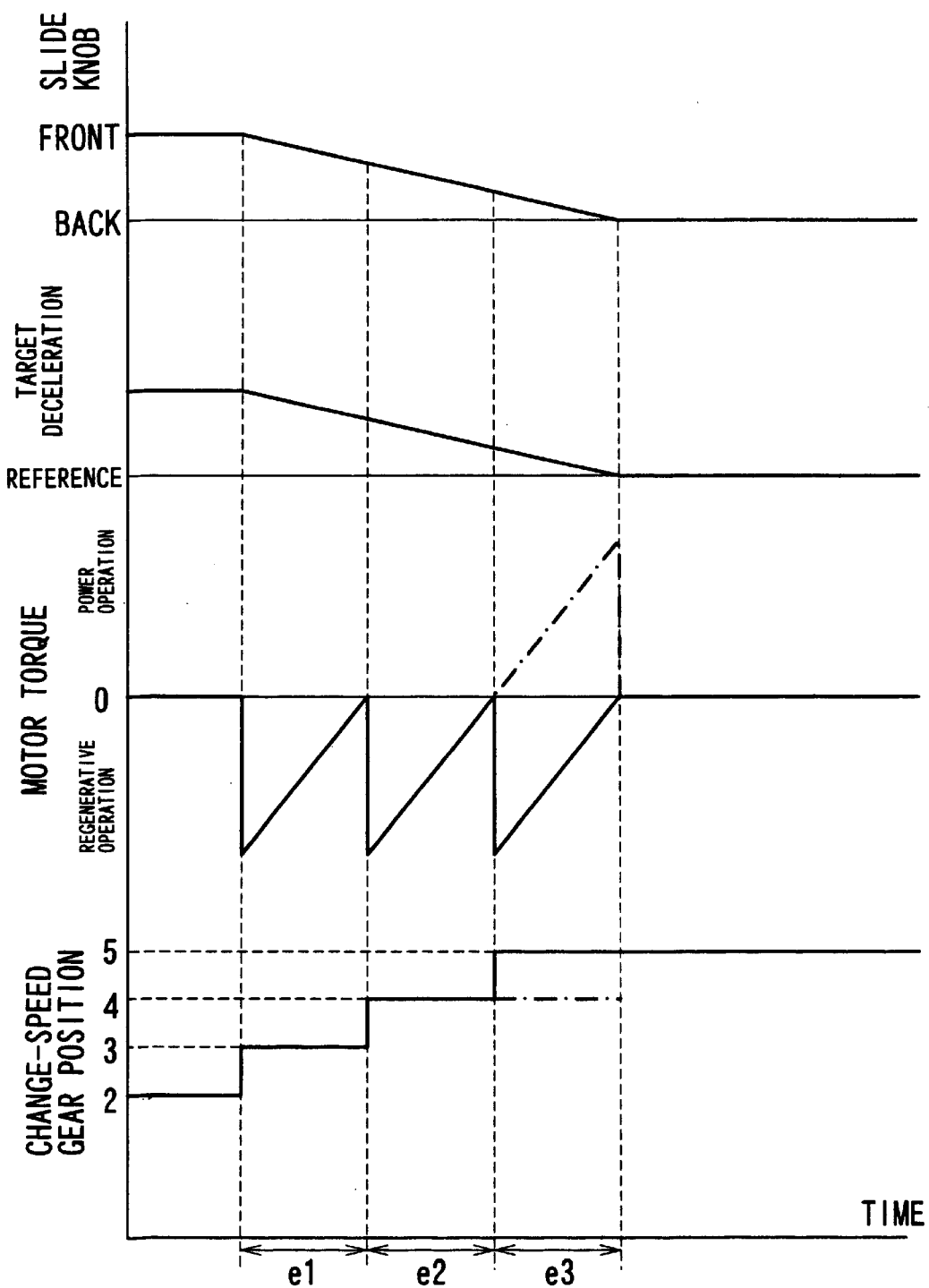
FIG. 36 shows the relationship between the setting of the deceleration and the changeover of the change-speed gear position as an example.

The hybrid vehicle of the second embodiment repeatedly carries out the drive control routine discussed above, so as to implement the braking control by the power source braking. The hybrid vehicle may also carry out the braking control by the wheel braking in combination with the braking control by the power source braking. The following describes one exemplified process of changing over the change-speed gear position under the condition of the varying deceleration in the hybrid vehicle of the second embodiment. FIG. 36 shows the relationship between the setting of the deceleration and the changeover of the change-speed gear position as an example. In the example of FIG. 36, the fourth (4) position is selected as the current gear shift position.

The driver operates the slide knob 161 to lower the deceleration in a time period e1 to e3. The slide knob 161 is slid from the front to the back. The target deceleration of the vehicle continuously decreases in response to this operation as shown in FIG. 36.

It is here assumed that the initial deceleration is attained at the second speed ($2^{nd}$) only by the engine brake. When the target deceleration decreases in a time period e1, the change-speed gear position is changed over to the third speed ($3^{rd}$) that is the upper speed by one step. The motor 20 then carries out the regenerative operation for braking. In order to lower the deceleration at the second speed ($2^{nd}$), the motor 20 is required to carry out the power operation. The power operation is, however, disadvantageous from the viewpoint of the energy recovery rate. This is why the change-speed gear position is changed over to the third speed ($3^{rd}$). In the time period e1, the quantity of regeneration by the motor 20 is reduced to attain the deceleration in response to the operation of the slide knob 161.

In a time period e2 after the quantity of regeneration by the motor 20 reaches the value '0' at the third speed ($3^{rd}$), with a view to enhancing the energy recovery rate, the change-speed gear position is further changed over to the fourth speed ($4^{th}$) that is the upper speed by another one step. The motor 20 again carries out the regenerative operation for braking. In the time period e2, the quantity of regeneration by the motor 20 is reduced to attain the deceleration in response to the operation of the slide knob 161.

Similarly, in a time period e3 after the quantity of regeneration by the motor 20 reaches the value '0' at the fourth speed ($4^{th}$), with a view to enhancing the energy recovery rate, the change-speed gear position is further changed over to the fifth speed ($5^{th}$) that is the upper speed by still another one step. The motor 20 again carries out the regenerative operation for braking. When the fourth (4) position is selected as the current gearshift position, the upper limit of the change-speed gear position is originally restricted to the fourth speed ($4^{th}$). Under such restriction, as shown by the one-dot chain line in FIG. 36, the motor 20 carries out the power operation for braking at the fourth speed ($4^{th}$). This undesirably lowers the energy recovery rate. In the hybrid vehicle of the second embodiment, the position of the change-speed gear is selectable in the course of braking, irrespective of the restriction by the gearshift position. The braking control at the fifth speed ($5^{th}$) is accordingly carried out in the time period e3.

The hybrid vehicle of the second embodiment discussed above selects the change-speed gear position that is advantageous from the viewpoint of the energy recovery rate in the course of braking, irrespective of the restriction by the gearshift position. This arrangement enhances the energy recovery rate of the vehicle in the braking process. The braking control is naturally carried out with the deceleration set under the condition of the selected gearshift position. The driver accordingly utilizes the power source braking without feeling any incompatibility.

During the stationary driving or acceleration, on the other hand, the position of the change-speed gear is set according to the gearshift position. For example, it is assumed that the fifth speed ($5^{th}$) is actually used in the braking process at the fourth (4) position.

When the driver steps on the accelerator pedal after the braking control, the position of the change-speed gear is immediately changed over to the fourth speed ($4^{th}$) for further driving. This arrangement ensures the quick acceleration required by the driver, subsequent to the braking control.

The hybrid vehicle of the second embodiment enhances the energy recovery rate in the braking process, while actualizing the speed reduction and acceleration meeting the requirements of the driver. This arrangement enhances the effectiveness of the power source braking and improves the controllability of the vehicle.

The second embodiment regards the case of selecting the change-speed gear position suitable for charging the battery as one exemplified process of selecting the change-speed gear position with preference to the energy recovery rate. The selection of the change-speed gear position may, however, be carried out from another point of view. One modified procedure selects the position of the change-speed gear giving the highest regenerative energy.

The hybrid vehicle of the second embodiment selects the position of the change-speed gear in the specific range that allows deviation by one step respectively from the upper limit and the lower limit specified by the gearshift position. This arrangement facilitates the control of the transmission in a transient period from braking to another driving state in the hybrid vehicle of the second embodiment. In the case where the braking control is carried out with the change-speed gear position that deviates from the specified change-speed gear position by several steps, it is necessary to change the change-speed gear position over the several steps in the transient period from the braking control to the stationary driving or acceleration. The control actualizing such a change is undesirably complicated, and the changeover of the change-speed gear position requires a relatively long time. This may interfere with the quick acceleration subsequent to braking. The hybrid vehicle of the second embodiment selects the position of the change-speed gear in the specific range that allows deviation only by one step respectively from the upper limit and the lower limit specified by the gearshift position. This arrangement thus effectively prevents the possible troubles discussed above.

B3. First Modification of Second Embodiment

In the case where the changeover of the change-speed gear position by several steps subsequent to braking is permitted from both the viewpoints of the control procedure to perform the changeover and the time period required for the changeover, the selection of the change-speed gear position is allowed in the range that deviates by two or more steps from the restricted region by the gearshift position. A concrete example of the change-speed gear position changeover process in such cases is described with FIG. 37.

Figure 37:
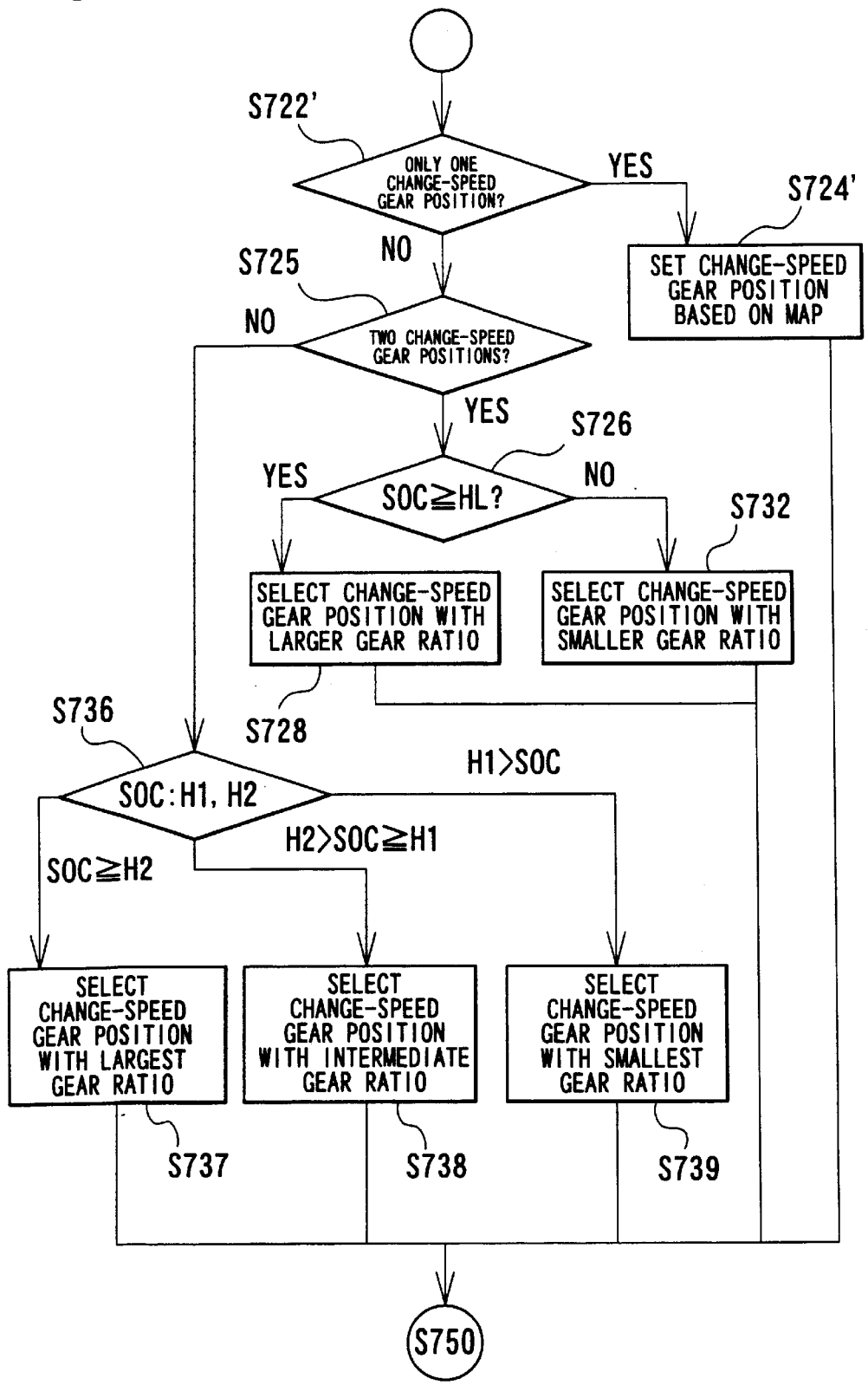
FIG. 37 is a flowchart showing a routine of the change-speed gear position changeover process executed in a first modification of the second embodiment.

FIG. 37 is a flowchart showing a routine of the change-speed gear position changeover process as a modified example. This replaces the processing of steps S722 through S734 in the flowchart of FIG. 35. The hybrid vehicle of the second embodiment has at most three positions of the change-speed gear mapped to one deceleration as shown in the map of FIG. 10. The processing of FIG. 37 selectively uses one of the three positions of the change-speed gear with preference to the energy recovery rate.

After the selection of the change-speed gear position attaining the target deceleration, the CPU determines whether or not there is only one change-speed gear position mapped to the target deceleration (step S722'). When the target deceleration is attained at only one position of the change-speed gear, the CPU sets the position of the change-speed gear read from the map to the current position of the change-speed gear (step S724').

When it is determined at step S722 that the target deceleration is attained at a plurality of different positions of the change-speed gear, on the other hand, the CPU subsequently determines whether the target deceleration is attained at two different change-speed gear positions or more (step S725). When it is determined that there are two different positions of the change-speed gear mapped to the target deceleration, the CPU refers to the remaining charge SOC of the battery 50 and compares the remaining charge SOC with a predetermined value HL (step S726). In the case where the remaining charge SOC is not less than the predetermined value HL, the CPU selects the position of the change-speed gear having the lesser quantity of regenerated electric power, that is, the position of the change-speed gear having a larger gear ratio out of the two alternatives (step S728), with a view to preventing the battery 50 from being excessively charged. In the case where the remaining charge SOC is less than the predetermined value HL, on the other hand, the CPU selects the position of the change-speed gear suitable for charging the battery 50, that is, the position of the change-speed gear having a smaller gear ratio out of the two alternatives (step S732).

When it is determined that there are more than two different positions of the change-speed gear, that is, there are three different positions of the change-speed gear, mapped to the preset deceleration, the CPU compares the remaining charge SOC of the battery 50 with two predetermined threshold values H1 and H2 (step S736). A relationship H1<H2 holds between these threshold values. In the case where the remaining charge SOC is not less than the threshold value H2, the CPU selects the position of the change-speed gear most suitable for charging, that is, the position of the change-speed gear having a largest gear ratio (step S737). In the case where the remaining charge SOC is less than the threshold value H2 but is not less than the threshold value H1, the CPU selects the position of the change-speed gear having an intermediate gear ratio out of the three alternatives (step S738). In the case where the remaining charge SOC is less than the threshold value H1, the CPU selects the position of the change-speed gear having the least quantity of regenerated electric power, that is, the position of the change-speed gear having a smallest gear ratio (step S739).

The threshold values H1 and H2 used for the decision at step S736 are criteria to change over the position of the change-speed gear.

Appropriate values are set to the threshold values H1 and H2, so that the optimum position of the change-speed gear having the desired quantity of regenerated electric power is selected corresponding to the charge level of the battery 50. Both the threshold values H1 and H2 may be different from the reference value HL used at step S726, or alternatively either one of the threshold value H1 and H2 may be coincident with the reference value HL. In the change-speed gear position selection routine of the modified example, it is also desirable to set certain hystereses for the decisions of steps S726 and S736, in order to prevent the position of the change-speed gear from being frequently switched over between and among the alternatives according to the remaining charge SOC.

Selection among the three or more positions of the change-speed gear advantageously enables the charge level of the battery to be regulated minutely. The above example shows the processing to selectively use the three change-speed gear positions. The similar processing may, however, be applicable to the arrangement of performing the selection among a greater number of change-speed gear positions.

It is desirable to restrict the selectable range of the change-speed gear position, so that the difference between the gear ratio region specified by the gearshift position and the gear ratio actually used in the braking control is within a predetermined range. As described previously, the technique of the second embodiment changes over the position of the change-speed gear according to the gearshift position, after the braking control. In the case where there is a large difference between the gear ratio used in the braking process and the gear ratio used after the braking control, the driving conditions of the engine 10 and the motor 20 significantly vary with the changeover of the change-speed gear position after the braking control. If the variation is extremely large, some troubles may arise; for example, a significant vibration occurs in the vehicle or the driving state of the engine 10 becomes unstable. The restriction to make the difference between the gear ratio region specified by the gearshift position and the gear ratio actually used in the braking control within the predetermined range that does not cause such a large variation ensures the speed reduction and acceleration without any of the above troubles, and thereby attains the smooth driving. The predetermined range of the gear ratio may be set by experiments or analyses, based on the response to the control of the engine 10 and the speed of the changeover of the change-speed gear position.

B4. Second Modification of Second Embodiment

Figure 38:
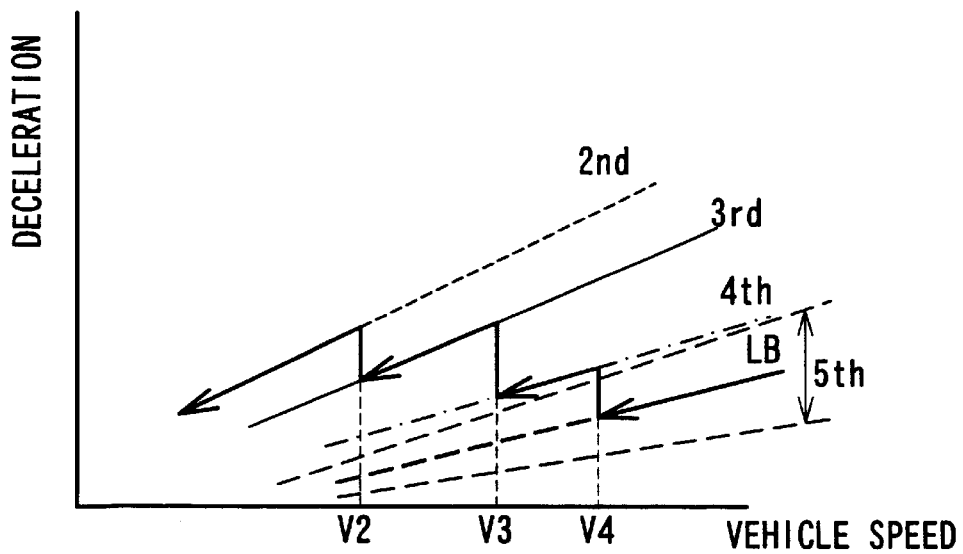
FIG. 38 shows the settings of the deceleration in a second modification of the second embodiment.

The relationship between the gearshift position and the deceleration is not restricted to the settings described in the second embodiment. FIG. 38 shows the settings of the deceleration as a second modified example. The deceleration may be changed only with regard to the change-speed gear position having the smallest gear ratio among all the change-speed gear positions used at each gearshift position. The map of FIG. 38 shows an example of the settings at the D position. The available change-speed gear position at the D position ranges from the first speed (L) to the fifth speed ($5^{th}$). The change-speed gear position having the smallest gear ratio is the fifth speed ($5^{th}$). In response to an operation of the slide knob 161 at the D position, the deceleration corresponding to the fifth speed ($5^{th}$) is changed in the range shown in FIG. 38. The deceleration is unchanged and kept at the preset values, however, at the change-speed gear positions of and below the fourth speed ($4^{th}$), irrespective of the operation of the slide knob 161. The map of FIG. 38 shows the resulting settings of the deceleration at the respective positions of the change-speed gear. The deceleration at the first speed (L) is omitted from the illustration, since it is too high.

In the case of such settings of the deceleration, the series of the control processing executed in the second embodiment and shown in FIGS. 32 through 35 are adopted to carry out the speed reduction control. In this case, the processing of steps S410 through S420 may be omitted from the drive control process of the second embodiment (FIG. 32).

As clearly understood from FIG. 38, the deceleration set in response to the operation of the slide knob 161 corresponds to the lower limit of the power source braking applied to the vehicle. At the D position, the deceleration is changed during a drive at the fifth speed ($5^{th}$) in response to the operation of the slide knob 161.

During a drive at the fourth speed ($4^{th}$), however, the minimum deceleration required by the driver has been assured, so that the braking control is carried out with the preset deceleration. In the case where the M position is selected to enable the driver to manually change over the position of the change-speed gear, only the deceleration at the change-speed gear position selected by the driver is changed in response to the slide knob 161.

B5. Third Modification of Second Embodiment

Figure 39:
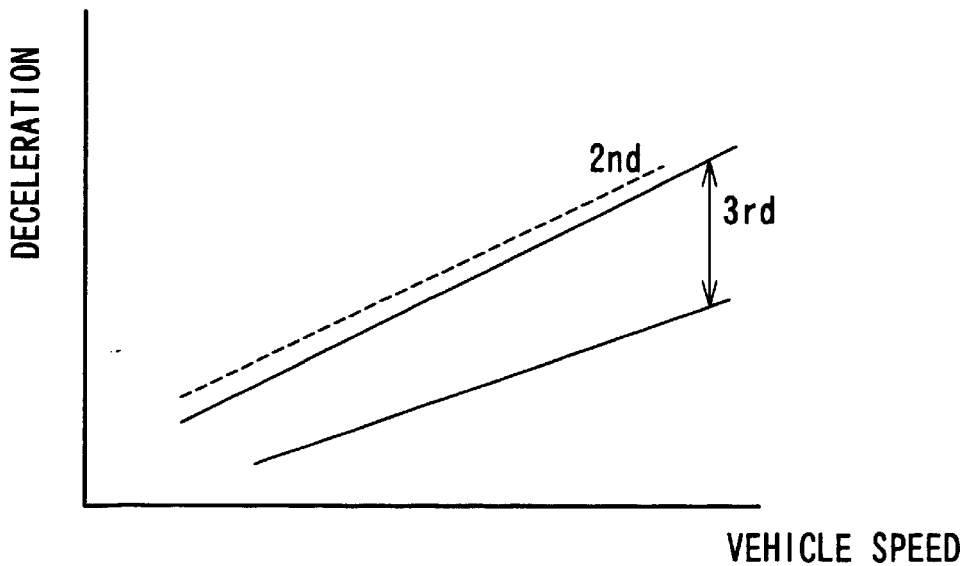
FIG. 39 shows the settings of the deceleration in a third modification of the second embodiment.

FIG. 39 shows the settings of the deceleration as a third modified example. The map of FIG. 39 shows an example of the settings at the third (3) position. The available change-speed gear position at the position 3 ranges from the first speed (L) to the third speed ($3^{rd}$). The change-speed gear position having the smallest gear ratio is the third speed ($3^{rd}$). In response to an operation of the slide knob 161 at the position 3, the deceleration corresponding to the third speed ($3^{rd}$) is changed in the range sown in FIG. 39. The deceleration is unchanged and kept at the preset values, however, at the change-speed gear positions of and below the second speed ($2^{nd}$), irrespective of the operation of the slide knob 161. At the position 3, the fourth speed ($4^{th}$) and the fifth speed ($5^{th}$) are not used, and the deceleration is thus not changed at these change-speed gear positions.

In the case of such settings of the deceleration, the series of the control processing executed in the second embodiment and shown in FIGS. 32 through 35 are adopted to carry out the speed reduction control. In this case, the processing of steps S410 through S420 may be omitted from the drive control process of the second 20 embodiment (FIG. 32). Like the second modified example, the settings of the third modified example assure the minimum deceleration required by the driver and accordingly enables the braking control to be carried out with the preset deceleration.

B6. Fourth Modification of Second Embodiment

Figure 40:
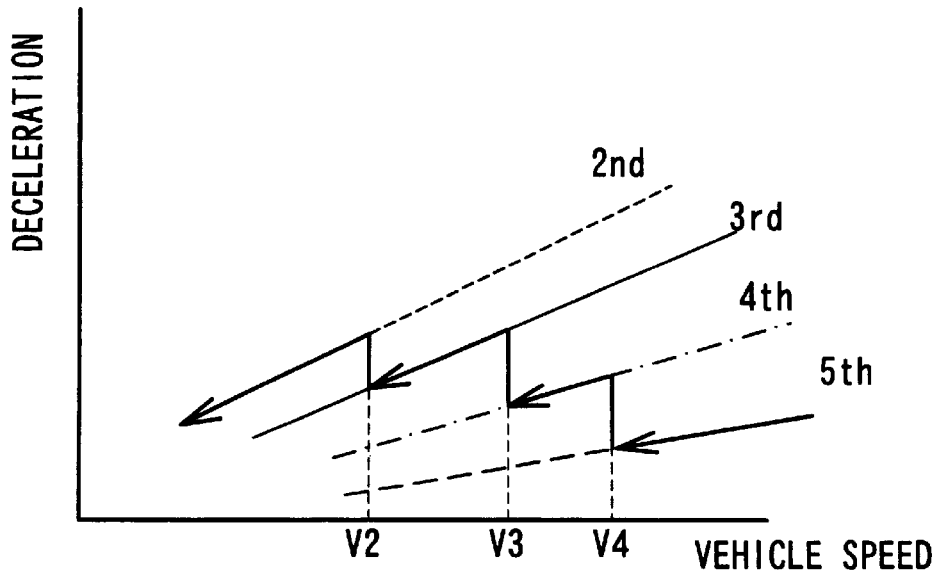
FIG. 40 shows the settings of the deceleration using a slide knob 161 in a fourth modification of the second embodiment.
Figure 41:
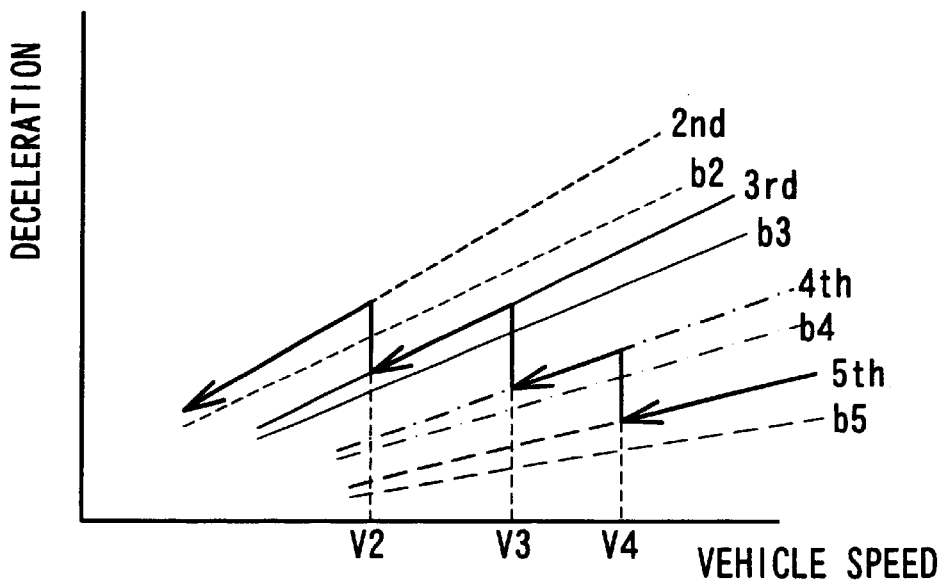
FIG. 41 shows the settings of the deceleration by operating the slide knob 161 in an increasing direction.

FIG. 40 shows the settings of the deceleration using the slide knob 161 in a fourth modified example. FIG. 41 shows the settings of the deceleration by operating the slide knob 161 in an increasing direction. Straight lines $2^{nd}$ through $5^{th}$ in FIG. 41 respectively show the resulting settings of the deceleration. Straight lines b2 through b5 in FIG. 41 correspond to straight lines $2^{nd}$ to $5^{th}$ in FIG. 40.

In this modified example, the deceleration is changed not only at the change-speed gear position having the smallest gear ratio but at all the change-speed gear positions, in response to the operation of the slide knob 161. The braking control is accordingly carried out with the higher decelerations than the settings of FIG. 40 against any vehicle speed. This arrangement enables the deceleration to be changed in any case including a drive with the smallest gear ratio, thus attaining the braking control satisfying the driver's feeling.

In still another modification, the settings of the deceleration may be changed between the M position and the other gearshift positions. In this modification, the map of FIG. 40 shows the settings of the deceleration at the D position, whereas the map of FIG. 41 shows the settings of the deceleration when the M position is selected without the operation of the slide knob 161. In this manner, the deceleration at the M position may be set higher than the deceleration at the D position over all the speed-change gear positions.

Under the selection of the M position, the high controllability is generally required. The higher deceleration at the M position than the deceleration at the D position is often required for the braking control. The arrangement of setting the deceleration at the M position higher than the deceleration at the D position does not require the settings of the deceleration to be changed again in response to the selection of the M position but attains the braking control satisfying the driver's feeling.

Any combination of the above arrangements may be applied for the variation in deceleration at each gearshift position in response to the operation of the slide knob 161. One applicable process varies only the deceleration at the fifth speed ($5^{th}$) when the current gearshift position, is at the D position. The process varies the deceleration at all the change-speed gear positions when the current gearshift position is at the fourth (4) position. As described above, any arrangement may be applied for the settings of the deceleration as long as it is suitable for implementing the braking control satisfying the driver's feeling.

C. Third Embodiment

Figure 42:
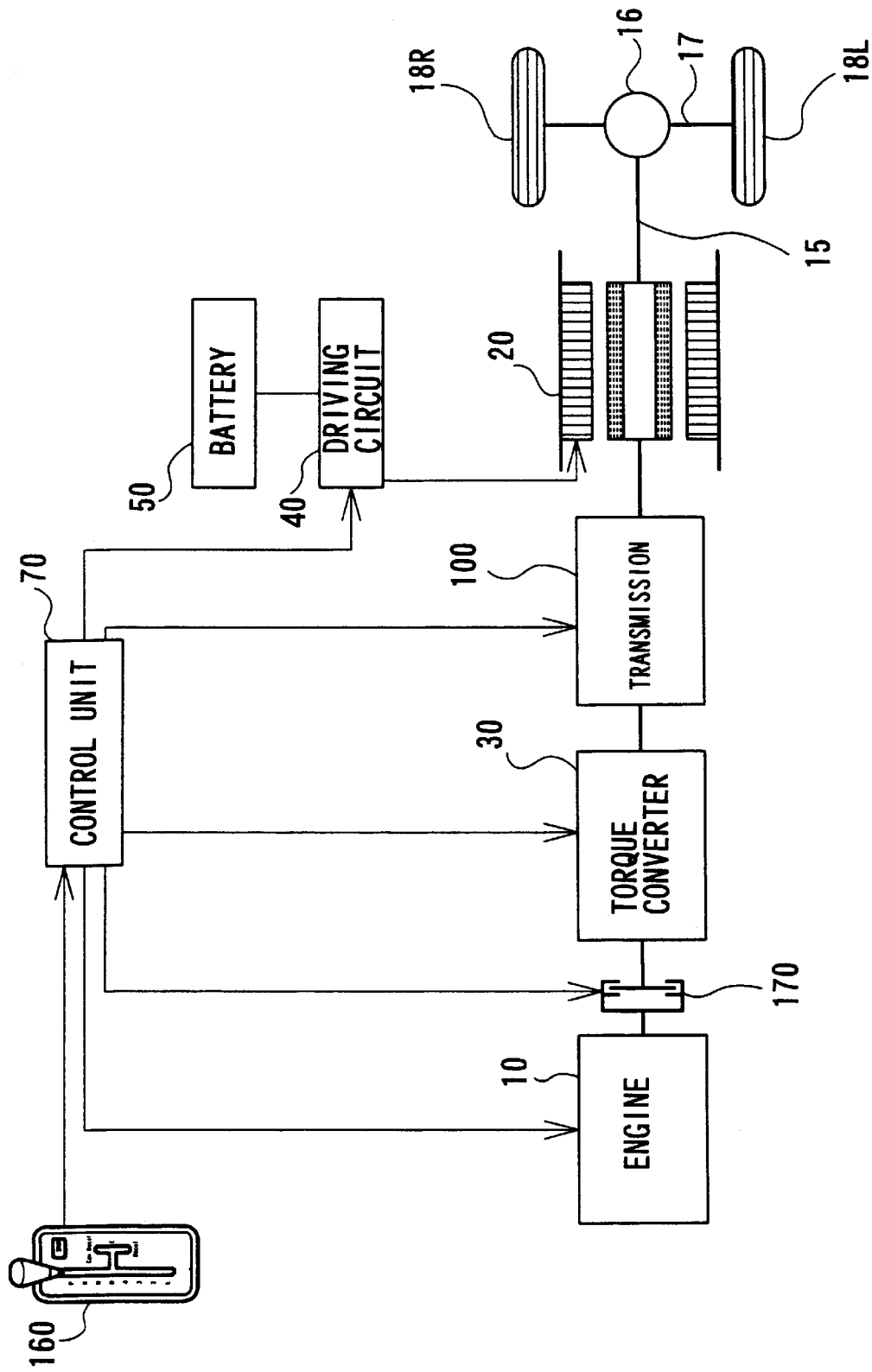
FIG. 42 schematically illustrates the structure of another hybrid vehicle in a third embodiment according to the present invention.

The following describes a third embodiment according to the present invention. FIG. 42 schematically illustrates the structure of a hybrid vehicle in the third embodiment. The difference from the first embodiment is that the hybrid vehicle of the third embodiment has a different power transmission pathway from the power source to the axle 17. In the hybrid vehicle of the third embodiment, the engine 10, the torque converter 30, the transmission 100, and the motor 20 are connected in this sequence. The output shaft 15 of the motor 20 is linked with;the axle 17 via the differential gear 16. A clutch 170 is interposed between the engine 10 and the torque converter 30. The clutch 170 works by means of oil pressure to connect and disconnect the power transmission between the engine and the torque converter 30. The operations of the clutch 170 are controlled by the control unit 70. The detailed structures of the respective constituents including the torque converter 30, the transmission 100, and the motor 20 are identical with those in the first embodiment.

In the structure of the third embodiment, the driver operates the Decel switch and the Can-Decel switch to regulate the deceleration. The operation of the SNOW switch 163 restricts the upper limit of the possible range of setting of the deceleration.

Figure 43:
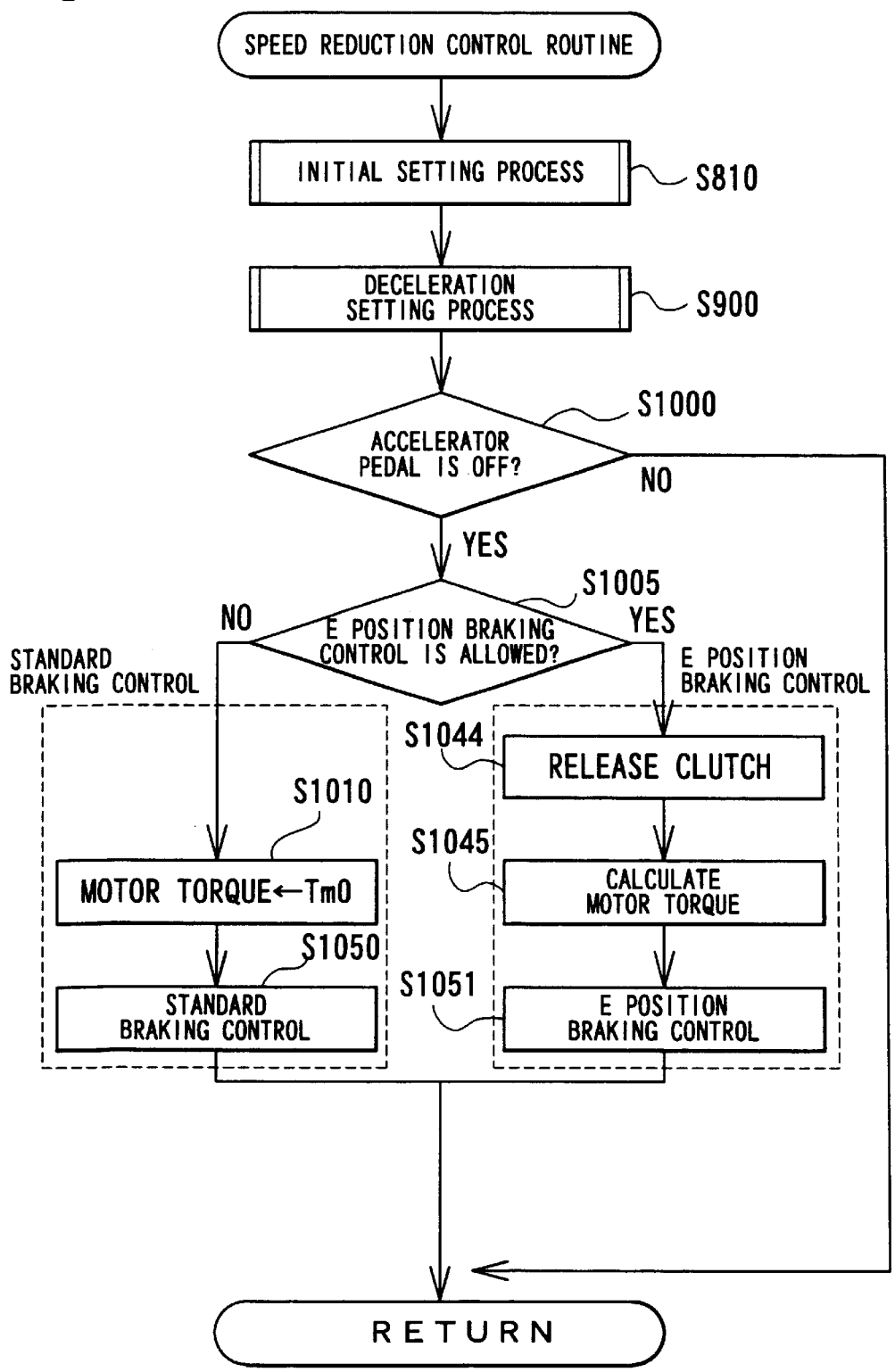
FIG. 43 is a flowchart showing a speed reduction control routine executed in the third embodiment.

FIG. 43 is a flowchart showing a speed reduction control routine executed in the third embodiment. Like the first embodiment, the CPU in the control unit 70 executes this series of the processing. When the program enters this routine, the CPU first carries out the initial setting process and the deceleration setting process (steps S10 and S100). These processes are practically the same as the processes discussed in the first embodiment (FIGS. 16 through 18).

The initial setting process specifies the initial setting of the deceleration and cancels the setting according to the gearshift position. In the first embodiment, the initial setting process sets the initial value to the position of the change-speed gear (step S50 in FIG. 16). The third embodiment, however, does not require the control of the change-speed gear position in the process of E position braking as described later and thus omits the step of setting the initial value to the position of the change-speed gear.

Like the first embodiment, the deceleration setting process sets the target deceleration in response to the operations of the Decel switch and the Can-Decel switch. The deceleration restricting process is also carried out to restrict the upper limit of the target deceleration, based on the selection or non-selection of the snow mode. The technique of the third embodiment executes these series of the processing to set the adequate target deceleration according to the driving state of the hybrid vehicle. The technique of the first embodiment uses the table (FIG. 11) that enables the target deceleration to be set in a wide range accompanied with the changeover of the change-speed gear position. In the structure of the third embodiment, on the other hand, the gear ratio does not have any effects on the braking force under the E position braking control, so that the target deceleration is set in a specific range attained by only the motor 20.

The CPU subsequently determines whether or not the braking control by the power source braking is to be carried out, based on the input signal regarding the accelerator travel (step S200). The CPU then determines whether or not the E position braking control is allowed, based on the same criteria as those of the first embodiment (step S205). In the case where the E position braking control is not allowed, the CPU sets a predetermined value Tm0 to the target torque of the motor and carries out a standard braking control (steps S210 and S250). These processes are identical with those executed in the first embodiment and are thus not specifically described here.

In the case where the E position braking control is allowed, on the other hand, a certain control process for the E position braking control, which is different from that of the first embodiment, is carried out. In the E position braking control process, the CPU first releases the clutch (step S844). The concrete procedure regulates the oil pressure in the clutch 170 to disconnect the power transmission between the engine 10 and the torque converter 30.

The CPU subsequently calculates the target torque of the motor 20 (step S845). The technique of the first embodiment calculates the target torque of the motor from the gear ratio according to the position of the change-speed gear. In the structure of the third embodiment, the motor 20 is connected with the output shaft 15 not via the transmission 100 but directly as shown in FIG. 42. Release of the clutch 170 causes the engine not to contribute to the braking control. Under such conditions, only the motor 20 applies the braking force for the power source braking. In the structure of the third embodiment, the target torque of the motor 20 is thus determined unequivocally according to the currently set target deceleration. In the case where the target deceleration is set using the braking torque of the output shaft 15 as a parameter, the braking torque is set to the target torque of the motor 20. The target torque may be calculated from the target deceleration according to preset arithmetic operations or may alternatively be read from a preset table.

After setting the target torque, the CPU carries out the E position braking control (step S851). In the structure of the third embodiment, the driving state of the engine does not contribute to the braking control, so that no special control is carried out for the operations of the engine. The CPU simply drives the engine at idle or stops the engine. No special control is also carried out for the transmission 100 since the transmission 100 does not affect the braking control. The CPU keeps the previous gear ratio without any change. The motor 20 performs the regenerative operation with the preset target torque. The control procedure of the motor follows the description of the first embodiment.

The hybrid vehicle of the third embodiment carries out the series of the processing discussed above, so as to implement the braking control by the power source braking with the deceleration set by the driver. In the case where the snow mode is set, for example, under the condition of the low friction coefficient of the road surface, the upper limit of the deceleration is restricted to ensure the braking control by the power source braking in a stable driving range.

The hybrid vehicle of the third embodiment has additional advantages. The first additional advantage is that the hybrid vehicle of the third embodiment facilitates the braking control. In the structure of the third embodiment, the clutch 170 is released in the process of E position braking, so that neither the transmission 100 nor the engine 10 contributes to the braking control. An unequivocal relationship accordingly holds between the target deceleration and the target torque of the motor 20. This significantly facilitates the process of setting the target torque of the motor 20. This arrangement does not require the change of the gear ratio with a variation in vehicle speed in the course of braking. These facts significantly simplifies the braking control process in the third embodiment.

The second additional advantage is that the hybrid vehicle of the third embodiment has improved energy efficiency. In the structure of the third embodiment, the clutch 170 is released to prevent the kinetic energy of the hybrid vehicle from being consumed in the form of heat by engine brake. The hybrid vehicle of the third embodiment thus reduces a possible energy loss in the process of regenerating the kinetic energy of the vehicle by means of the motor 20.

The third additional advantage is that the hybrid vehicle of the third embodiment carries out the more efficient and appropriate control in the snow mode. In the hybrid vehicle of the first embodiment, the driving force is applied by the engine brake even when the target torque of the motor 30 is equal to zero. The motor 30 should carry out the power operation, in order to give the braking force of less than the engine brake. In the hybrid vehicle of the third embodiment, on the other hand, the engine 10 does not contribute to the braking control. Regulating the target torque of the motor 30 thus enables the power source braking with the smaller braking force than that by the engine brake to be actualized by regenerative braking. There is no need to take into account the balance with the engine brake. This ensures the stable application of the target braking force. Even under the condition of the extremely small friction coefficient of the road surface, this arrangement ensures the efficient and stable braking control of the hybrid vehicle.

A variety of modifications are applicable to the hybrid vehicle of the third embodiment. The third embodiment regards the case of releasing the clutch 170 every time the E position braking control is performed. One modified procedure controls the release of the clutch 170 according to the driving state of the hybrid vehicle. For example, when the battery 50 has the remaining charge close to the full charge level, which does not allow the sufficient regenerative braking, the E position control process is carried out with the clutch 170 kept in a coupled position. This arrangement ensures the appropriate braking control by the power source braking irrespective of the charge level of the battery 50, thus improving the facility of the power source braking and enhancing the controllability of the hybrid vehicle. The release and the coupling of the clutch 170 may be controlled according to a diversity of other conditions.

A variety of modifications are also applicable to the hardware configuration. In the description below, the side of the engine 10 is defined as the upstream side and the side of the axle 17 is defined as the downstream side in the pathway of power transmission from the engine 10 to the axle 17. In the hybrid vehicle shown in FIG. 25, the clutch 170 is interposed between the engine 10 and the torque converter 30. The clutch 170 may, however, be disposed at any position upstream the motor 20.

Like the first embodiment, the technique of the third embodiment is applicable to the series hybrid vehicle. In this case, the hybrid vehicle may have the structure of FIG. 29 without the torque converter 30A and the transmission 100A. The vehicle may be constructed by further omitting the engine 10A and the generator G.

In accordance with another modified structure, the engine 10, the motor 20, the torque converter 30, and the transmission 100 are connected in this sequence from the upstream side like the first embodiment, and the clutch 170 is interposed between the engine 10 and the motor 20. In this modified structure, the change-speed gear position selection process (see FIG. 23) is carried out in the course of E position braking control as discussed in the first embodiment. This arrangement enables the braking control to be carried out by the motor in a wide range while effectively utilizing the advantage that the engine does not contribute to the braking control.

D. Fourth Embodiment

The above embodiments regard the hybrid vehicle having the engine and the motor as the available energy output source for driving. The technique of the present invention is applicable to a variety of vehicles having the structure that enables regenerative braking by the motor. For example, the principle of the present invention may be applied to a vehicle that uses a motor mainly to drive auxiliary machinery while the engine is at a stop, to start the engine, and to carry out the regenerative braking, and does not use the motor, in principle, as the power source for driving. An example of such application is described below as a fourth embodiment of the present invention.

Figure 44:
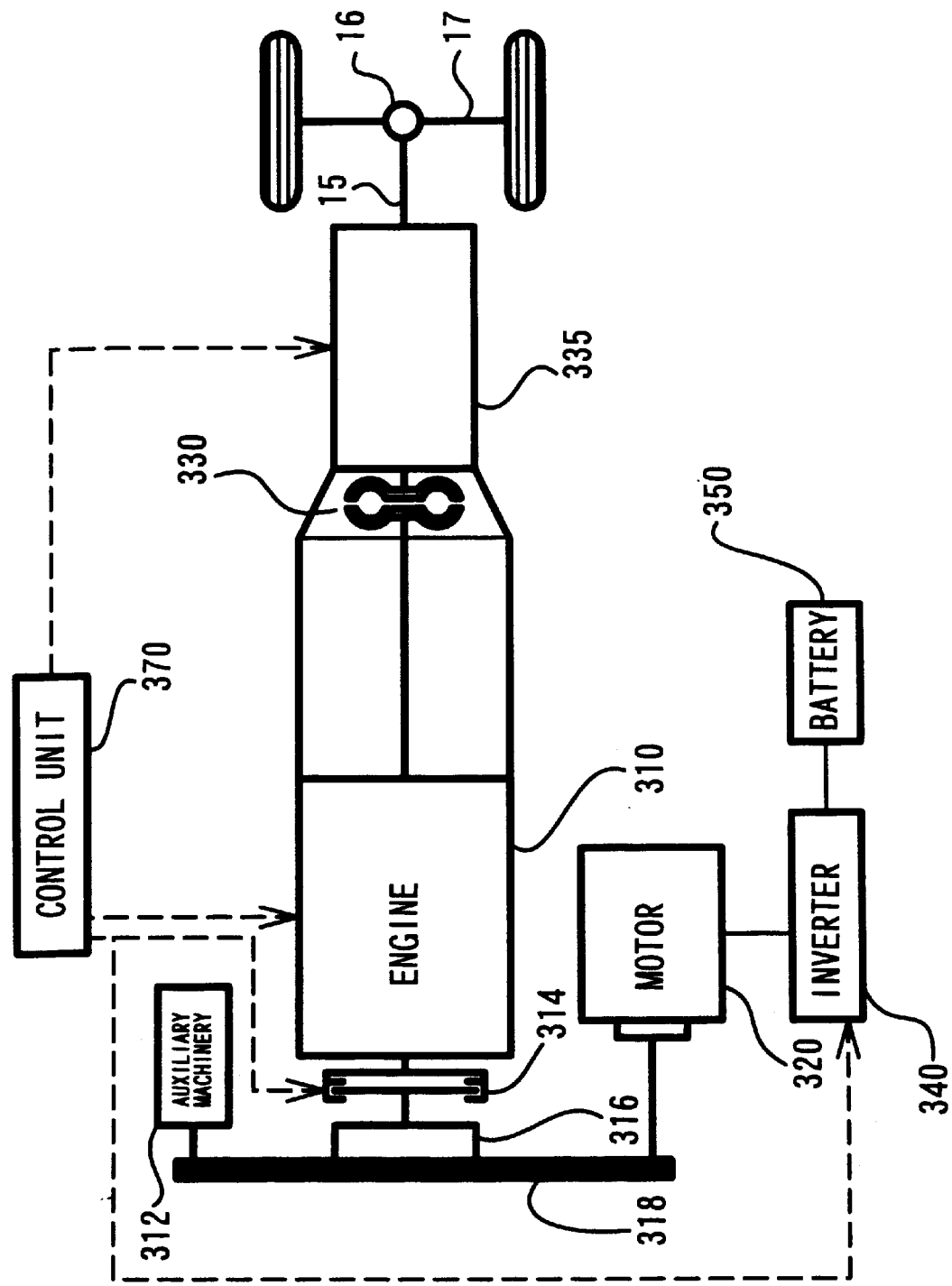
FIG. 44 schematically illustrates the structure of a vehicle in a fourth embodiment according to the present invention.

FIG. 44 schematically illustrates the structure of a vehicle in the fourth embodiment. This vehicle has an engine 310 as the power source for driving. The power of the engine 310 is transmitted for driving in the sequence of a torque converter 330, a transmission 335, the drive shaft 15, the differential gear 16, and the axle 17. The structures of the torque converter 330 and the transmission 335 are identical with those of the torque converter 30 and the transmission 100 in the first embodiment.

In the vehicle of the fourth embodiment, a pulley 316 is connected with a crankshaft of the engine 310 via a clutch 314. The pulley 316 is further connected with auxiliary machinery 312 and a motor 320 via a power transmission belt 318 that allows mutual power transmission. The auxiliary machinery 312 includes a compressor of an air conditioner and an oil pump for power steering. The motor 320 is a synchronous motor and is driven with a battery 350 as the electric supply through switching operations of an inverter 340 working as a driving circuit. The motor 320 is rotated by an external force to function as a generator.

The operations of the respective constituents included in the vehicle of the four embodiment are controlled by a control unit 370. Although not being illustrated, signals from various switches and sensors that enable the driver to specify the speed reduction rate are input into the control unit 370 in the same manner as discussed in the first embodiment.

The following describes general operations of the vehicle of the fourth embodiment. As mentioned previously, the vehicle is driven with the power of the engine 310. During the drive, the clutch 314 is coupled, so as to cause the auxiliary machinery 312 to be driven with the power of the engine 310.

While the clutch 314 is coupled, the motor 320 is rotated via the power transmission belt 318, so that the vehicle is braked by the regenerative operation of the motor 320.

When the vehicle stops even temporarily, for example, at a traffic light, the control unit 370 stops the operation of the engine 310. At the same time, the control unit 370 releases the clutch 314, so as to cause the motor 320 to carry out the power operation and drive the auxiliary machinery 312 with the power of the motor 320. In order to start driving the vehicle, which has been at a stop, the control unit 370 couples the clutch 314 to crank the engine 310 with the power of the motor 320 and start the engine 310. During the drive, the power of the motor 320 is used, in principle, only for cranking the engine 310. One possible modification continues the operation of the motor 320 to assist the power at the time of starting the vehicle, until the vehicle reaches a preset vehicle speed.

The vehicle of the fourth embodiment stops the operation of the engine 310 while the vehicle is at a stop. This arrangement effectively saves the fuel consumption.

The vehicle of the fourth embodiment enables the regenerative braking by the motor 320 and thus readily attains the speed reduction corresponding to the step-on amount of the accelerator pedal like the first embodiment. The connection of the motor 320, the engine 310, the torque converter 330, and the transmission 335 under the coupling condition of the clutch 314 is equivalent to the connection in the first embodiment, from the viewpoint of the application of the braking force. The series of the control processing discussed in the first embodiment is accordingly applied for the braking control executed in the vehicle of the fourth embodiment. The torque by the regenerative braking of the motor 320 is transmitted to the drive shaft 15 via the transmission 335. Like the first embodiment, the total control of the transmission 335 and the torque of the motor 320 enables the speed reduction rate to be controlled in a wide range.

As described above, the present invention is not restricted to the vehicle with the motor mounted thereon for driving. The fourth embodiment regards the structure in which the braking torque of the motor 320 is transmitted to the drive shaft 15 via the transmission 335. The vehicle may, however, have a motor for regenerative braking that is directly connected with the drive shaft 15.

E. Other Modifications

In the embodiments discussed above, the driver specifies the target deceleration. The speed reduction rate is, however, not restricted to the deceleration, but a braking force or a braking rate applied to the wheels may be set to the speed reduction rate. The above embodiments regard the process of controlling the regenerative braking by means of the motor with the target torque as the parameter. A variety of other braking force-related parameters may, however, be used in place of the torque. For example, the electric power generated by the regenerative braking or the electric current flowing through the motor may be used as the parameter of the control.

The embodiments described above respectively use the transmission 100 that changes the gear ratio in a stepwise manner. Any other suitable structure, for example, a mechanism of continuously varying the gear ratio, may be employed for the transmission 100.

The present invention is not restricted to the above embodiments or their modifications, but there may be many other modifications, changes, and alterations without departing from the scope or spirit of the main characteristics of the present invention. In one possible modification, the variety of control procedures discussed in the above embodiments may be actualized by the hardware configuration. Another modification carries out only part of the variety of control procedures discussed in the above embodiments.

Industrial Applicability

The technique of the present invention is preferably applied to a vehicle that may be braked with a motor as well as with a mechanical brake utilizing a frictional force, and also to a method of controlling such a vehicle.

What is claimed is:

1. A vehicle comprising a motor, a transmission that enables selection of a plurality of gear ratios in a process of power transmission, and a drive shaft, which are connected with one another, said vehicle being braked by means of a torque output from said motor, said vehicle comprising:

an operation unit, through an operation of which a driver of said vehicle specifies a speed reduction rate in a process of braking with said motor;

a target speed reduction rate setting unit that sets a target speed reduction rate in response to the operation of said operation unit;

a selection unit that selects a target gear ratio among a plurality of available gear ratios, the target gear ratio enabling the currently set target speed reduction rate to be attained by the torque of said motor;

a motor driving state specification unit that specifies a target driving state of said motor, in order to enable a braking force that attains the currently set target speed reduction rate to be applied to said drive shaft; and a control unit that controls said transmission to attain the target gear ratio and drives said motor in the specified target driving state.

2. A vehicle in accordance with claim 1, said vehicle further comprising an engine in a specific state of linkage that enables a braking torque to be applied to said drive shaft, wherein said selection unit selects the target gear ratio, based on the torques of said motor and said engine, and said motor driving state specification unit sets a target torque of said motor by taking into account the braking torque applied by said engine.

3. A vehicle in accordance with claim 1, said vehicle further comprising:

a storage unit, in which a relationship between the target speed reduction rate and the target gear ratio is stored, wherein said selection unit selects the target gear ratio by referring to said storage unit.

4. A vehicle in accordance with claim 1, said vehicle further comprising:

a changeover unit that changes over a selectable gear ratio range for the target gear ratio in response to a predetermined operation by said driver of said vehicle, wherein said operation unit has a mechanism that ensures the specification of the speed reduction rate in response to another operation of said changeover unit that is different from the predetermined operation for the changeover.

5. A vehicle in accordance with claim 1, wherein said target speed reduction rate setting unit comprises:

a detection unit that measures a number of times of operation of said operation unit; and a unit that sets the target speed reduction rate in a stepwise manner according to the observed number of times of operation.

6. A vehicle in accordance with claim 1, wherein said target speed reduction setting unit comprises:

a detection unit that measures an operation time of said operation unit; and a unit that sets the target speed reduction rate according to the observed operation time.

7. A vehicle in accordance with claim 1, wherein said target speed reduction setting unit comprises:

a detection unit that measures a quantity of operation of said operation unit; and a unit that sets the target speed reduction rate according to the observed quantity of operation.

8. A vehicle in accordance with claim 1, said vehicle further comprising:

a switch that gives an instruction to execute braking with the specified speed reduction rate in response to a predetermined operation by said driver of said vehicle; and a permission unit that allows operations of all said target speed reduction rate setting unit, said selection unit, said motor driving state specification unit, and said control unit only in the case where the braking execution instruction is given by means of said switch.

9. A vehicle in accordance with claim 8, said vehicle further comprising:

a changeover unit that changes over a selectable gear ratio range for the target gear ratio in response to a predetermined operation by said driver of said vehicle, wherein said switch has a mechanism that gives the braking execution instruction in response to another operation of said changeover unit that is different from the predetermined operation for the changeover.

10. A vehicle in accordance with claim 8, said vehicle further comprising:

an information unit that informs said driver of a result of the instruction whether or not to execute the braking with the specified speed reduction rate.

11. A vehicle in accordance with claim 1, wherein said target speed reduction rate setting unit comprises:

a decision unit that determines whether the operation of said operation unit is valid or invalid; and a prohibition unit that prohibits the setting of the target speed reduction rate from being changed when it is determined that the operation is invalid.

12. A vehicle in accordance with claim 11, wherein said operation unit has a mechanism that allows said driver to give an instruction to increase the speed reduction rate simultaneously with an instruction to decrease the speed reduction rate, and said decision unit determines that the operation of said operation unit is invalid in the case where the increase instruction is given simultaneously with the decrease instruction.

13. A vehicle in accordance with claim 1, wherein said operation unit has a mechanism that gives an instruction to vary the speed reduction rate, and said target speed reduction rate setting unit varies the speed reduction rate relative to a preset initial speed reduction rate as a standard level, in response to the operation of said operation unit, thereby setting the target speed reduction rate.

14. A vehicle in accordance with claim 13, said vehicle further comprising:

a switch that gives an instruction to execute braking with the specified speed reduction rate in response to a predetermined operation by said driver of said vehicle;

a permission unit that allows operations of all said target speed reduction rate setting unit, said selection unit, said motor driving state specification unit, and said control unit in the case where the braking execution instruction is given; and an ordinary braking unit that carries out braking with a predetermined speed reduction rate, irrespective of the operation of said operation unit, in the case where the braking execution instruction is not given, wherein the initial speed reduction rate is set equal to the predetermined speed reduction rate employed by said ordinary braking unit.

15. A vehicle in accordance with claim 11, said vehicle further comprising:

a switch that gives an instruction to execute braking with the specified speed reduction rate in response to a predetermined operation by said driver of said vehicle;

a permission unit that allows operations of all said target speed reduction rate setting unit, said selection unit, said motor driving state specification unit, and said control unit in the case where the braking execution instruction is given; and an ordinary braking unit that carries out braking with a predetermined speed reduction rate, irrespective of the operation of said operation unit, in the case where the braking execution instruction is not given, wherein the initial speed reduction rate is set to be significantly greater than the predetermined speed reduction rate employed by said ordinary braking unit.

16. A vehicle in accordance with claim 11, wherein said target speed reduction rate setting unit comprises:

a cancellation decision unit that determines whether or not the target speed reduction rate is to be cancelled; and a setting cancellation unit that resets the target speed reduction rate to the initial speed reduction rate when it is determined that the target speed reduction rate is to be cancelled.

17. A vehicle in accordance with claim 16, said vehicle further comprising:

a switch that gives an instruction to execute braking with the specified speed reduction rate in response to a predetermined operation by said driver of said vehicle, wherein said cancellation decision unit determines that the target speed reduction rate is to be cancelled in response to an operation of said switch.

18. A vehicle in accordance with claim 15, said vehicle further comprising:

a failure detection unit that detects a failure of said operation unit, wherein said cancellation decision unit determines that the target speed reduction rate is to be cancelled in response to detection of the failure.

19. A vehicle in accordance with claim 1, wherein said selection unit selects the target gear ratio with preference to a preset initial value.

20. A vehicle in accordance with claim 19, said vehicle further comprising:

a switch that gives an instruction to execute braking with the specified speed reduction rate in response to a predetermined operation by said driver of said vehicle, wherein the preset initial value is equal to a previous gear ratio immediately before the braking execution instruction is given by means of said switch.

21. A vehicle in accordance with claim 1, said vehicle further comprising:

an information unit that informs said driver of the currently set target speed reduction rate.

22. A vehicle in accordance with claim 1, said vehicle further comprising:

a failure detection unit that detects a failure of said operation unit; and an information unit that informs said driver of detection of the failure.

23. A vehicle in accordance with claim 1, wherein said operation unit has a mechanism that specifies the speed reduction rate by sliding a lever along a slide groove formed in advance.

24. A vehicle in accordance with claim 23, wherein said operation unit has a mechanism that continuously varies the setting of the speed reduction rate according to a sliding operation of said lever.

25. A vehicle in accordance with claim 23, wherein said operation unit is constructed to share the structure with a mechanism for inputting a gearshift position that represents a selectable gear ratio range during a drive of said vehicle.

26. A vehicle in accordance with claim 25, wherein said operation unit comprises a first slide groove, along which said lever is slid during the drive of said vehicle, and a second slide groove, along which said lever is slid to specify the speed reduction rate, the first slide groove and the second slide groove being disposed in series.

27. A vehicle in accordance with claim 26, wherein said operation unit has a mechanism that increases the speed reduction rate with an increase in deviation from a movable range of said lever during the driver of said vehicle.

28. A vehicle in accordance with claim 25, wherein said operation unit comprises: a first slide groove, along which said lever is slid during the drive of said vehicle, and a second slide groove, along which said lever is slid to specify the speed reduction rate, the first slide groove and the second slide groove being disposed in parallel.

29. A vehicle in accordance with claim 1, said vehicle further comprising:

a gearshift position input unit that inputs a gearshift position, which represents a selectable gear ratio range during a drive of said vehicle; and a storage unit in which speed reduction rates of said vehicle are stored in advance corresponding to gearshift positions, wherein said target speed reduction rate setting unit sets the target speed reduction rate in response to the operation of said operation unit and the input gearshift position by referring to said storage unit, and said selection unit selects the target gear ratio that attains the target speed reduction rate with preference to an energy recovery rate in the course of braking, irrespective of the gearshift position.

30. A vehicle in accordance with claim 29, said vehicle further comprising:

an accumulator unit; and a detection unit that measures a remaining charge of said accumulator unit, wherein said selection unit selects the target gear ratio according to the observed remaining charge of said accumulator unit.

31. A vehicle in accordance with claim 29, wherein said selection unit selects the target gear ratio in a specific range that prevents an extreme change of driving condition of a power source of said vehicle in a transient time from braking control to another driving state of said vehicle.

32. A vehicle in accordance with claim 29, wherein said transmission attains a plurality of gear ratios set stepwise, and said selection unit selects the target gear ratio by allowing a deviation from the selectable gear ratio range corresponding to the input gearshift position by one step.

33. A vehicle comprising a motor connected with a drive shaft and being braked by means of a torque output from said motor, said vehicle comprising:

an operation unit, through an operation of which a driver of said vehicle specifies a speed reduction rate in a process of braking with said motor;

a target speed reduction rate setting unit that sets a target speed reduction rate in response to the operation of said operation unit;

a motor driving state specification unit that specifies a target driving state of said motor, in order to enable a braking force that attains the currently set target speed reduction rate to be applied to said drive shaft;

a control unit that drives said motor in the specified target driving state; and a variation unit that varies a possible range of setting of the target speed reduction rate according to a driving condition of said vehicle.

34. A vehicle in accordance with claim 33, said vehicle further comprising:

a transmission that enables selection of a plurality of gear ratios in a process of power transmission;

a selection unit that selects a target gear ratio among a plurality of available gear ratios, the target gear ratio enabling the currently set target speed reduction rate to be attained by the torque of said motor; and a transmission control unit that controls said transmission to attain the target gear ratio.

35. A vehicle in accordance with claim 33, said vehicle further comprising an engine in a specific state of linkage that enables a power to be output to said drive shaft, wherein said motor driving state specification unit sets a target torque of said motor by taking into account a braking torque applied by said engine.

36. A vehicle in accordance with claim 35, said vehicle further comprising:

a connection mechanism that connects and disconnects transmission of power from said engine to said drive shaft.

37. A vehicle in accordance with claim 36, said vehicle further comprising:

a connection mechanism control unit that controls said connection mechanism to disconnect the transmission of power between said engine and said drive shaft in a process of braking with the torque of said motor.

38. A vehicle in accordance with claim 33, wherein said variation unit comprises:

a decision unit that determines whether or not a restriction condition to restrict the target speed reduction rate is fulfilled; and a restriction unit that actually restricts the target speed reduction rate when the restriction condition is fulfilled.

39. A vehicle in accordance with claim 38, wherein said decision unit determines that the restriction condition is fulfilled when there is a slip occurring in driving wheels connected with said drive shaft.

40. A vehicle in accordance with claim 38, wherein said decision unit carries out the determination, based on an operation of a switch that gives an Instruction to restrict the possible range of setting of the target speed reduction rate.

41. A vehicle in accordance with claim 38, wherein said restriction unit restricts the target speed reduction rate to be not greater than a predetermined upper limit.

42. A vehicle in accordance with claim 38, wherein said restriction unit carries out feedback control to restrict the target speed reduction rate until the restriction condition becomes unfulfilled.

43. A vehicle in accordance with claim 33, said vehicle further comprising:

an information unit that informs said driver of a variation in possible range of setting of the target speed reduction rate.

44. A method of controlling an operation of a vehicle, said vehicle comprising a motor, a transmission that enables selection of a plurality of gear ratios in a process of power transmission, and a drive shaft, which are connected with one another, said vehicle being driven and braked by means of a torque output from said motor, said method comprising the steps of:

(a) detecting an operation of an operation unit by a driver of said vehicle to specify a speed reduction rate in a process of braking with said motor;

(b) setting a target speed reduction rate in response to the operation of said operation unit;

(c) selecting a target gear ratio among a plurality of available gear ratios, the target gear ratio enabling the currently set target speed reduction rate to be attained by the torque of said motor;

(d) setting a target torque of said motor to attain the currently set target speed reduction rate; and (e) controlling said transmission to attain the target gear ratio and driving said motor with the target torque.

45. A method in accordance with claim 44, said method further comprising the steps of:

(f) detecting a state of a switch that gives an instruction to execute braking with the specified speed reduction rate; and (g) allowing a series of control operations by said steps (a) through (e) only in the case where the braking execution instruction is given by means of said switch.

46. A method in accordance with claim 44, wherein said step (b) comprises the steps of:

(b1) determining whether the operation of said operation unit is valid or invalid; and (b2) prohibiting the setting of the target speed reduction rate from being changed when it is determined that the operation is invalid.

47. A method in accordance with claim 44, wherein said step (b) comprises the steps of:

(b1) determining whether or not the target speed reduction rate is to be cancelled; and (b2) resetting the target speed reduction rate to a preset initial speed reduction rate when it is determined that the target speed reduction rate is to be cancelled.

48. A method in accordance with claim 44, wherein said step (c) selects the target gear ratio with preference to a preset initial value.

49. A method in accordance with claim 44, wherein said step (a) comprises the step of:
- (a1) inputting an instruction of said driver regarding a selectable gear ratio range during a drive of said vehicle,
- said step (b) sets the target speed reduction rate in response to the operation of said operation unit and the input instruction regarding the selectable gear ratio range, according to a predetermined relationship between the gear ratio and the speed reduction rate of said vehicle, and
- said step (c) selects the target gear ratio that attains the target speed reduction rate with preference to energy recovery in the course of braking, irrespective of the input instruction.

50. A method of controlling an operation of a vehicle, said vehicle comprising a motor, a transmission that enables selection of a plurality of gear ratios in a process of power transmission, and a drive shaft, which are connected with one another, said vehicle being braked by means of a torque output from said motor, said method comprising the steps of:
- (a) varying a possible range of setting of a target speed reduction rate according t6 a driving condition of said vehicle;
- (b) setting the target speed reduction rate in response to an operation of an operation unit by a driver of said vehicle to specify a speed reduction rate in a process of braking with said motor;
- (c) selecting a target gear ratio among a plurality of available gear ratios, the target gear ratio enabling the currently set target speed reduction rate to be attained by the torque of said motor;
- (d) setting a target torque of said motor to attain the currently set target speed reduction rate; and
- (e) controlling said transmission to attain the target gear ratio and driving said motor with the target torque.

51. A method of controlling an operation of a vehicle, said vehicle comprising a motor linked with a drive shaft and an engine linked with said drive shaft via a connection mechanism that connects and disconnects transmission of power to said drive shaft, said vehicle being braked by means of torques of said motor and said engine, said method comprising the steps of:
- (a) varying a possible range of setting of a target speed reduction rate according to a driving condition of said vehicle;
- (b) setting the target speed reduction rate in response to an operation of an operation unit by a driver of said vehicle to specify a speed reduction rate in a process of braking with the torques of said motor and said engine;
- (c) setting a target torque of said motor to attain the currently set target speed reduction rate without the torque of said engine;
- (d) controlling said connection mechanism to disconnect the transmission of power from said engine; and
- (e) driving said motor with the target torque.

* * * * *